United States Patent
Salesky et al.

(10) Patent No.: US 7,197,535 B2
(45) Date of Patent: *Mar. 27, 2007

(54) SYSTEM AND METHOD FOR FRAME IMAGE CAPTURE

(75) Inventors: Joseph Salesky, Cameron Park, CA (US); Peter Madams, Moraga, CA (US); John Flower, Walnut Creek, CA (US); Clint Kaul, San Mateo, CA (US); Benjamin Wells, Walnut Creek, CA (US); Edward Arthur Ho-Ming Janne, San Francisco, CA (US)

(73) Assignee: Pixion, Inc., Pleasanton, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 10/600,144

(22) Filed: Jun. 19, 2003

(65) Prior Publication Data

US 2004/0080504 A1    Apr. 29, 2004

Related U.S. Application Data

(60) Continuation of application No. 10/600,144, filed on Jun. 19, 2003, which is a continuation of application No. 09/523,315, filed on Mar. 10, 2000, now abandoned, which is a division of application No. 08/823,744, filed on Mar. 25, 1997, now Pat. No. 6,343,313.

(60) Provisional application No. 60/014,242, filed on Mar. 26, 1996.

(51) Int. Cl.
  *G06F 15/16*     (2006.01)
(52) U.S. Cl. .................. 709/204; 709/203; 379/202.01
(58) Field of Classification Search ................ 709/234, 709/203, 204, 206, 227; 379/202.01; 715/751, 715/752, 753
  See application file for complete search history.

(56) References Cited

U.S. PATENT DOCUMENTS 4,414,621 A    11/1983   Bown et al.
5,241,625 A    8/1993    Epard et al.

(Continued)

OTHER PUBLICATIONS

"Transmission Control Protocol"; *Information Sciences Institute*, University of Southern California, 1991, 83 pages.

(Continued)

*Primary Examiner*—Frantz B. Jean
(74) *Attorney, Agent, or Firm*—Carr & Ferrell LLP

(57) ABSTRACT

A system and method for capturing a displayed frame image from a computing device in a conferencing system is disclosed. A user selected area on the computing device is translated into boundary positions, those positions being configurable such that they may remain independent of the boundaries of the actual display or any window within the display. A frame image within the boundary is captured. The captured image may be transmitted to another computing device along with data associated with the captured image.

11 Claims, 37 Drawing Sheets

U.S. PATENT DOCUMENTS

| | | | |
|---|---|---|---|
| 5,455,599 | A | 10/1995 | Cabral et al. |
| 5,485,212 | A | 1/1996 | Frederick |
| 5,530,795 | A | 6/1996 | Wan |
| 5,550,982 | A | 8/1996 | Long et al. |
| 5,563,649 | A | 10/1996 | Gould et al. |
| 5,600,646 | A | 2/1997 | Polomski |
| 5,617,539 | A | 4/1997 | Ludwig et al. |
| 5,649,104 | A | 7/1997 | Carleton et al. |
| 5,689,553 | A | 11/1997 | Ahuja et al. |
| 5,689,641 | A | 11/1997 | Ludwig et al. |
| 5,706,290 | A | 1/1998 | Shaw et al. |
| 5,737,448 | A | 4/1998 | Gardos |
| 5,740,371 | A | 4/1998 | Wallis |
| 5,764,731 | A | 6/1998 | Yablon |
| 5,774,668 | A * | 6/1998 | Choquier et al. ........... 709/223 |
| 5,790,818 | A | 8/1998 | Martin |
| 5,793,365 | A | 8/1998 | Tang et al. |
| 5,793,980 | A | 8/1998 | Glaser et al. |
| 5,802,322 | A * | 9/1998 | Niblett ....................... 709/251 |
| 5,822,523 | A | 10/1998 | Rothschild et al. |
| 5,859,979 | A * | 1/1999 | Tung et al. ................. 709/228 |
| 5,877,762 | A | 3/1999 | Young |
| 5,983,263 | A | 11/1999 | Rothrock et al. |
| 6,313,863 | B1 | 11/2001 | Chida |
| 6,343,313 | B1 | 1/2002 | Salesky et al. |
| 6,345,297 | B1 | 2/2002 | Grimm et al. |
| 6,560,707 | B2 | 5/2003 | Curtis et al. |
| 6,594,699 | B1 | 7/2003 | Sahai et al. |
| 6,772,335 | B2 | 8/2004 | Curtis et al. |
| 2005/0163062 | A1 | 7/2005 | Salesky et al. |
| 2005/0169197 | A1 | 8/2005 | Salesky et al. |

OTHER PUBLICATIONS

Eleftheriadis, Alexandros et al.; "Meeting Arbitrary QoS Constraints Using Dynamic Rate Shaping of Coded Digital Video"; *Proceedings, 5th International Workshop on Network and Operating System Support for Digital Audio and Video*, 1995, pp. 1-12.

Frederick, Ron; "Experiences with real-time software video compression"; *Xerox PARC*, 1994, pp. 1-4.

Gajewska, Hania et al.; "Argo: A System for Distributed Collaboration"; *Systems Research Center, Digital Equipment Corporation*, 8 pages.

Jeffay, K. et al.; "Adaptive, Best-Effort Delivery of Digital Audio and Video Across Packet-Switched Networks"; *University of North Caarolina at Chapel Hill, Department of Computer Science*, 1993, 12 pages.

Jeffay, K. et al.; "Transport and Display Mechanisms for Multimedia Conferencing Across Packet-Switched Networks"; *University of North Caarolina at Chapel Hill, Department of Computer Science*, 1993, 28 pages.

Macedonia, Michael R. et al.; "MBone Provides Audio and Video Across the Internet"; *IEEE Computer*, 1994, 12 pages.

McCanne, Steven et al.; "Receiver-driven Layered Multicast"; *University of California, Berkeley and Lawrence Berkeley National Laboratory*, 1996, 14 pages.

Schulzrinne, H. et al.; "RTP: A Transport Protocol for Real-Time Applications"; *Network Working Group, Request for Comments*, 1989, 66 pages.

Stallings, William; "Data and Computer Communications"; Fourth Edition, copyright 1985, 1988, 1991 and 1994, 12 pages.

Turletti, Thierry et al.; "Issues with Multicast Video Distribution in Heterogeneous Packet Networks"; Sophia-Antipolis Cedex, France, 4 pages.

Wakeman, I.; "Packetized Video-Options for Interaction between the User, the Network and the Codec"; *The Computer Journal*, vol. 36, No. 1, 1993, pp. 55-67.

Wolf, Klaus H. et al.; "Multimedia Application Sharing in a Heterogeneous Environment"; *ACM Multimedia 95-Electronic Proceedings*, 1995, 14 pages.

Wood, Kenneth R. et al.; "Global Teleporting with Java: Towards ubiquitous personalized computing"; *The Olivetti & Oracle Research Laboratory, Unversity of Cambridge Computer Laboratory*, pp. 1-13.

Stephanie Stahl, "Conferencing Breakthrough," Distributed by CMF Publications, http://techweb.cmp.com/iw/533/33iucon.htm, Jun. 26, 1995.

"Face Off," Distributed by BYTE, http://www.byte.com/art/9510/sec7/art3.htm. Oct. 1995.

United States District Court for the Northern District of California, Claim Construction Order re: U.S. Patent No. 6,343,313; Jul. 28, 2004.

* cited by examiner

Time vs. Space diagram of some system applications

SYSTEM AND METHOD FOR FRAME IMAGE CAPTURE

CROSS REFERENCES TO RELATED APPLICATIONS

The present application is a continuation application of U.S. patent application Ser. No. 10/600,144, filed Jun. 19, 2003, entitled "Real-time, Multi-Point, Multi-Speed, Multi-Stream Scalable Computer Network Communications System," which is a continuation application of U.S. patent application Ser. No. 09/523,315, filed Mar. 10, 2000 now abandoned, entitled "Real-time, Multi-Point, Multi-Speed, Multi-Stream Scalable Computer Network Communications System," which is a divisional application of U.S. patent application Ser. No. 08/823,744, filed Mar. 25, 1997 now U.S. Pat. No. 6,343,313, entitled "Real-time, Multi-Point, Multi-Speed, Multi-Stream Scalable Computer Network Communications System," which claims priority from U.S. Provisional Application No. 60/014,242, filed Mar. 26, 1996, the disclosures of which are incorporated by reference.

BACKGROUND OF THE INVENTION

The present invention relates generally to the field of shared computer communications and computer conferencing. In particular, one embodiment of a conferencing system according to the present invention facilitates the conferencing of two or more persons, each with a computer at one or more locations with a shared visual display and additional communication capabilities such as video, shared drawing, audio, text chat, etc. and facilitates the recording and later playback of the communications.

Existing conferencing systems can be described as either video conferencing systems or "whiteboard" systems. In a video conferencing system, a snap-shot of the conference presentation is taken at regular intervals, such as thirty times per second. Given that the image on a computer display is not changing nearly that often, video conferencing wastes large amounts of bandwidth. In a whiteboard system, the presenter at the conference draws within a whiteboard application or imports the output of another program into the whiteboard program for manipulation. When the presenter is ready to present a snap-shot, the presenter presses a "send" button and the whiteboard program updates all the attendees' displays with the image created by the presenter. This type of system, while requiring less bandwidth than video conferencing, is clumsy to use, lacks real-time responses, and limits the presenter to the tools provided with the whiteboard program.

Existing shared-display or shared-image systems rely on interception and communication of display or graphics system commands or depend on conferees' having similar hardware and software platforms. These systems lack flexibility and performance if the network connections are unreliable or have narrow bandwidth, or they require uniform hardware or software installations.

Existing systems that provide single or multiple data stream handling of a nature different than shared-image conferencing depend on wide bandwidth network connections or on all participants having similar platforms.

SUMMARY OF THE INVENTION

An improved general purpose data-stream computer network transport system and, in particular, an improved desktop conferencing system is provided by virtue of the present invention. The desktop conferencing system is used to display a shared collaboration among conference participants ("conferees"), with one or more individuals located at each remote site connected to the conference. Typically, at any particular time some conferees are not able to modify the shared images, and thus they are "attendees," as opposed to "presenters." Preferably, only one conferee is the presenter at any one time. A pointer icon for each conferee can be displayed on the screen, and the conferee is able to modify the location of his or her pointer, even if the conferee is not one who can modify the shared display itself. Each of the pointers can be labeled to distinguish each of the conferees.

In a specific implementation of the desktop conferencing system, conferee client computers ("conferee clients") connect to the "conference server," a computer or several networked computers (any of which may also be used by a conferee as a client computer) running conferencing software, typically by navigating a World Wide Web ("WWW" or "Web") browser through a predetermined Universal Resource Locator ("URL") that indicates a Web page describing the conference. The conference can be set up any time earlier by anyone with access to this server function. At the time of setup, one or more password character strings ("keys") can be specified for the conference. The key that a conferee gives at the time of attempting to connect to the conference server determines whether that conferee will be allowed access to the conference and what the conferee's initial privileges will be for participating in the conference and for modifying the setup of the conference. These privileges include by are not limited to the following: entering the conference, being a presenter, having a pointer, seeing the icons for other identifying information of other attendees, hiding or sharing one's own icon or identifying information, changing descriptive information such as the name, time, and purpose of the conference, changing keys, and changing others' privileges. The privileges can be modified during the conference by conferees or others who are so authorized. In general terms, the privileges include those that conferees might enjoy in person at a conventional, physical meeting. In the description below, a conferencing or other communications session provided by the present invention will sometimes be called a "meeting".

A presenter uses his or her computer to begin a conference presentation by connecting to the conference server. Conferencing software on the presenter client computer captures a portion of the screen display of the presenter client and sends the captured region (after possibly compressing it or applying other transformations) to the conference server. The captured region can be anything the presenter client can have displayed on its screen or a portion thereof, whether or not the hardware or other software producing or managing any part of the display is aware of the conferencing system.

When the attendee selects a link from the Web page to begin the conferencing session for that attendee, this action initiates the attendee client conferencing software. The attendee client then obtains a current view of the captured region from the conference server. The position of a pointer icon on a conferee's view of the captured region and an icon specified by the conferee might be communicated to each of the other attendee and presenter clients, so that each of the participants can see what each conferee is pointing at should a conferee choose to point to an element of the shared captured region. A particular conference can include more than one presenter; all conferees may be presenters, or all conferees may be non-presenting attendees. The latter may happen if a conference is set up to review a previously recorded or archived conference.

In a simple embodiment, the entire screen of the presenter is shown to all of the attendees. In a more complex embodiment, multiple subsets of multiple presenters' screens might be made available to all attendees while other subsets of the displays of the presenters are viewable by a subset of the attendees, thus allowing private side "conversations." These side conversations can be flexibly reconfigured during the conference, according to the conferees' privileges; participants in side conversations can have separate pointers whose positions are independent of, and whose labeling icons are distinguished from, those appearing in the general conference.

As each conferee joins a conference, the client and the conference server agree on the capabilities of the client, such as display bit-depth, bandwidth of the connection between client and the conference server, processor speed of the client, and the amount of memory available to each client. These parameters may be modified by the conferee, the client, or the server: this can be done automatically or on demand. If the conference server determines that a client has sufficient computing resources, some of the tasks, such as image data compression (for presenter clients), decompression (for attendee clients), update scheduling (both types of clients), and other image transformations and server management functions can be assigned to the client computers. The client computers might be personal computers, workstations, X-terminals, cable or satellite TV set-top boxes ("STBs"), personal digital assistants ("PDAs"), game playing machines, WebTV™'s, network computers ("NCs"), Infopads, visual telephones, and other existing or as yet undeveloped input and/or output devices. These clients might be connected to the server computer or computers (and the server computers might be interconnected) by high or low bandwidth electrical or optical connections, radio, infrared, microwave, telephone modem, or hybrid combinations of these, or other existing or as yet undeveloped data communication technologies.

The system can supply a range of coder-decoder ("codec") facilities for the compression and decompression of images (in order to reduce bandwidth requirements during network transmission) and for the matching of image representations to client display requirements including input or output format transcoding (in order that the shared image appear visually similar to presenter and attendee). In addition, codecs may be provided by the system for such purposes as error-correction, encryption, or audio and video noise reduction, or others. User-provided or proprietary codecs for these purposes and more can also be incorporated into the system. Any of these codecs may be in form of software or specialized hardware. Multiple codecs may be provided for the same function; should the system determine that one is better suited for that function, then it may be selected, and the codec can be changed dynamically when conditions change, such as client requirements, server needs, and network loading.

At least one embodiment of the present invention provides real-time, multi-point, multi-speed transport over a computer network for data streams other than the visual conference shared images described above, including but not limited to audio, video, shared paint and drawing spaces, text chat, and other real-time object streams where intermediate updates may be dropped; in particular, the data streams may combine any or all of these types of data, which may be produced by multiple presenters, and arbitrary data streams may be combined with these. The features of connecting to servers, setting up conferences, keying privileges, passing identifications, accommodating multiple dissimilar platforms and network connections, and configuring subsets of conferees apply equally to these other data streams. In the more general case, the "communications server connects the "source" and "sink" client machines of the "communicants" during a communication session.

But the system is not limited to real-time; thus, for example, archiving is provided. It is not limited to multi-point; thus, for example, a single user can record for later playback; being scalable means it works well for a few users and provides a similar communications service and experience with many users. It is not limited to multi-speed; thus, for example, data streams where lost information cannot be easily updated by later versions can be accommodated. It is not limited to multi-stream; for the shared screen-image stream (frequently used here as an example) by itself offers great utility. Indeed, it does not require a network: for example, the same computer could be the recording and archiving server for a presenter using it as a client; or the same computer could run presenter client software, attendee client software, and the communication server software connecting them so that a presentation might be previewed from the attendee's point of view.

Although a simple embodiment uses a single computer as the communications server, a more complex embodiment connects several computers in performing the server functions. The server-to-server interconnections can optimize routing by using information provided in the data stream or measured on the network, optimize wide-area network (WAN) usage by connecting clients to nearby servers, provide backup reliability by migrating clients, provide scalability of conference size through splitting the data stream, improve performance and robustness through redundant routing, and distribute functions of the system's transport pipeline (such as compression, decompression, and update scheduling) over several server and client computers. These services can be provided automatically depending on resources of the computers and network (for example, measured net speed and central processing unit, or "CPU," load) and facilities available (for example, announced client characteristics, such as CPU speed, compression and/or decompression hardware, or display parameters). They can also be configured and constrained by the server computer administrators or others with appropriate privileges.

Existing systems do not provide one or more of the following, which are explained in greater detail below: multi-speed at server and client, multiple reconfigurable coder-decoder transformations and transcodings, storage services (for, e.g. caching, failure recover, recording, archiving, and playback), keyed access and privilege granting, adaptable servers and clients, multiple servers, adaptive and redundant server-to-server routing, load sharing among clients and servers, adaptive server-to-client matching, client/server and server/server backup and reconnection, multiple protocols for client connections, dynamic reconfiguration of server functions, and scaling beyond single process, host, or network limitations automatically or upon request.

A more complete understanding of the nature, features, and advantages of the invention will be realized by referring to the following description and claims together with the associated drawings.

DESCRIPTION OF THE PREFERRED EMBODIMENT

Figure 1:
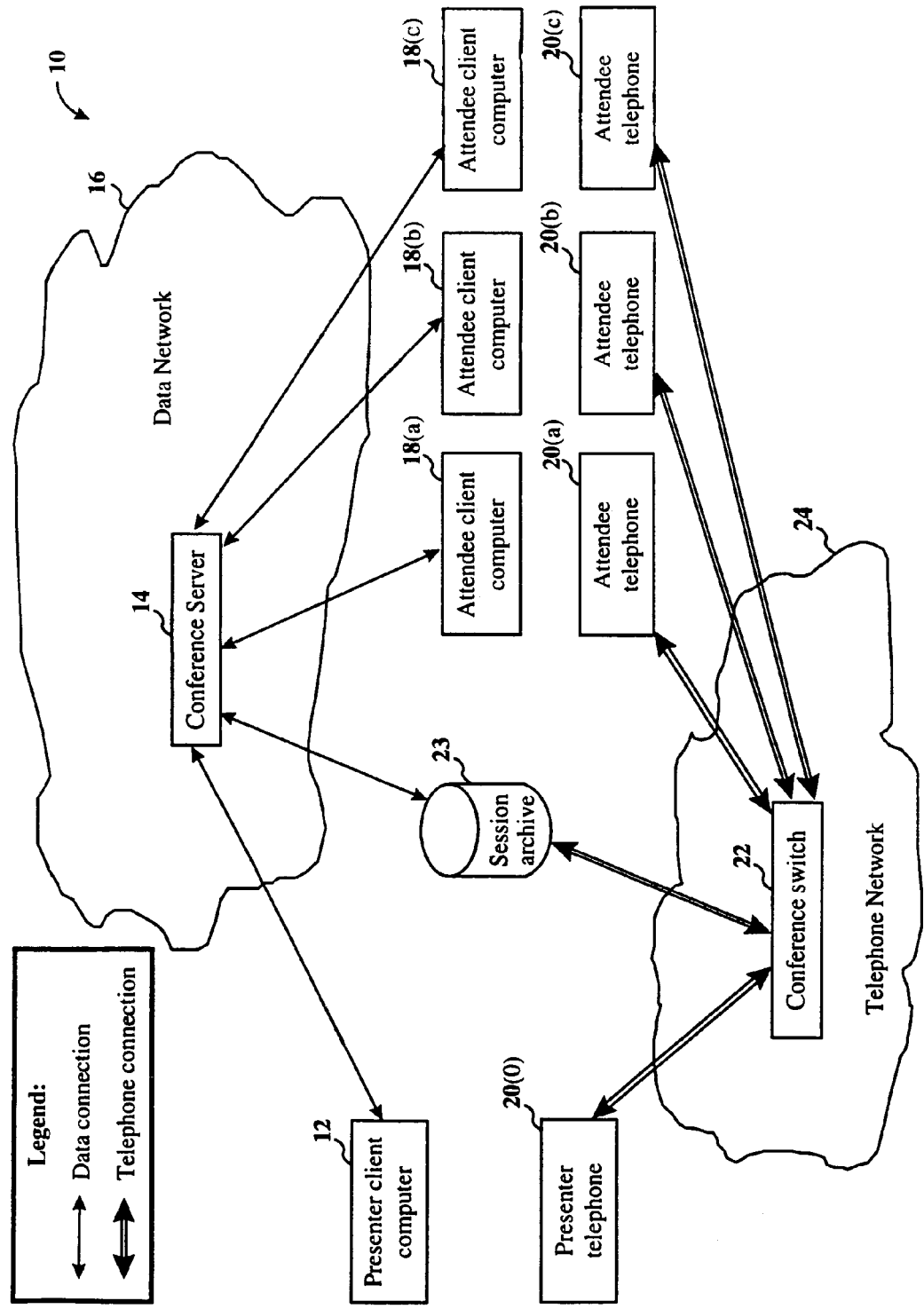
FIG. 1 is a block diagram of a desktop conferencing system based on the present invention.

FIG. 1 shows a desktop conferencing system 10 according to one embodiment of the present invention. Desktop conferencing system 10 is shown with three attendee clients 18 and one presenter client 12. Following the arrows, presenter client 12 is connected to attendee client 18 through a conference server 14 and data network 16. The presenter and attendees may also participate in an ordinary telephone call or a conventional conference call using telephones 20 connected through conference switch 22. The voice conferencing might also be carried out through an audio connection on a data network; indeed, telephone network 24 and data network 16 could be the same.

The group of users can comprise from as few as one user, who might record a presentation or lecture or video-mail onto a session archive 23 for later distribution; or two people who wish to share information or collaborate on some work product; or a small group of users, as in a typical business conference call; to many tens of thousands or hundreds of thousands of users using the network as a broadcast rather than interactive medium. In the last case, the voice conferencing might also be broadcast, and could involve one-way telephone conference calls, radio, multicast network audio (such as MBone), or the like.

The presenter client conferencing software, which is usually distributed tightly bound with the attendee client software to facilitate presenter hand-offs from conferee to conferee, captures information (such as image, sound, or other output information) from a program or programs running on the presenter's machine and relays it to the server, as explained in more detail below. The server relays this information to all of the attendee client computers participating in the same session or conference, transforming (in manners and by methods described below) the data as required. A more detailed description of the operation of the system by way of the example of transporting a stream of shared-image data during a conferencing usage of the software now follows.

During a conferencing session, presenter client 12 takes periodic "snap-shots" of the application screen image contained within a rectangular boundary determined by the presenter, breaks the screen shot into smaller rectangular blocks, compares these blocks to information from a previous screen shot. A block that has changed is passed to conference server 14 after it has undergone possibly two transformations and received identification marking ("ID stamps"). The first transformation may form the difference, using a set difference exclusive-or (XOR), or other difference method, of the new and old block in order to extract information on the changes only. The second transformation may compress the block using a publicly available compression algorithm such as JPEG (Joint Photographic Experts Group) or PNG (Portable Network Graphics), or licensed proprietary methods of compression. The need for the two transformations is determined by the system depending on such parameters as client characteristics, server and network loading, and user requests. The two transformations and possibly many others may be also performed by the server, another client, or another facility available on the network.

The presenter client identifies where the block is in the capture rectangle with a block-location ID stamp; it identifies the time with a time-stamp; it may also identify itself with an origin stamp, and provide other ID stamps as needed. In order to provide synchrony in the system, conference server 14 can issue time synchronization signals. The conference server may also add time-stamps on receipt of blocks, and will need to update time-stamps when a recorded or archived conference is played back.

The changed blocks, however transformed, with ID stamps, are held on the conference server until they have been sent to all attendee client computers 18, or it has been determined by flow control that there is no longer a need to hold them. Flow control between presenter client 12 and server 14 and between server 14 and attendee client 18 determines how often the attendee client receives information updating the image; this flow control, described in more detail below, depends on the characteristics and configurations of the clients, the server, and the network. Attendee client 18 can also send a command to conference server 14 to obtain the latest image change information.

Attendee client 18 uses whatever change information it receives to update its screen display of the shared image. The attendee client may need to decompress the changed block information and to composite differences with previously received image information. The reverse transformations of decompression and composition may instead be performed by other computers.

From time to time, attendee client 18 communicates the position of the attendee pointer (if the conferee has selected this option) to conference server 14, which distributes the pointer position and a chosen identifying icon to each of the other conferee clients, which may then add a representation of the icon or other identifying label at the position indicated by the pointer information to the shared image on the client's display. The purpose of these pointers and labels is to allow conferees to reference particular elements of the shared image, possibly while describing the elements to the other conferees over the audio conference session (via a telephone conference call or an Internet audio conferencing application, for example).

Figure 2:
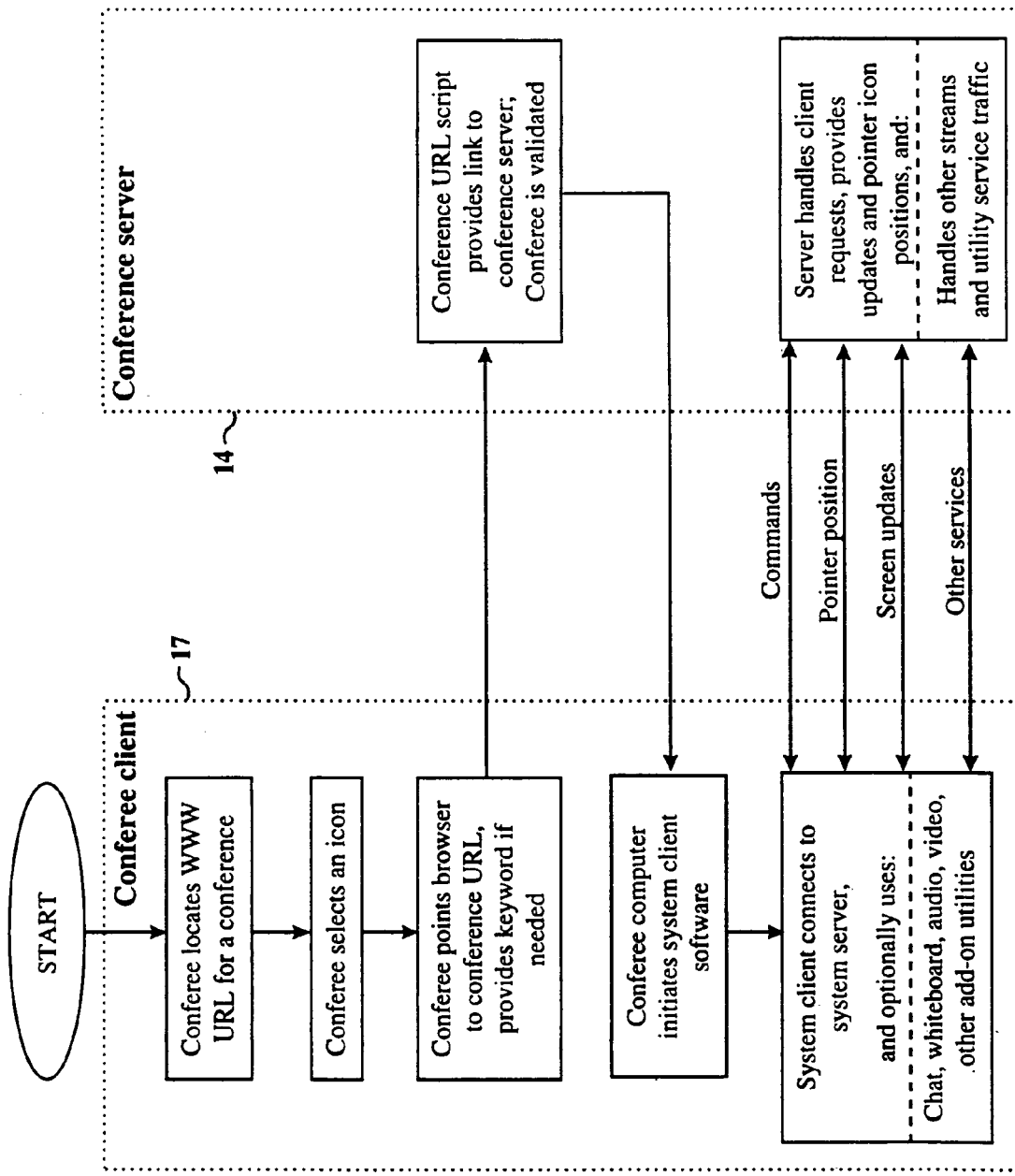
FIG. 2 is a flowchart illustrating the connection of a conferee client computer to a conference server shown in FIG. 1.

FIG. 2 is a flowchart showing the process of introducing a conferee client 17 (client 17 refers t a generic client which might also be a presenter client 12 or an attendee client 18) to a conference ongoing on server 14, assuming that the conference setup is performed via the WWW. First, the conferee locates a conference listing. This may be done by finding or being told a URL or using a locator service such as ULS™ or LDAP™. The conferee also specifies an icon to be used as a pointer label. Then the conferee points a WWW browser to the conference listing, where the server offering this listing or an associated server validates the conferee and provides information that allows the attendee client conferencing software to start and to connect to conference server 14 itself, possibly after further validation. Other information may be passed to the conferee client at this time as well. The connection to a server can also be accomplished in different ways, such as using stored parameters that allow meetings to be resumed after the network connection is temporarily broken, or using client software having a hard-coded list of meetings. Once the attendee client software is running, it communicates commands and pointer icon position to conference server 14, and conference server 14 supplies an initial conference image and later screen updates to client 17 (which is initially an attendee client 18).

An attendee can become a presenter by sending the appropriate attendee-to-presenter command to conference server 14. In the simplest embodiment with a single presenter, a message is sent to the presenter's screen indicating that an attendee wishes to take the presenting role; if the current presenter approves, then the roles are exchanged. In more complex embodiments, there can be a presenter arbitration mechanism, or multiple presenters may be allowed. The ability for a presenter or an attendee to be involved in any particular conferencing session and the assignment of privileges in the conference can be controlled by requiring appropriate keys from the presenter and the attendees.

Referring back to FIG. 1, data network 16 can be provided by dial-up connections, local area networks (LANs), wide area networks (WANs), internets, intranets, the global Internet, or a combination of these or any other computer data communications links. In a specific embodiment, the conferee client computers are personal computers, workstations, or other computing hardware systems, running operating systems such as MacOS™, Windows® 3.1 or 3.11, Windows® 95, Windows® NT™, Unix™, OS/2™, NExTStep™, BeOS™, JavaOS™, or the like. There is no requirement that the operating systems or hardware of the conferee clients all be the same.

Conference server 14 matches the form of the image to the attendee clients before sending it. Most computer screen images are represented as a bitmap of pixels whose layout is device-dependent. To be able to send images from one device to another, a transformation or transcoding is often required. The captured image information may be transcoded into a device-independent format for transmission and transcoded back to a device-dependent format for each attendee's screen; if, however, the mix of attendee clients is such that a device-independent format is not needed, no conversion is done. If these or other transcoding operations are needed, they can be carried out at the presenter client's side, the server side, or the attendee client's side, depending on where excess capacity or superior capability exists. The choice of device-dependent vs. device-independent bitmaps (DDB vs. DIB) is made automatically by the server, in response to the number and type of conferee clients. For example, a meeting with just two conferees, each running a Windows® PC with similar 256-color graphics configurations, may use DDBs and achieve high performance with low overhead. However, where differently configured clients are connected in a conference, server 14 transcodes the images to fit the attendee's screen capability.

Multiple codecs may be involved in the transcoding of screen formats as well as other image transformations described herein. It may even happen that different codecs will be used on different blocks in the same image, depending on availability of the codec's host computer, the transformation needs, the loading on client, server, and network, or other conditions relevant to the system's performance.

Server 14 also fits the images to the attendee's CPU capability. Server 14 can be a server operated by the presenter (who would then have full control over the server's resources), or it can be owned or operated by an unrelated third party or even an attendee who never presents. It is possible to have a third party whose involvement is solely as a facilitator of conferences. Operating server 14 is simpler than operating a videoconference hub, since the bandwidth is much lower. One aspect of the present invention is the realization that real-time conferencing can be had without resort to full-motion video transmission, as the item being monitored, a portion of a computer display, does not change as fast as a full-motion video. A similar observation applies to many other data communications streams.

Instead of full-motion video, attendees' screens are updated as the presenter's screen is modified, or less frequently for attendees with slow machines. The screen is modified from left-to-right within a row of blocks, and rows are updated top-to-bottom to improve the perception of low latency.

In some cases, server 14 might be operating without attendees. Such a configuration is useful where the presenter wishes to "record" a session for later playback. Even a session with attendees can be recorded for later playback, possibly including a recording of the voice conferencing. These stored sessions might be stored in session archive 23 or elsewhere. The shared image session can be synchronized with the voice conference by using the time stamps on the block data. When the recorded session is played back, it is an example of conference server 14 operating with attendees but no presenter.

The blocks may be held at the server as full images, as differences ("deltas") from previously received full images, as deltas from previous delta blocks, or as some combination of these, depending on the capabilities of the presenter and attendee clients. Periodically, a server may "checkpoint" the image deltas. To do this, the server requests a full image of a block from the presenter client and uses the full image as a replacement for all the accumulated image deltas for that block. The server might also request the entire captured region from the presenter client, or send the entire region to an attendee client upon request.

The conference server acts as a software-controlled switch that connects the presenter client with the attendee clients, taking into account that the speed of information transfer from the presenter client can change and the speed of transfer to the attendee clients can change and be simultaneously different for different attendees. The workload of the entire system is shared and distributed among the client and server computers, and even other computers that do not perform client or server functions.

Presenter Client Capture Operation

The capture operation and transport technology improves over former approaches by reducing the amount of work required and so enhances performance. In addition, the technique can be tuned to best suit the workload on the hardware and software platforms and network connections involved, manually or automatically. In particular, this tuning dynamically matches the capture operation to the amount of computer power available (while running the other software the conferee may wish to use) and the speed of connection to the network. Existing systems that capture graphics display commands, transmit them, then use them to recreate the original display appear to have great compression, which entails economy of network transmission. But comparison with the description below of the present invention will reveal that the savings are not so great when the task is to communicate data streams which can be updated by later transmissions.

The presenter selects an area of his or her computer display to be shared ("capture region"); it need not be a rectangular area. More than one capture region may be selected at a time and multiple regions may overlap. The selection may be made on a screen display, in a memory representation of a display, or in an aliased representation of either; the selection can be changed at any time. If the client has multiple monitors or multiple displays on a single monitor, independent selection can be made for each. A window provided by the presenter client computer's operating system, or by an application or other program, may be designated as the capture region, and then the capture region can be adjusted automatically if the window is moved or resized. This may be a fixed window, or the capture operation can be set to follow the selection of the current ("top" or "focus") window automatically. In a simple embodiment, the presenter selects a rectangular region on the screen ("capture rectangle"). For efficient transmission, the capture rectangle is broken up into rectangular subregions (blocks) to give good perception of response time. For example, if the presenter has selected all of an 800-by-600-pixel screen display to be within the capture rectangle, then it might be broken up into twelve 200-by-200-pixel square blocks. If the capture rectangle is later adjusted smaller, the blocks are changed to be made up of smaller rectangles, or the capture rectangle is divided into fewer blocks, or both; correspondingly, if the capture rectangle is later adjusted larger, the blocks are changed to be larger rectangles or the capture rectangle is divided into more blocks, or both. For efficient handling of blocks, the blocks are preferably kept between 1000 and 4000 pixels in size. As the blocks are updated on the attendee's screen, they are presented from the top row to the bottom row and from left to right within a row.

The presenter defines the shape of the capture region and can change, control, reposition, and resize it. In some computer systems, when the region is rectangular the capture rectangle may be marked by a transparent window that stays visible; in other systems, it is appropriate to use four graphical objects that move together to mark the boundary of the capture rectangle.

Figure 3:
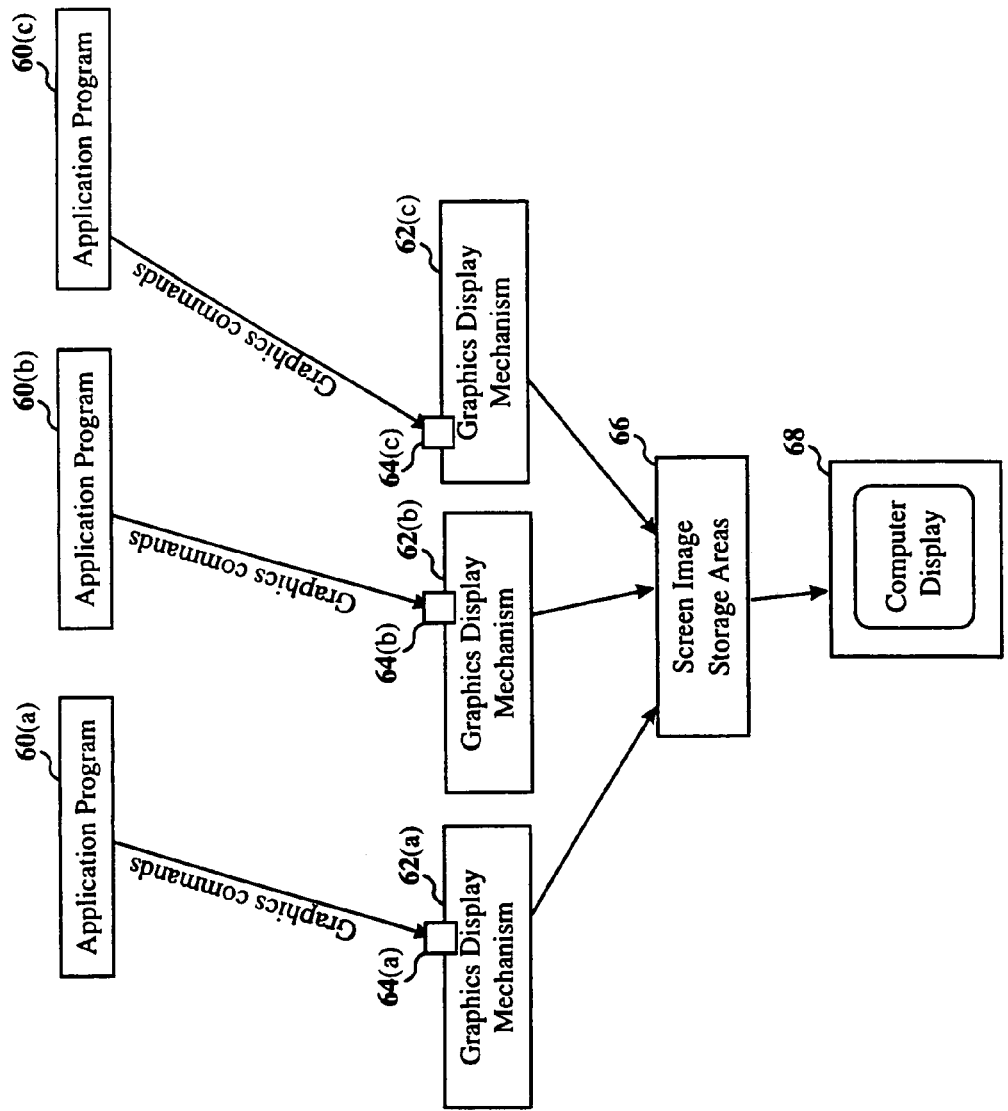
FIG. 3 is a block diagram of the data flow in an architecture commonly supporting computer graphical user interfaces.

FIG. 3 shows the display architecture of a typical computer shown with application programs 60(*a*)–(*c*), and graphic display mechanisms 62(*a*)–(*c*) with graphics commands capture points 64(*a*)–(*c*). The graphics display mechanisms 62 send their output to a screen image storage area 66 which in turn presents an image to the user on a computer display 68. Existing techniques of image sharing depend on intercepting graphics display commands (graphic instructions, display commands, graphics subsystem calls, etc.) at graphics commands capture points 64 and sending these commands to another computer which can use them to affect its own display. This appears to have an advantage in that one high-level graphics drawing command (e.g., "draw a blue line from co-ordinates (0,0) to (0,100)") can be expressed in fewer bits of data than what would be required to express the resulting set of pixels on the screen. In this case, 100 blue pixels say using 24-bit color depth, would require 300 bytes of data, compared with a graphics drawing command that might require only about 12 bytes of data.

If the task to be achieved is to send a copy of this image to another computer, using the smallest number of data bits, then sending the graphics drawing commands seems, at first sight, to be a very effective approach to adopt. However, two factors mitigate this apparent saving. One arises when the data stream is compressed before transmission, and the other arises from reflection on modern graphics drawing techniques.

Compression is very effective when there is a lot of redundancy in the data. In the example cited above, the 300 data bytes needed to represent the blue line on the image consists of a repeating set of 3 data bytes, each representing one blue pixel. This might be compress to as small as 5 data bytes total, one to indicate the code, three for the color, and one to indicate the binary number of pixels. Of course, the 12-byte graphics drawing command might also be compressible: nevertheless, the apparently huge savings ratio is not in fact realizable.

Modern graphics drawing commands include not only simple geometric drawing operations, but also text elements with full font and spacing specifications, and other complex constructions. This can be seen by comparing the size of, say, a word processing document (which contains the graphics drawing commands, font information and text) stored in a computer file with the size of an image of that same document, say, as a fax image stored as a file on the same device. A few years ago, the image file would always be larger than the document file; now, the reverse is often true.

Furthermore, as will be seen below, reducing the amount of data by using compact graphics drawing commands instead of direct image data is not always possible when applied to real-time systems where transmission of live, changing images is required. In this case, there are two ways to merge changes together, thus reducing the total amount of data that must be transmitted. The example used above applies to a single image; when changing images are required—as for example, with conferencing systems-further opportunities exist to reduce the total amount of data transmitted. This is an advantage of the present invention.

First, when graphic drawing commands update the same region of the image, we can capture just one resulting image containing the results of many commands. Second, successive changes to a particular region of the image, which will result in successive transmissions of that region, can be composited together. The several strategies for this updating under the present invention will now be described in more detail.

Updates for the capture rectangle may be requested by the server, or sent at fixed or variable times announced by the presenter client automatically or as determined by the presenter, or sent at the command of the presenter. The blocks sent out by the presenter client are just the blocks which have changed since the last update. From time to time, the presenter client might send the entire set of blocks. Depending on several factors detailed below, the presenter client might send the blocks as difference (delta) blocks as opposed to the full information base blocks. Base blocks are preferred where network bandwidth is freely available but computing power at the client is limited.

For efficiency, the presenter client might only send out delta blocks for areas that have changed, since delta blocks will often compress smaller than the corresponding base block because much of the base block may remain unchanged. Thus, the presenter client maintains a copy of the last capture to allow it to generate the delta blocks.

Figure 4A:
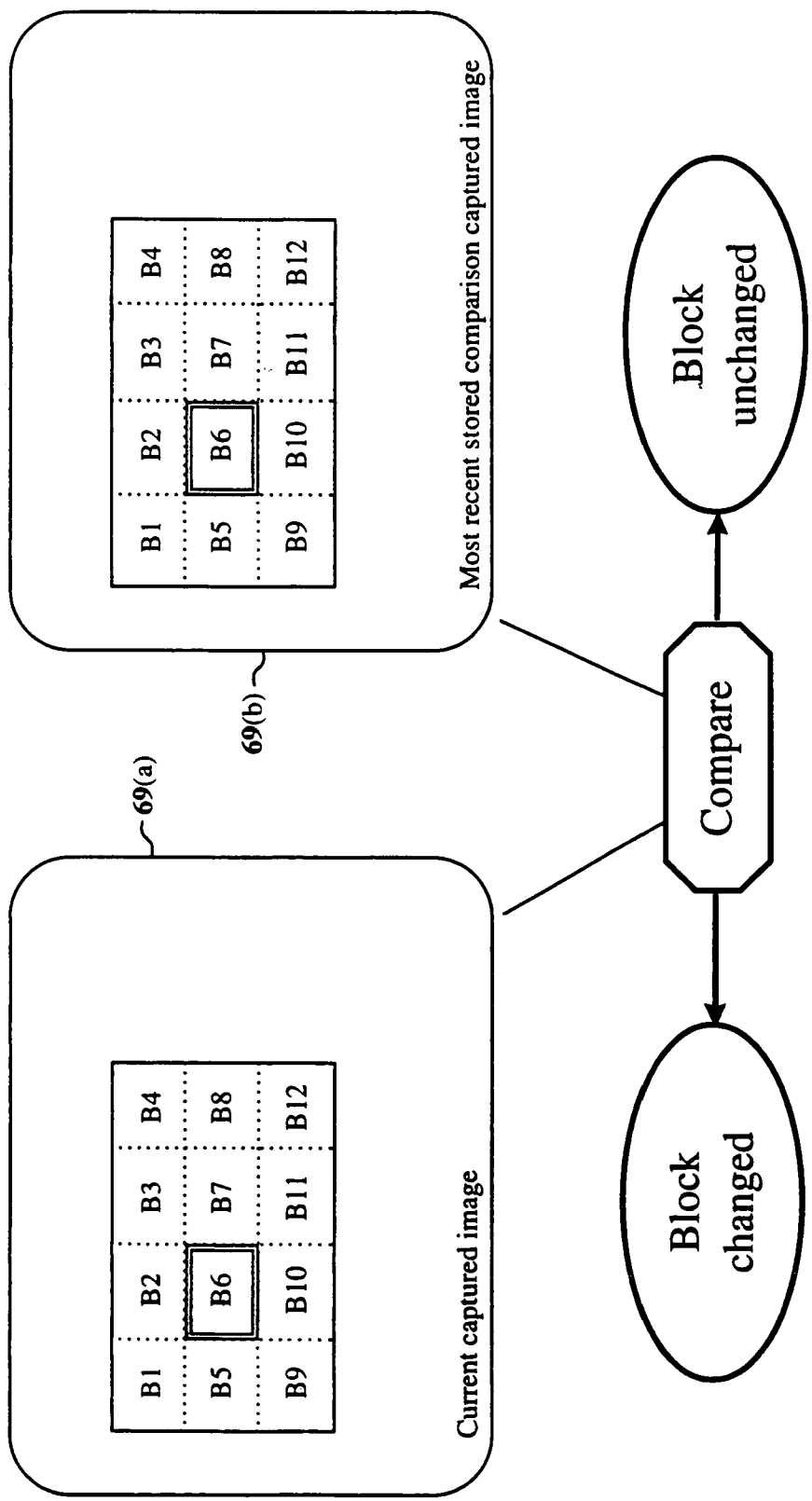
FIG. 4A is a logic diagram illustrating the comparison of new and old captured images by the presenter client, when full images are compared, and the transmission of the changed information to the conference server.

FIG. 4A illustrates this point. In that figure, the captured images used are divided into twelve subblocks so that unchanged portions of the captured image can be ignored. If the block labeled "B6" is the block being sent, block B6 of the current copy of the captured image 69(*a*) is compared with block B6 of the most recently stored reference copy 69(*b*) of the captured image (the reference copy is a copy of who the captured image looked at some point in the past). The result of the comparison will determine whether block B6 has changed. If it hasn't, then there is no need to transmit the changes.

Figure 4B:
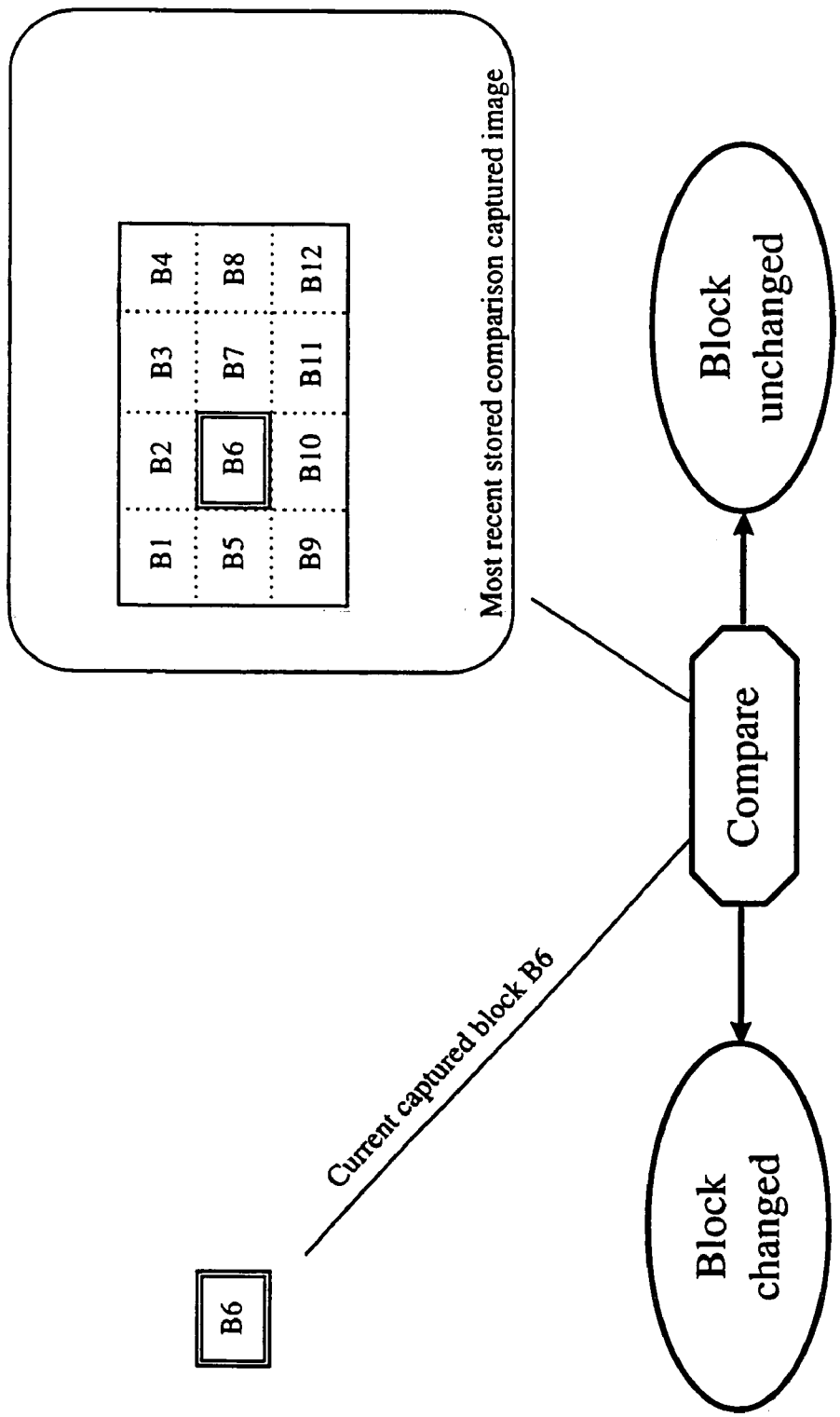
FIG. 4B is a logic diagram illustrating the comparison of new and old captured images by the presenter client, when a new block is compared with the corresponding block in an old full image, and the transmission of the changed information to the conference server.

FIG. 4B illustrates a similar process, but there, only block is captured from the current image for comparison with the stored image. This reduces the storage required for the comparison by nearly one half, but it limits consistency, as described later.

Figure 4C:
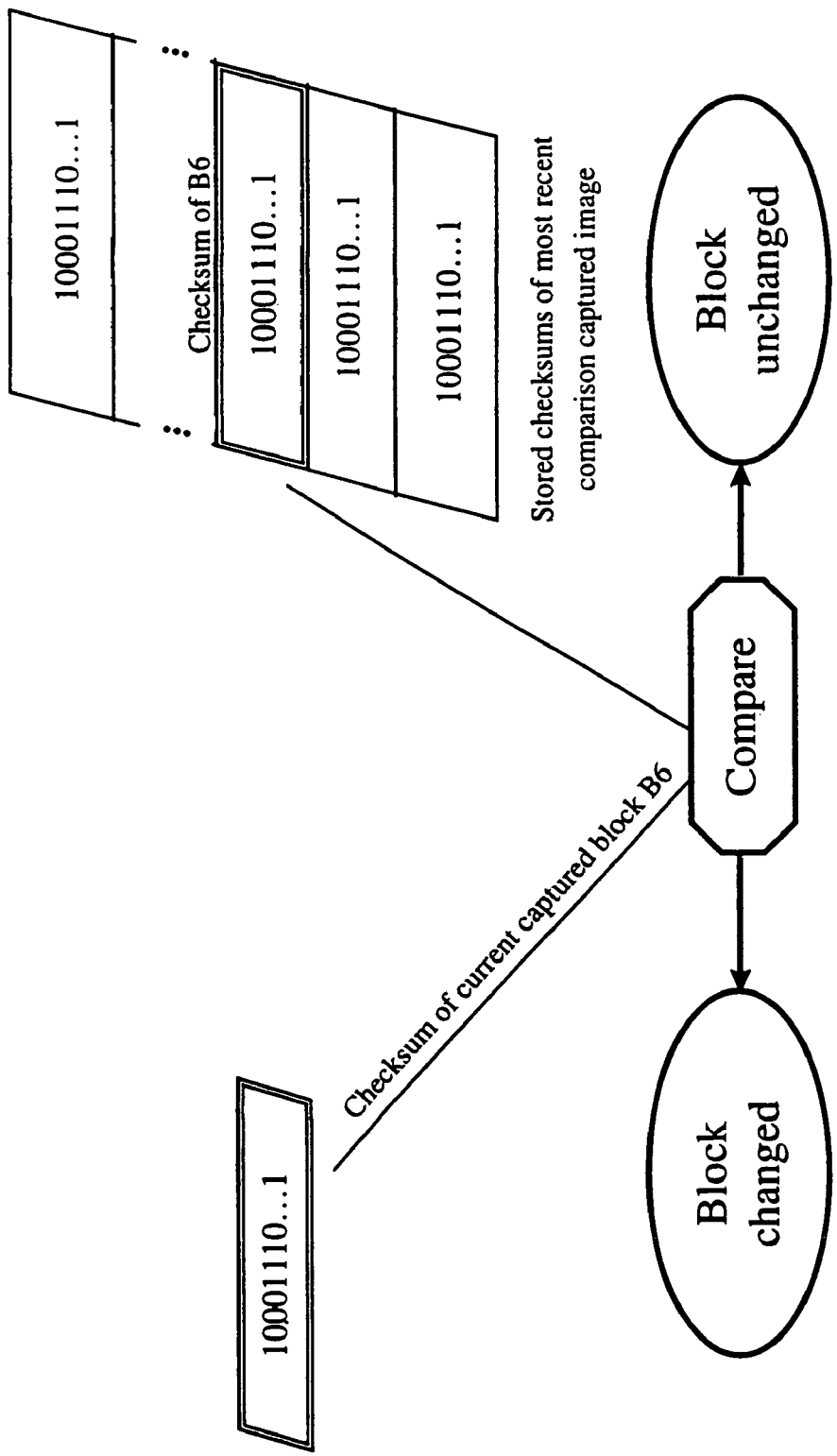
FIG. 4C is a logic diagram illustrating the comparison of new and old captured images by the presenter client, when a checksum of a new block is compared with the checksum of an old corresponding block, and the transmission of the changed information to the conference server.

In FIG. 4C, the images are replaced by checksums or digests, such as cyclic redundancy check ("CRC"), DFT (discrete Fourier transform) parameters, or the results of applying hashing functions appropriate for images, or the like. Although storage is greatly reduced, as only the much smaller checksums need to be saved, and comparison is quick, the digest procedure must be fast in order to provide any time economy. The main drawback is that two different blocks may have the same checksum, and then the comparison will fail to find the difference. This can be mitigated by the choice of checksum and by the unlikelihood that the comparison would fail twice in a row when the block changes again.

Figure 4D:
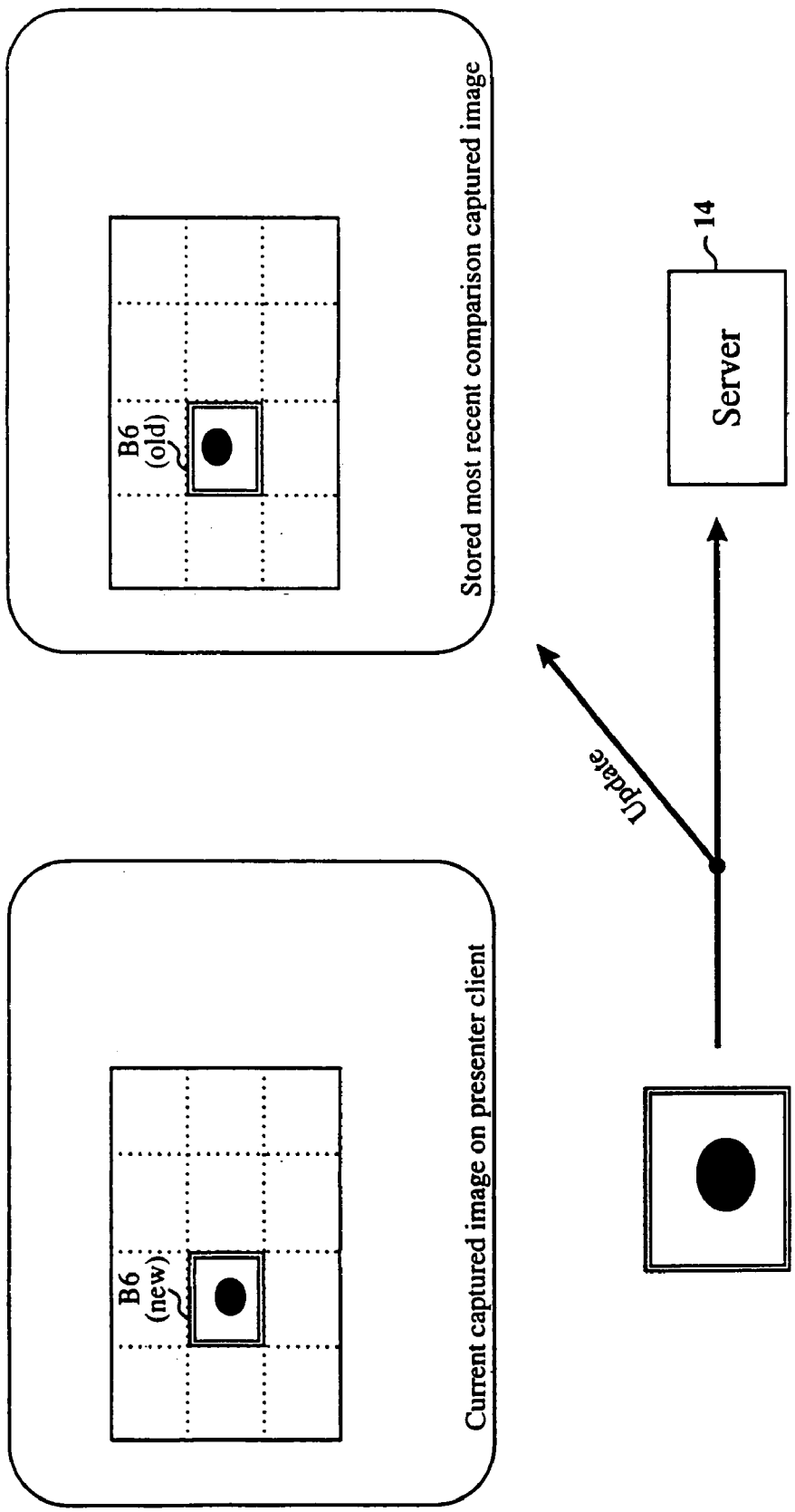
FIG. 4D is a data flow diagram illustrating the updating of the stored old image with a new captured block by the presenter client, and the transmission of the changed information to the conference server.

FIG. 4D shows the transmission to the server of a base block when the comparison shows a change. The block is also sent to the stored image; this allows the stored image to be updated at the same time the changes are sent to the server.

Figure 4E:
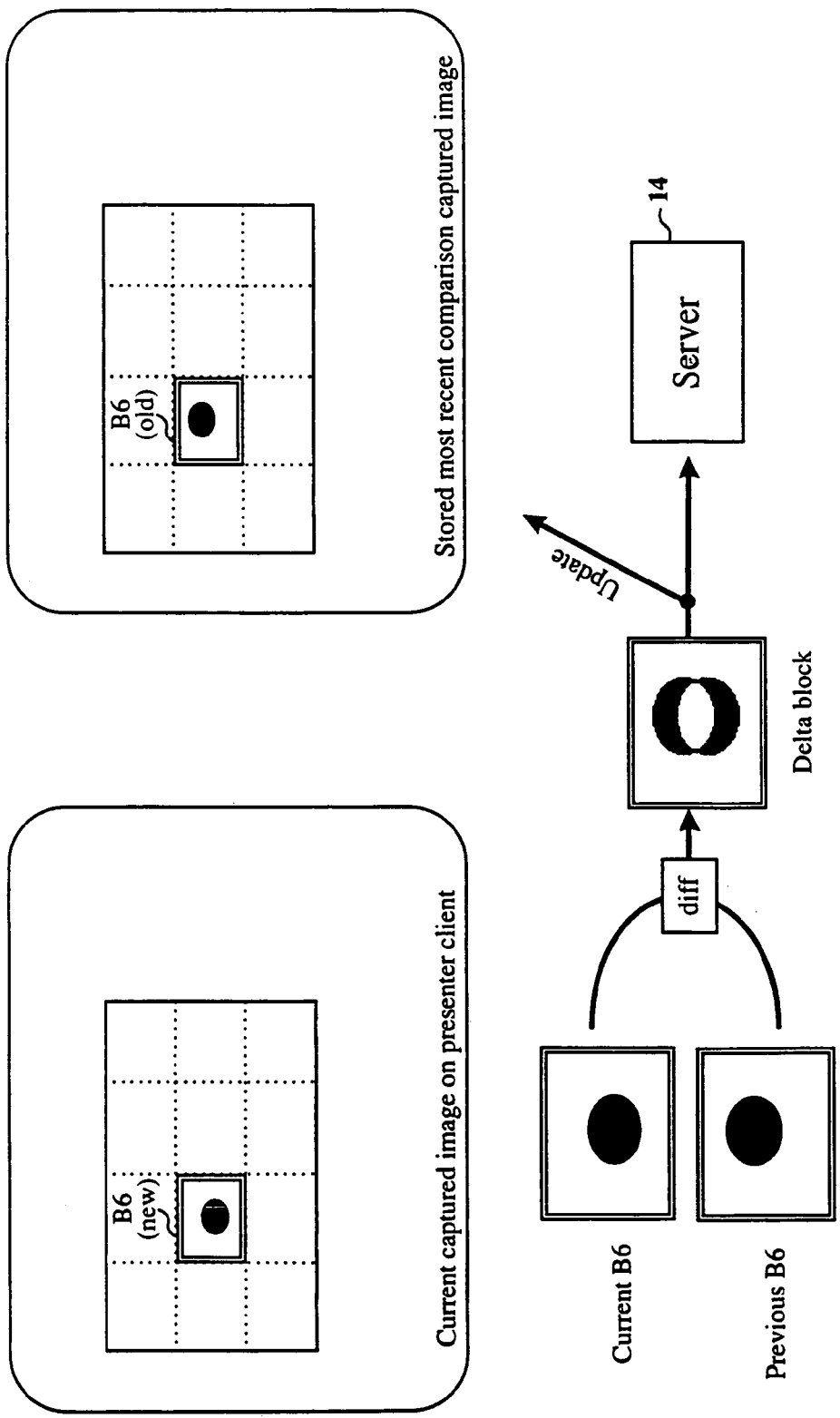
FIG. 4E is a logic diagram illustrating the updating of the stored old image in various formats with a new delta block by the presenter client, and the transmission of the changed information to the conference server.

FIG. 4E shows the corresponding situation when a delta block is sent.

Obviously many combinations can occur that would provide additional savings under some load conditions. Thus the stored comparison may be a collection of base blocks, either from the same capture event or not, an array of checksums of base blocks or of delta blocks, a collection of delta blocks, results of compositing delta blocks, etc. or any combination of these.

It is possible to reduce the size of the stored comparison image to blocks which have changed recently and perhaps their neighbors, as long as the full image is stored every now and then.

Each of the modes of comparison and transmission can be altered dynamically; for example, one heuristic is to send a delta block when less than half the pixels in the capture rectangle change, and to send a base block when at least half change.

With techniques that rely on capturing graphics display commands, it is very hard to identify commands that produce overlapping elements of the image. Because of this, it is hard to know when earlier commands can be discarded because their results have been superseded. Therefore, a system relying on capturing commands must send all commands over an error-free network. By contrast, in this system, deltas can be dropped without permanent ill effects.

The foregoing assumes that the capture rectangle is broken into a number of rectangular blocks. This decomposition can be changed dynamically to have more or fewer blocks to adapt to changes in the size of the capture rectangle by the presenter as described earlier, or to changing conditions in the loading and capabilities of clients, servers, and networks. Just as the capture rectangle is broken into blocks to improve perceived rate of change, so may the block be subdivided to further isolate just the changed portion of the image. One way to accomplish this is to identify the smallest bounding rectangle of the changed portion of the image, and then to intersect this with the current block pattern. Another is to adaptively redefine the block pattern to best fit the changed area of the image. Other adaptations arise if the geometric assumptions of rectangular capture region and rectangular blocks in this example are dropped.

In general, the system of the present invention is oriented to reduce buffering in order to improve the sense of "live performance." Thus, while the structure of the server and client software could allow a number of captured images to be in the process of traveling from presenter clients to attendee clients at one time, in fact having just two images in the "pipeline" from presenter to attendee at once takes advantage of processing capacity, defeats transient network breakdown, and does not overload end-to-end connection performance. This might be increased to three or four or more images in the pipeline if the network connections are fast, but the clients have slow CPUs.

Figure 5:
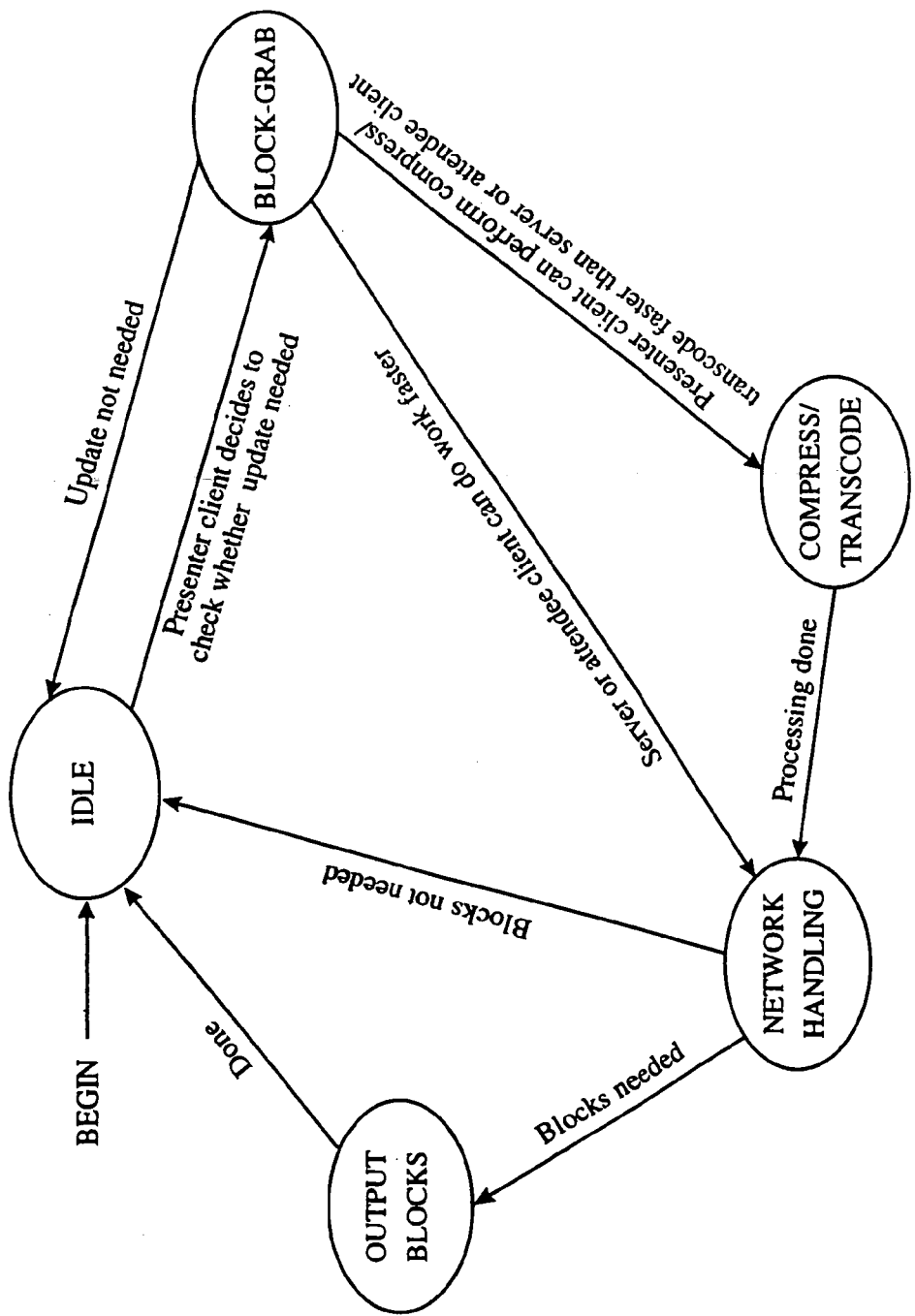
FIG. 5 is a state diagram illustrating the operation of the image capture process of the presenter client software.

FIG. 5 is a state diagram of the presenter client software. The state transitions are described here starting with the IDLE state. The presenter client is in the IDLE state while it is doing other things, such as processing data unrelated to the conferencing software or running another application whose output is to be shared with the attendees. Periodically, the presenter client will check to see if an update to the capture rectangle needs to be sent out. In considering that need, the presenter client conferencing software considers the CPU loading on the presenter client computer, taking into account any limit the presenter might have placed on what percentage of his or her machine's computing resources can be occupied with block updates, the transmission rate of the presenter's network connection (no sense preparing a block update if the network can't handle it), commands concerning flow control from the server (server flow control is described below) and other relevant parameters.

If the presenter client decides to proceed, the state changes to the BLOCK-GRAB state, where the current capture rectangle or a portion of it is grabbed from display memory. A copy of the next most recent capture rectangle is maintained so that delta blocks can be easily generated. In this state, the delta blocks are generated if they are to be used. If the delta blocks indicate that nothing has changed, the computer transitions back to the IDLE state and does not send out the captured block or its delta (which would be blank). Otherwise, the client prepares the blocks which have changed for potential transmission. The capture rectangle is divided into blocks as described above. In the BLOCK-GRAB state, the presenter client estimates the amount of work required to prepare the grabbed blocks for transmission to the server, the attendee requirements, and local hardware capabilities. If the presenter client can perform work such as transcoding much faster than the attendee clients, or even the server, then the presenter client performs that step by transitioning to the COMPRESS/TRANSCODE state. The presenter client might skip this state altogether if no transcoding is to be done and compression is not used (such as where the network connection between the presenter client and the server is much faster than the compression speed of the presenter client).

Either way, the presenter client then transitions to the NETWORK state, where it determines if the capture rectangle still needs to be sent and checks current network bandwidth. Then, the presenter client transitions to the OUTPUT state where the blocks are output, either as base blocks or as delta blocks, either compressed or uncompressed. The presenter client then returns to the IDLE state where the process repeats after a time.

In the case of displays that support multiple layers in applications or in the interface through multiple frame buffers or reserved areas of memory, the system can capture from one or more of the layers, in coordination or independently. If the client has multiple monitors, then the system can capture from some or all of the displays.

In general, the presenter client sends out a stream or streams, which can vary in format over time. The presenter client can also imbed command messages into a stream, such as a command indicating a changed color map, a pointer icon position, or a presentation hand-off command; such commands can also be sent in a separate communications channel. Capture can also occur in buffers for other purposes than screen display. Streams other than the shared-screen conferencing stream (outlined above and described in more detail below) can carry information to allow shared or broadcast text chat, audio, video, drawing, whiteboarding, and other communications. These streams are subject to and can enjoy the same or similar load/need analysis and balancing methods and mechanisms.

Other Client Features and Behavior

When a new conferee joins a meeting or before, the conferee selects a personal icon and a characterizing sound (a "gong") which will be the icon and gong that other conferees will associate with the joining conferee. Icons and gongs can be created using well-known techniques for creating icons and audio data. When a new conferee joins a meeting, the conferee client sends his or her personal icon and gong to each other client, via the conference server. The new conferee is then "announced" by the gong. The personal icon of the joining conferee is also added to a conferee icon list maintained on the server or at each client. If another conferee chooses to have the icon list displayed at his or her client, the entrance of the joining conferee can be noted when the new icon appears on the icon list. Other personal information about the conferee, such as name and electronic mail ("email") address may be provided by the conferee and made available to other conferees via the server. As described earlier, the visibility of icons, audibility of gongs, access to personal information, and so on, may be based on the key the conferee used to enter the meeting, on the identity of the conferee (by network address or otherwise), or on a combination of these and other validators.

The presenter can "go off-air," i.e., suspend or pause the image capturing process and can "go on-air," i.e., resume the presentation at will. The network connections can be maintained during the off-air period, but no changes will be sent to the server. Similarly, an attendee can request to be off-air, and no changes will be sent or scheduled by the server during the off-air time.

If clients are so configured, conferees can be given lists or iconic representations of the participants in the conference, as mentioned above. Those conferees that are presenting, those who are off-air, and those who are requesting to present can be marked. Various subsets of conferees, for example those in side-conversations, those in other meetings, those connected to a particular server, and in general those selected by some property of the system's current configuration, can also be marked. The visibility of the lists and the presence of any markings may be controlled by users, administrators, or others, based on privileges or other criteria. In addition, graphical representations of a meeting or part of a meeting, or of several meetings, may be available for display, depending on privileges.

If the presenter client computer represents images with a varying color map or palette, then the presenter client will send out color map information when the color map changes, so that the attendees observe the same color scheme as the presenter. Color map changes can occur on the presenter client display system as the presenter opens, makes changes in, or closes a program, either in a window that overlaps the capture rectangle or in a window beyond the capture rectangle used for his or her own private work.

When a change in a block is detected, the resulting changed block (base or delta) may be compressed, making use of any special hardware (for example, a Digital Signal Processor (DSP), often found on MPEG boards or set-top boxes), if it is available on the client computer. The compression codec may be lossless, or some information may be lost in compressing and decompressing ("lossy" codec) if the particular application and users of the system can tolerate that and wish to take advantage of possibly better performance.

To ensure good usage of the network, the images are captured and compressed before the network is available to send them, if possible. Without this, the network might be under-utilized. On the other hand, if an image is captured and compressed too early, the attendees will not see the most up-to-date information and this will reduce the efficacy of the visual component of the meeting. To achieve this good balance between system utilization and the perceived response time as seen (and possibly heard) by the meeting's attendees, the client software uses a pipeline to ensure a flow of information is always available at the network, with flow-controls to ensure that image capture and any transcoding (including compression) are never too far ahead or behind in order to balance the load among presenter client, attendee client, and conference server. Flow control is described in more detail below.

The number of blocks and the order of comparison and modification can be automatically determined by the server or set by the presenter. Thus, if conferees usually work with text reading from right to left, a right-to-left updating might be more appropriate.

The size of the window displaying the shared image on the attendee client need not match the size of the image sent from the presenter client in linear measure or in pixel measure. If the window is smaller than the image, the attendee can be given scrollbars to allow navigation around the shared image. It is also possible to configure the transcoding to scale the size of the image received by the attendee client.

Figure 6A:
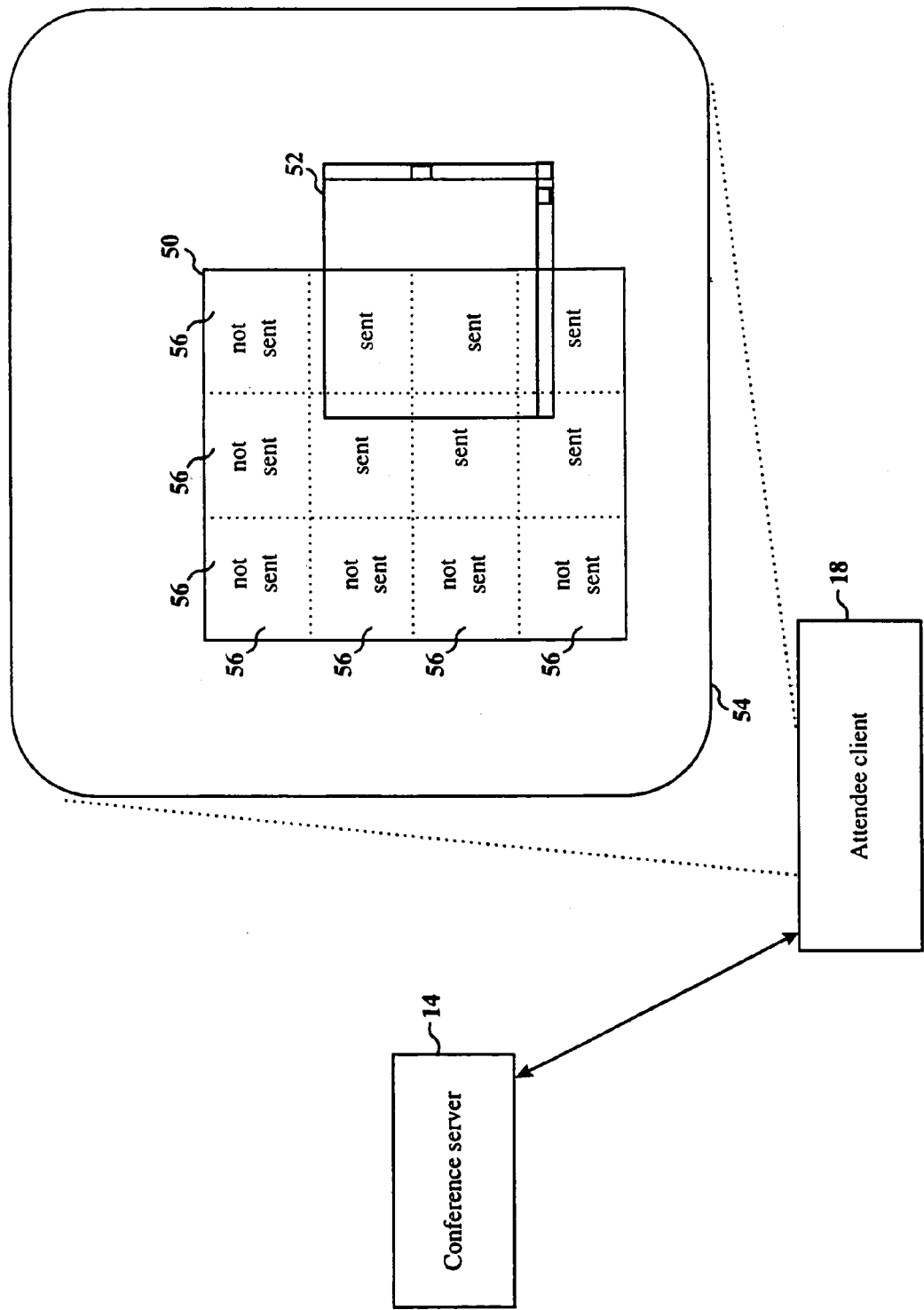
FIG. 6A is a diagram showing attendee client block clipping.

The attendee client can also display the shared conference image automatically matched in size to the capture region set by the presenter, if the attendee desires and the attendee client computer is capable of such display. If the attendee client is displaying less than all of the image, the bounds of what is being shown at the attendee client can be communicated to the conference server so that the server can avoid sending blocks beyond the boundaries of the attendee's window. These blocks are not sent until scrolling requires them or they are otherwise demanded by the attendee. This point is illustrated in FIG. 6A, where an original image 50 as represented in the display coordinates of a screen 54 of attendee client 18 exceeds the size of a window 52 dedicated to its display. Scrollbars are included with window 52 to aid in navigation. Blocks 56 are not transmitted from server 14 to client 18 until the scrollbars are used or the window is resized to request the display of more of image 50.

Figure 6B:
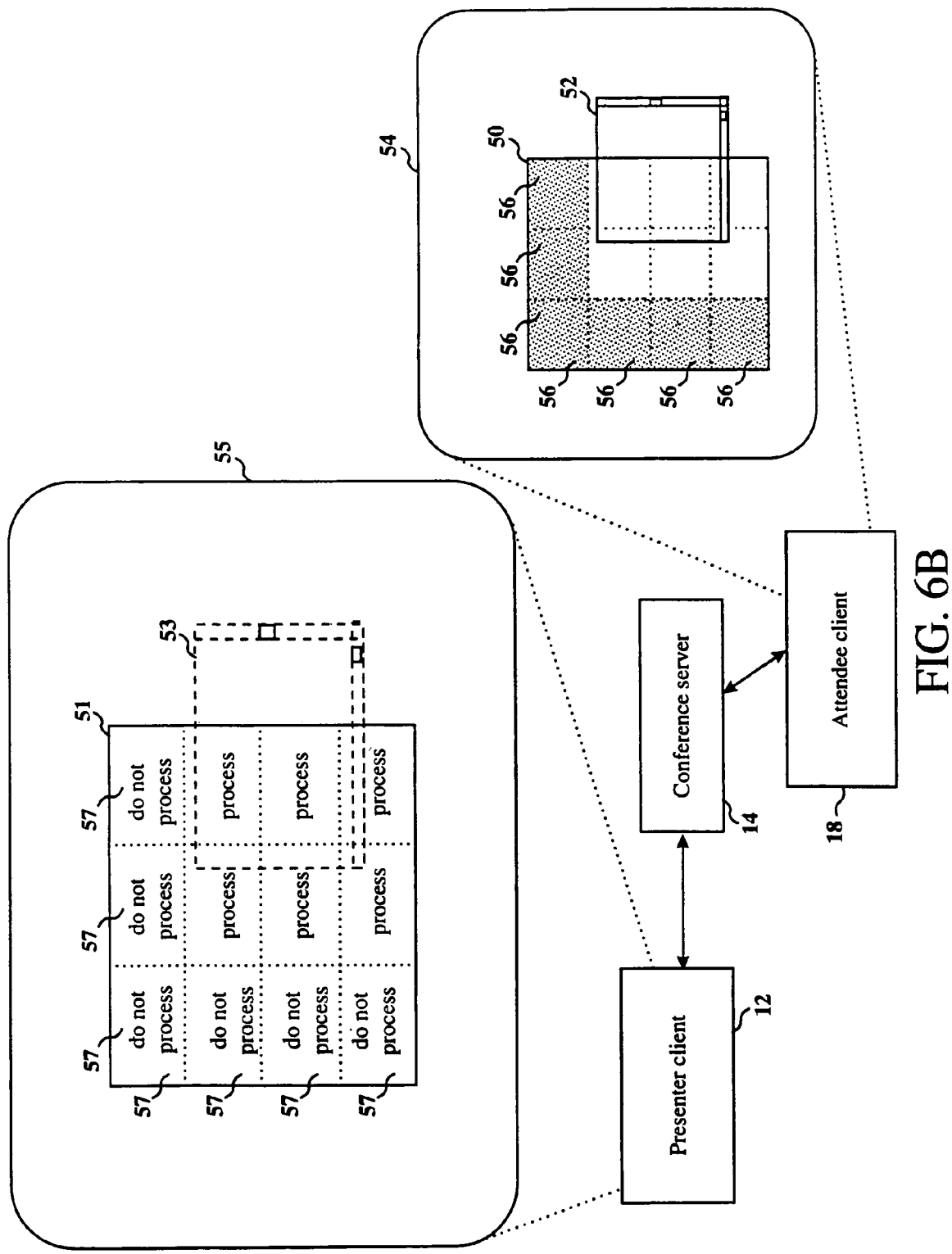
FIG. 6B is a diagram showing presenter client block clipping.

This "clipping" of unneeded blocks can be propagated back to the presenter client by the server if appropriate (for example, if there is only one attendee), so that the presenter client does not have to process all blocks in the capture rectangle. This is illustrated in FIG. 6B, using the same attendee configuration as in FIG. 6A. In FIG. 6B, the presenter client 12 knows from conference server 14 that the shaded blocks 56 shown at the attendee screen 54 of attendee client 18 are not displayed in attendee window 52, so there is no need to capture or compare the corresponding blocks 57, marked as "do not process" in the representation 51 of the capture rectangle, which is displayed on presenter client screen 55 and shown with the an overlay 53 that corresponds to attendee window 52.

The shared conference image, text boxes, messages, control buttons and menus, and other graphical elements may be grouped in a single window or split among several windows on the client's display.

Figure 7A:
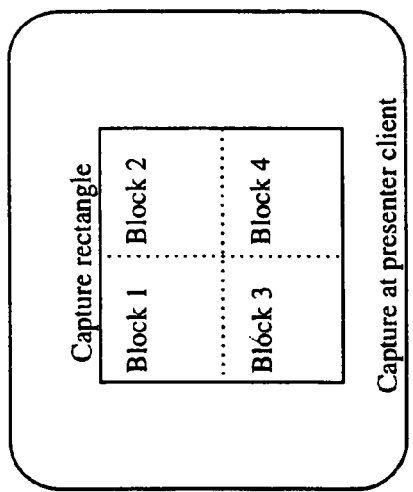
FIG. 7A is a diagram illustrating the client consistency setting.

Consistency is a property of the display that can be chosen at the cost of somewhat reduced perception of image update speed at the attendee client. Both the server and client can be constrained to be consistent; server consistency is discussed below. FIG. 7A gives a simple example of client consistency. An entire capture rectangle with four blocks is sent by the system, and the client waits until all four blocks are received before displaying them. Thus, the entire screen represents the same picture to the attendee as that seen somewhat earlier by the presenter. With consistency turned off, each of the four blocks is displayed as soon as possible, which leads to blocks from a previous transmission being seen alongside newer blocks, so the screen picture, at least for a time, is not consistently one that has been viewed by the presenter.

When a presenter makes a change to the part of screen that is in the capture rectangle, a signal can be given to the presenter client via the server when all attendee clients have received the update that results from the change. The presenter is then assured that all other conferees have seen the change he or she has made. An example of how this can be accomplished is given by the following. The conference server is aware of the geometry of the capture rectangle and the blocks are constantly scanned from left to right, starting at the top and moving toward the bottom. Thus the block in the lowest rightmost position signals the end of data from a particular rectangular capture by the presenter client. Since this block may not have changed and may never arrive in the server's input queue, a flag may be set by the server to indicate which block is last when a block from a new capture arrives before the last block has been sent to an attendee client. If neither of these two mechanisms works, the presenter client can add a message via the server to the attendee client stating that the rectangle has been finished. Thus the attendee client can respond when it has received the entire rectangle.

In addition, a signal can be generated by the presenter client when the presenter has made no change for some set period of time or number of capture cycles. This can be relayed by the server to attendee clients, so that attendees may know that after the appropriate captured image is received, what they see is also representative of what the presenter currently sees.

If the connection to the server is lost, the client can notify the conferee and may then attempt to reconnect to the conference session, using saved parameters. The reconnection may be to a different server, as described later.

In the above description, "client" has referred to a computer system comprising hardware, an operating system, and applications software, possibly or specifically including the software necessary to participate in a conference or communication session according to this invention. All of the described operations also apply to the case when one or more users are running two or more instances of the client conferencing software on the same computer platform. This might occur when a user wishes to be a conferee in several different conferences simultaneously, or even multiple conferees in the same conference. For example, he or she can be a presenter in one conference and an attendee in another. A single person can have different identities in each client instance, so that John Smith may be known as "John" in one client instance and "Mr. Smith" in another. Two people might be using the same computer hardware alternately, and both can be participating in different conferences, or in the same conference as different conferees. The capture region of a presenter in one conference may include attendee displays from another, or this "chaining" feature may be prohibited by the system.

Another example of several clients running on one CPU occurs when several users are connected through terminals (e.g., X-terminals) to a host computer which is running the client software for each user.

If a user has a multiprocessor platform with several CPUs, then the system's client software might be configured to use two or more CPUs for the functions of a single client during a communications session.

Server Operation

This example of operation of the invention is based on sharing computer screen images; other stream types may be handled in a similar manner with similar logic, methods, and mechanisms. This is but one possible method of making the server.

At the server, a queue of data packets is maintained and is filled from an input filter and drained by output filters, one for each attendee client. The input filter and each output filter can run at its own speed. An output filter feeding a client connected over a slow network will not send every packet from the queue, but will skip over old information. This filtering process is complex, especially when the data packets represent changes from one image to the next (delta) which must be composited together in order to skip over delta blocks. This is the technique that allows the server to work with any speed network and mixed speed clients in the same meeting. The server data handling processes are described in more detail below.

The server also handles control messages, such as a request to join a meeting or a message from a client signaling that it is attempting to reconnect to a meeting after losing its connection; reconnection requests can also come from other servers when multiple servers are involved (multiple server situations are described in more detail below). The server accepts connection requests and verifies that the user of the client software is authorized to join the meeting. For each client connection, an icon and gong characterizing the user are sent to the server and then to all conferees by the server. If a non-presenting attendee desires to become the presenter, the attendee client software signals the server and a message or signal passed to the presenter client is conveyed to the presenter to indicate the other conferee's desire.

The server accepts system information from each client connection and notes the client's requirements (e.g., all images must be 256-color images) and capabilities (e.g., CPU speed, available hardware-assist for graphics, compression, DSP, Windows" DDB available). From the system information, the server assigns the client connection to an appropriate "output filter class" as explained below. During network communication with a client, the server may measure the network response and update the system information. As required, the server can move a client connection from class to class in response to changing network characteristics so as to keep the clients in a class closely matched.

A special class of output filter sends data to another server instead of a client. This server-to-server capability allows conferences to scale to very large numbers of users. More importantly, it allows for intelligent distribution of work over a network of servers. Unlike low-level data transport layers, such as packet routing using the Internet Protocol ("IP"), servers know the meaning of the data elements they are routing, so the routing can change based on the meaning of the data in the message. For example, if the server knows that data is a delta of a display update and the computing effort required to receive and process each delta is more than a particular client has, the server can decide to not route the data packet to the client or to route the data to the client via another computer (or another process on the server) which will perform some of the necessary processing for the client, in essence to "predigest" the data for a client that needs it. As an additional example, the server can read the time stamps in the data messages, and based on the demands and resources of the clients, the network characteristics, and other information concerning the system, can decide to route the data by alternative or redundant routes through other servers.

Particulars of the Server Data Filtering Process

Figure 8A:
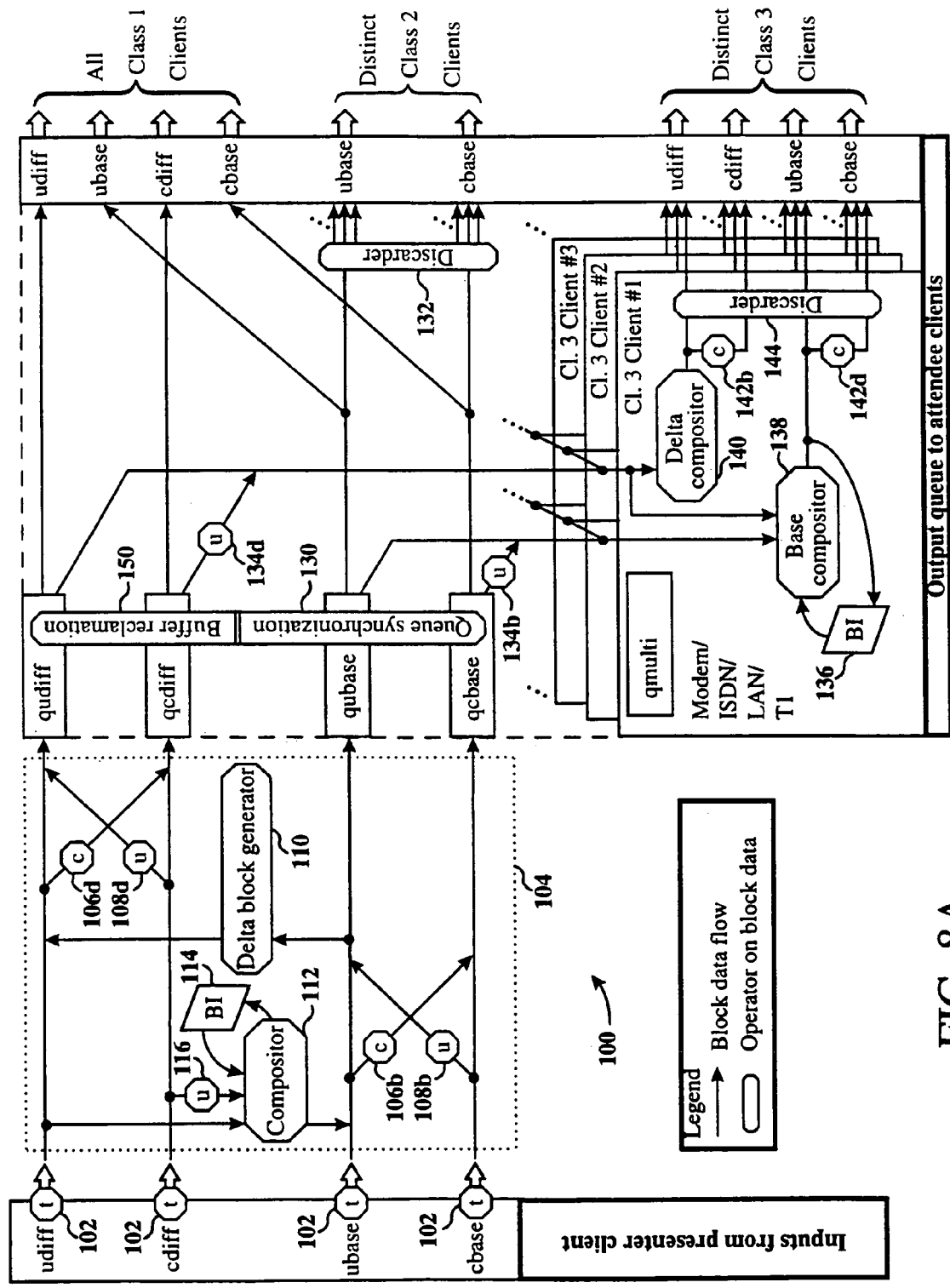
FIG. 8A is a block data flow diagram illustrating the operation of server processes monitoring and filtering a single presenter data stream according to the present invention.

FIG. 8A is a block diagram showing the flow of data in the server processes 100 used to intelligently filter and route one of the input data streams among those that the system may be transporting. As mentioned above, these data streams can be real-time shared-image conference data streams, other data streams which have similar transport and timing requirements, or arbitrary data streams. The example used here is the transport of a real-time shared-image conference data stream.

Generally, a data stream arrives at the server from a presenter client and is routed to each of the attendee clients. The complexity of the diagram is due to the fact that the server must accommodate many clients of differing capabilities. The data stream inputs from the presenter client are shown on the left in the form of a queue; four types of input stream for the example of the shared-image conference are shown, but in the preferred embodiment only one will be active at a time. Possible data stream outputs to attendee clients for the given input stream are shown on the right in the form of an editable queue.

The presenter client can dynamically change the format in which it provides data, based on the presenter client computer's capabilities, backlog, local network congestion, and information provided by the server. The data can arrive as uncompressed base blocks (raw data) on the stream labeled "ubase" if the presenter client decides not to send the differences and decides not to compress the data. If the presenter client decides, based on performance, network bandwidth, etc., to compress the data, it sends the data stream as compressed base blocks ("cbase"). The presenter client can also send the data stream as uncompressed difference (delta) blocks ("udiff") or as compressed delta blocks ("cdiff").

As each data block is received, it is time stamped by a time stamper 102 with either the true time of arrival or a later time of handling (used for when the conference is not a live conference, but is being played back). Time stamper 102 may also simply validate a time of sending stamped by the presenter client.

The data block is then fed to a server queue for that type of data block. The server queues are labeled "qubase" (for uncompressed base data), "qcbase" (for compressed base data), "qudiff" (for uncompressed delta data) and "qcdiff" (for compressed delta data). Since the presenter client provides data in only one data type (although it could provide all four data types, if the presenter had a fast machine, the server was a slow machine and the network between them had excess capacity), and the data type sent can change from time to time, filter 100 uses a queue filler 104 to fill all four queues using just the one data type provided by the presenter client. Of course, if filter 100 notes that none of the attendee clients need a particular data type, that data type can be ignored and its queue eliminated.

As shown in FIG. 8A, the data type which is received can just be routed directly to the queue for that data type. If the received data type is uncompressed, the corresponding compressed queue is filled by running the received data blocks through a compressor 106b (base data) or 106d (delta data). If the received data type is compressed, the corresponding uncompressed queue is filled by running the received data blocks through a decompressor 108b Or 108d. If the received data type is base data, delta blocks are generated by a delta block generator 110, which records a previous base block and differences it with a current base block; it may also reference delta blocks that it creates and stores. Delta block generator 110 is coupled to the ubase stream after uncompressor 108b so that delta block generator 110 receives the base data whether it is sent as ubase data or cbase data. Likewise, delta block generator 110 is coupled to the udiff stream before compressor 106d so that both qudiff and qcdiff receive the benefit of delta block generator 110.

For processing in the other direction, i.e., filling the base data queues having only delta data, queue filler 104 includes a compositor 112. Compositor 112 gets its inputs from a base image frame store 114, the udiff stream and the cdiff stream (after being uncompressed by uncompressor 108d or a separate uncompressor 116). Base image frame store 114 maintains the equivalent of the previous full base frame. As delta frames are received, they are differenced (or, more precisely, "undifferenced") with the contents of base frame image store 114 to generate uncompressed base data. Because the output of compositor 112 is coupled to the ubase stream prior to compressor 106b, the base frames output by compositor 112 can be used to fill the qcbase queue as well as the qubase queue. If the presenter client can switch from base data streaming to delta data streaming without sending an initial snapshot frame as delta data, compositor 112 should be coupled to the ubase stream and the cbase stream (or the output of uncompressor 108b). Of course, the delta queues might contain base data from time to time, such as when a "checkpoint" is done to prevent an error in delta data from being propagated indefinitely.

The data blocks in the (up to) four queues are stored in time stamp order, so they may be viewed as a single complex queue of a data type comprising multiple parallel block entries, compressed or uncompressed, differenced or base. The output of this complex queue can be sent to attendee clients as is, but filter 100 includes several other output mechanisms to accommodate disparate attendee client types. Base frame image store 114 might also be a source of server output, such as when a client requests a full capture rectangle image. This might occur when an attendee client has lost its place, lost its network connection and reconnected, or is joining a conference for the first time.

Although the four output queues can be viewed as a single queue, ordered by the time stamps, there could be up to four different queue entries for each time-stamp value. A queue synchronizer 130 uses arbitration or prioritization techniques to settle any discrepancy between presenter client time stamps and server receipt time stamps.

The attendee clients are classified into one of three classes: Class 1 clients are fast clients on a fast network; Class 2 clients are slow clients on a fast network; Class 3 clients are clients on slow networks and/or slow clients which cannot process and/or receive the data required of Class 2 clients. Each attendee client is assigned to a class, on the basis of announced or measured characteristics of the client and its network connection. Reassignment can occur dynamically as the connection or client loading change, or when requested by the client. A monitor process (not shown) on the server monitors the activity of the output filters to shift attendee clients from class to class if the clients are either too fast or too slow for the class they are in. This is done dynamically, and the characteristics of all clients in a class as well as those in other classes are considered in balancing all classes.

Typically, Class 1 is used for fast attendee clients on a fast network. A Class 1 client receives all the data blocks, from one or more of the server queues. Because a Class 1 client receives all the blocks, the server need not track which blocks were sent to which clients. Some Class 1 clients will be able to decompress compressed base blocks as fast as they get them, and will take the blocks from the qcbase queue. Other Class 1 clients will be able to handle every data block, but only if they are delta blocks.

Class 2 is used for fast network connections to slow machines, such as 386s connected to corporate LANs. A Class 2 client might not be able to process each block, even uncompressed blocks, in which case filter 100 will discard blocks. A block discarder 132 is provided in filter 100 to track which blocks have been discarded for which Class 2 clients. Class 2 clients are provided with base data types (ubase and cbase) and not the delta data types so that block discarder 132 can discard some blocks without any loss of critical information. There is a loss in frame rate when blocks are discarded, but that loss is not as critical as the loss of delta data blocks. In addition, the memory and time required to track dropping base blocks for each Class 2 client is much less than for tracking the discarding of delta blocks. To avoid slowing Class 2 service for all Class 2 clients to the speed of the slowest Class 2 client, one output of block discarder 132 is provided for each Class 2 client. Thus, a faster Class 2 client will experience a higher frame rate as it will receive more data blocks than a slower Class 2 client.

Class 3 is typically used for clients that cannot even handle delta data blocks on a regular basis because of network limitations or client processing limitations. Even though a client might be fast enough to handle uncompressing data blocks, if its network connection is not fast enough to send even the compressed data blocks, the client will be classed as a Class 3 client because not even every delta block can be sent to the client. So that the client can present a conference in substantially real-time if needed, delta blocks are composited by filter 100 so that multiple base and delta blocks can be, in effect, replaced by a single data block. To accommodate the differing needs of each Class 3 client, a separate queue is set up by filter 100 for each Class 3 client. As should be apparent, filter 100 has to do more work for a Class 3 client than for a Class 1 client, so it is to the server's benefit to upgrade clients as their speeds increase or their network connections improve.

Filter 100 maintains a "qmulti" queue for each Class 3 client. Three qmulti queues for three Class 3 clients are shown in FIG. 8A. A qmulti queue receives inputs from the qubase and qudiff queues. Where those two queues are not used, the qcbase and qcdiff queues are used instead, but are first uncompressed using uncompressors 134b, 134d. The delta data blocks and a base block stored in a base image frame store 136 are composited by a base compositor 138 to form one composited base image from a base image and one or more delta images. A delta compositor 140 is used to form one composited delta image from a plurality of delta images. The output of base compositor 138 and delta compositor 140 are then fed through respective compressors 142b, 142d, resulting in four output data streams (ubase, cbase, udiff, cdiff) fed to a discarder 144 which discards data blocks which the attendee client for that qmulti queue cannot handle. If the particular attendee client does not need all four outputs (typically, any one client will use only one output), the processing for those unused queues within the qmulti queue can be skipped, since the queue only needs to service that client. As with base frame image store 114, base frame image store 136 can supply Class 3 clients with full frames upon request or as needed.

Discarder 144 drops blocks based on parameters about the network and client known to the server and to filter 100 as well as parameters and requests (e.g., "slow down," "speed up," or frame rate specifications) received from the client. The dropping of blocks is preferably done on a block-by-block basis, but it can also involve discarding all the blocks in the presenter client's capture rectangle; the related issue of consistency is discussed below. If it turns out that more than one Class 3 client has the same requirements, all but one of the qmulti queues might be virtual queues. In effect, the processing for all the qmulti queues for those similar clients is done once, with each getting a copy of the results of that processing. For example, one multi-client qmulti queue might be handling a plurality of 386-class client machines running over a corporate ISDN line. Other qmulti queues might then supply other similar machines which are connected to the server by modem (e.g., 14.4 or 28.8 kilobyte data rates), LANs, T1 lines, etc. If any of these lumped Class 3 clients deviates from the common requirement, then its virtual qmulti queue would then become a real qmulti queue and would perform processing separate from the other queues. Among all Class 3 output queues, the various separate compositors 138, 140 may have different workloads from the fact that the number of delta blocks composited together and the number of blocks discarded will vary according to the capacity of the attendee clients serviced by the qmulti queue.

The use of more than one output class avoids a slow connection's retarding a fast connection. Filter 100 includes a buffer reclaimer 150 which examines the queues to determine if portions of the queue buffers have already been read by Class 1, Class 2, and fast Class 3 clients, and are not going to be used by slow Class 3 clients (they will be discarded). If that is the case, then buffer reclaimer 150 marks those locations in the queue buffers as reusable, to save on memory space.

Figure 7B:
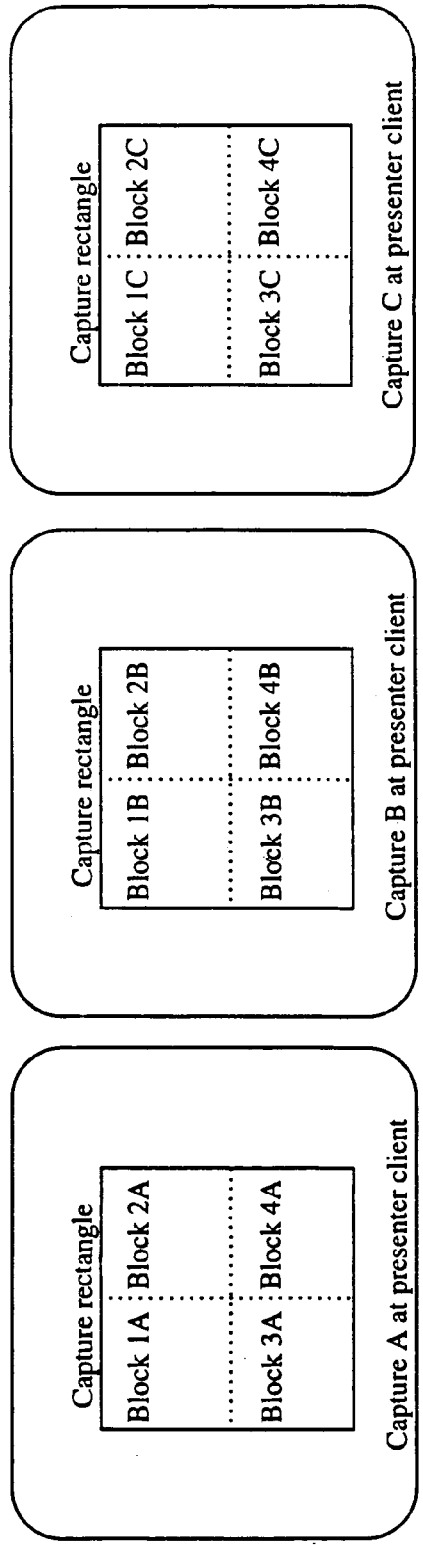
FIG. 7B is a diagram illustrating the server consistency setting.

The different output classes and the monitor processes on each data stream allow the server to handle data streams at different speeds for clients of different capabilities and network connections of different bandwidths. The streaming of update information formed into blocks improves the perception of low latency, but it may be desirable for some applications to reduce the mixture of blocks from different capture events that show on the attendee's screen at one time. The system can be set to provide this consistency by delaying the updating until a whole rectangle can be shown. One form of this adaptation can occur at the server, as shown by the example of FIG. 7B. There, a capture rectangle is broken into four blocks (1,2,3,4). The server maintains a consistency flag which can be either "off" or "on." If the consistency flag is off and the server receives data representing blocks 1A, 2A, 3A and 4A (taken at time A) from the presenter client and is able to send out blocks 1A and 2A, and in the meantime receives blocks 1B, 2B, 3B and 4B, the server will send out 3B as the next block, reasoning that 3B is more updated than 3A so it is a better block to send out.

However, if the consistency flag is on, the server sends the old blocks 3A and 4A anyway, so that the client can maintain a time consistent display. Following 3A and 4A, the server sends blocks 1B–4B and so on. Clearly, consistency requires additional memory and produces added latency. This trade-off is decided upon between the server and the receiving clients, based on a variety of factors described above. If the network, the server and the client can easily handle consistency, then the consistency flag might be turned on, but where display updating happens quickly and there are other constraints on the system, the consistency flag might be turned off.

As described above, the server provides control of information flow to keep fast attendee clients supplied with updates as often as possible, and to avoid sending slow clients updates they cannot use or that will overburden their network connections. The server also provides flow control for presenter clients, as needed, by determining the fastest rate of updating required by attendee clients, and then signaling the presenter client to grab blocks no faster than the fastest consumer can demand them, so that the presenter will not have to waste resources collecting and processing data that no client can use or no network can afford to carry.

Storage Services

Figure 8B:
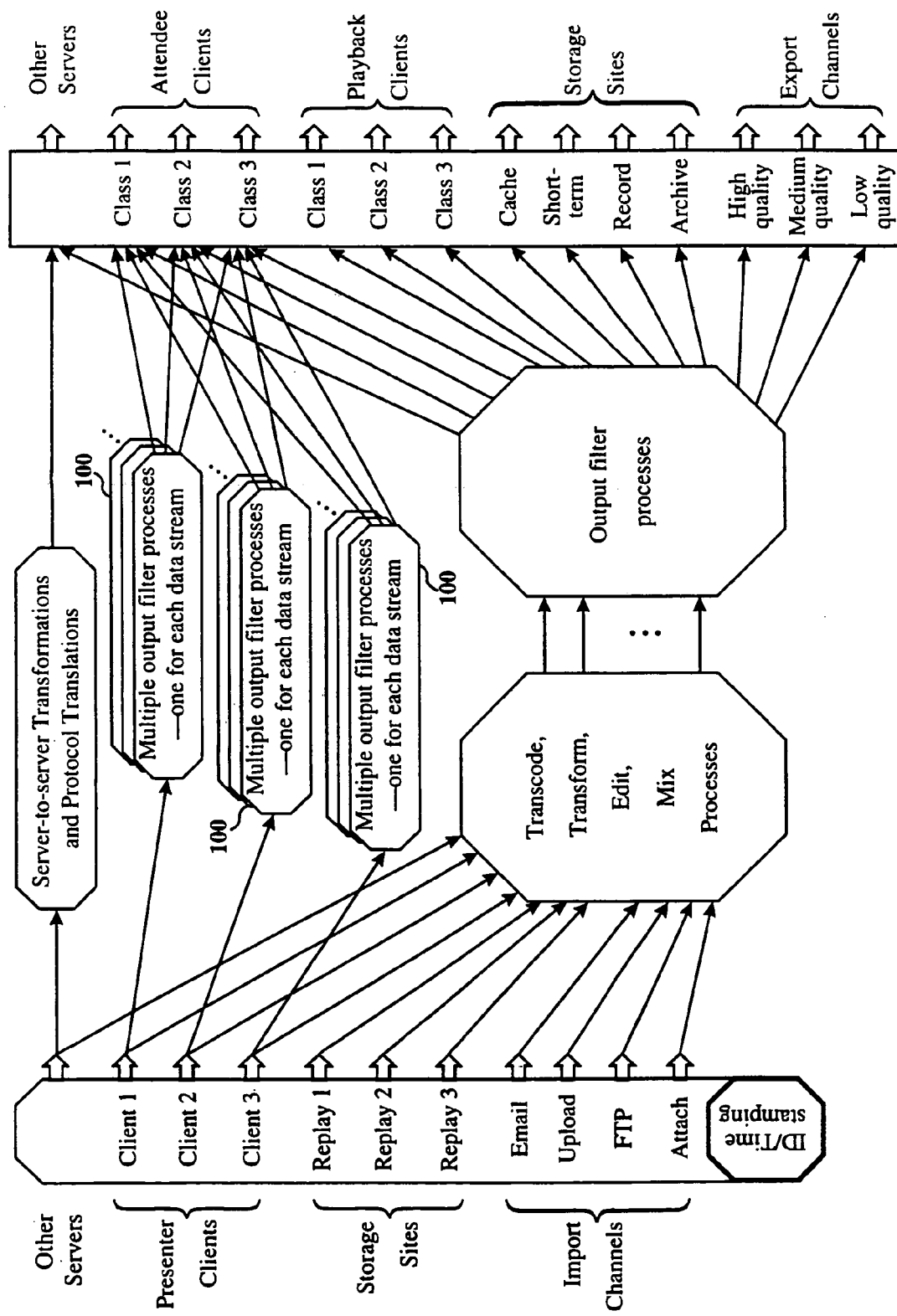
FIG. 8B is a block data flow diagram illustrating the operation of server processes monitoring and filtering multiple input and output data streams according to the present invention.

FIG. 8B illustrates a more complex conference server which handles the more general case. The server in the general case might maintain additional output and additional input queue components for transmitting information to other servers and for storage services, including caching, short-term storing, recording, and archiving, and for later playback. These purposes are distinguished as follows: caching provides fast memory hardware support in improving the performance of the server; short-term storage provides backup and refresh capability for extremely slow or temporarily disconnected clients, for newly connected servers that may need information older than that normally held in the output queue, for quick-turnaround failure recovery, and for other short-term needs; conference sessions are recorded when they are primarily intended for later viewing by users of the system who may or may not be participating in the session; an archival session captures all or part of a meeting as it occurs and is intended for users who typically were conferees in that session and have a reason to review the session later. Uses of recorded sessions, especially when they incorporate synchronized voice, include live online training sessions that also serve for future offline training, technical and marketing demonstrations, and formal presentations that can be broadcast or accessed remotely at will. Archived sessions have uses other than review, including briefing absentees, capturing interactions involving or aiding technical support, evaluating sales personnel, and the like. Of course, these needs and characterizations are not exclusive or exhaustive.

Possible features and methods for storage handling will now be listed. The emphasis will be on recording and archiving, but shorter term storage modes will share many of these characteristics.

During any session, there can be multiple "storage server" queues, or "storage streams," saving output to one or more media. These can be controlled by the server itself, by recorder-like interfaces (similar to a video cassette recorder, or "VCR") at the clients, or by other interfaces operated by conferees. Each stream can be independently controlled, or one controller can control multiple storage streams. The storage facility can operate concurrently in an ongoing meeting to record a live conference, or it can be used by itself to capture a recording for later replay.

It is possible to control who can record a meeting, how much data they can record (by time or by disk capacity, for example); the type of information they can record (by stream, by user sets, or the like), the storage medium (disk, tape, etc.), and when recording starts. Recording might be set to automatically start when a certain user connects, when the first connection is made, when a certain number of conferees are connected, when the first person presents, when a particular person presents, at a particular (real) time, after a particular duration from the beginning of the meeting, or because of some other triggering event. It is also possible to control the end of recording, based on similar triggering events or triggers related to capacity, elapsed time, etc. The controlling can be done by a conferee at a particular client, by a moderator, or the like.

Possible storage targets include local disk files, local database servers or back-ends, remote database servers or back-ends, remote storage engines relying on the data structures, controls, and methods of the system of the present invention (example system architectures are described below), and local or remote permanent storage media (optical, magnetic, magneto-optical, etc.). Permanent storage can also be used by the system to assist recovery from disaster. The storage stream could also be directed to an email message or to another computer application within the system of the present invention or beyond it.

It is possible to control the quality of storage input and playback output. Each storage stream can have an associated quality parameter associated with it so that it behaves as though connected at a particular network speed. Thus a stream might be stored or a playback stream might be produced that was suitable only for replay at a given speed. Or several playback streams could be simultaneously produced from the same stored information for several different particular playback rates. If most or all of the original session data is stored, then replay might perform the same adaptive filtering described in FIG. 8A for real-time "live" meetings, so that the single storage source could be played back at multiple, adaptive rates.

Since there would be added value in being able to access recorded information, it is appropriate to describe how billing controls might be incorporated. Billing could be performed when the original recording is made, or when a recording is played back. Billing might be based on units of time used or on units of storage consumed, at the time of recording or at the time of replay. Billing for recording and playing may be independent. Any tracking that needs to be made to implement the billing functions can be incorporated into the storage and playback services of the communications system.

It is possible to tailor the data stored. Since a conference typically involves multiple data streams, one or more may be chosen for storing. Some streams might go to one storage device or modality as described above, others might go to different ones. Synchronization between streams (e.g., voice and imagery) can be maintained, even when the streams are stored in different places and ways.

Stored information can be replayed through another communications session established by the system according to the present invention, or it can be sent through other communications channels, for example, email, file transfer protocol ("FTP"), or physical media transfer by postal or courier services, etc., and replayed by the recipient using the client software according to the present invention. Stored material might be replayed from a copy local to the user's computer, or it might be retrieved after WWW navigation to a replay-enabled Web site. Retrieval might involve streaming the data in the ways described above, or transferring the data by email, FTP, WWW download, or the like. With Web based retrieval, support could be provided for browsing by content, searching by user-defined keys, controlling access by user-provided keys, access lists, privilege levels, or user-provided payment options (e.g., credit card number on file).

Control modes on replay might include: control by server without user interaction for a single data stream (like a pay-per-view movie in which each attendee who joins gets to see the playback forward from the from the point of joining); control by the server, without interaction but with multiple streams (e.g., all attendees get to see the movie from the beginning regardless of when they join the show); by an external moderator; by VCR-style controls at one or more client computers. Each set of controls can affect either all the sets of streams or a particular grouping of streams. Replay can occur at the original real-time recording rate, at faster-than-realtime (like fast forward play on VCRs), in VCR-style single stepping modes, and in the various reverse modes as well. Random access and jump playback by index marking, by time codes, by presenter, or by other organization could be supported.

In addition to the stored meeting contents, any other document or data object might be uploaded and stored with the meeting (e.g., meeting agenda, minutes of a previous meeting, or supporting materials). Upload is another type of data stream that passes into the system server and is then relayed to a suitable storage entity residing on the same or a different host. Attachments can be retrieved either with specialized functions of the client software, by navigating Web pages and using a Web browser, or by other retrieval mechanism. Attachments are subject to all of the same controls as the recorded meeting contents with regard to access, billing, playback, etc.

The above-described elements of the more generalized conference server concepts are illustrated in FIG. 8B. In addition to the instances of the simple output filter processes 100, the more complex server functions shown in FIG. 8B includes inputs for different sources, such as other servers (where the complex server shown might be an intermediate server for a large broadcast), storage sites for replay and import channels, and outputs to other intermediate servers, storage sites, and export channels.

Multiple Servers

Figure 9A:
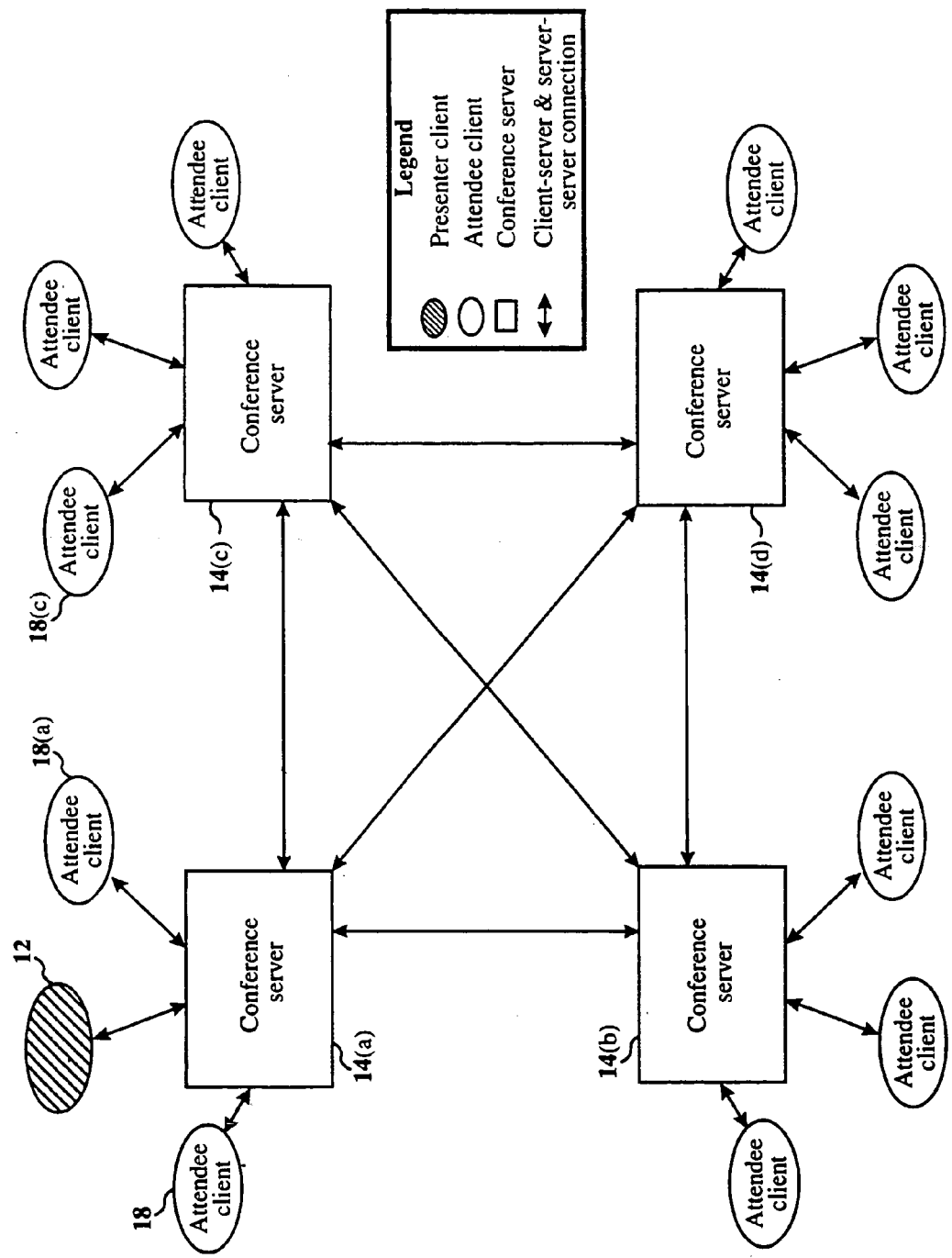
FIG. 9A is a block diagram illustrating interconnections of several communications servers and communicant clients in a single communications session according to the present invention.

Up to this point, the conference server has generally been referred to as a single computer running conferencing software. The server functions described so far may be performed on several different computers running conference server software connected over a computer network. FIG. 9A shows a configuration with four conference servers 14(a)–(d), one presenter client 12, and eleven attendee clients 18 (some of which are separately identified with letters). Three conferee clients are connected to each server. The four servers are completely connected, that is, a connection is shown between each pair of servers. With many servers, this degree of interconnection would be unrealistically complex, expensive, unneeded, and performance degrading. One of many useful techniques, a "tree topology," for interconnecting numerous servers is described below.

There are three classes of advantages from having several servers active in a given conference.

Static advantages result from a configuration and division of tasks that may persist throughout the conferencing session. The following are among these advantages.

(WAN economy and local performance) A conferee may find economy in being able to connect to a nearby server—where nearby may mean geographic closeness, or in the same network service area, or on the same local area network, or the like. Thus in FIG. 9A, attendee client 18(a) may find it cheaper to connect to server 14(a) than to server 14(c), while in turn client 18(c) may find it cheaper to connect to server 14(c) than to server 14(a). At the same time, there may be better performance of the system with these local connections compared with a longer path with many hops to a more distant server.

Figure 9B:
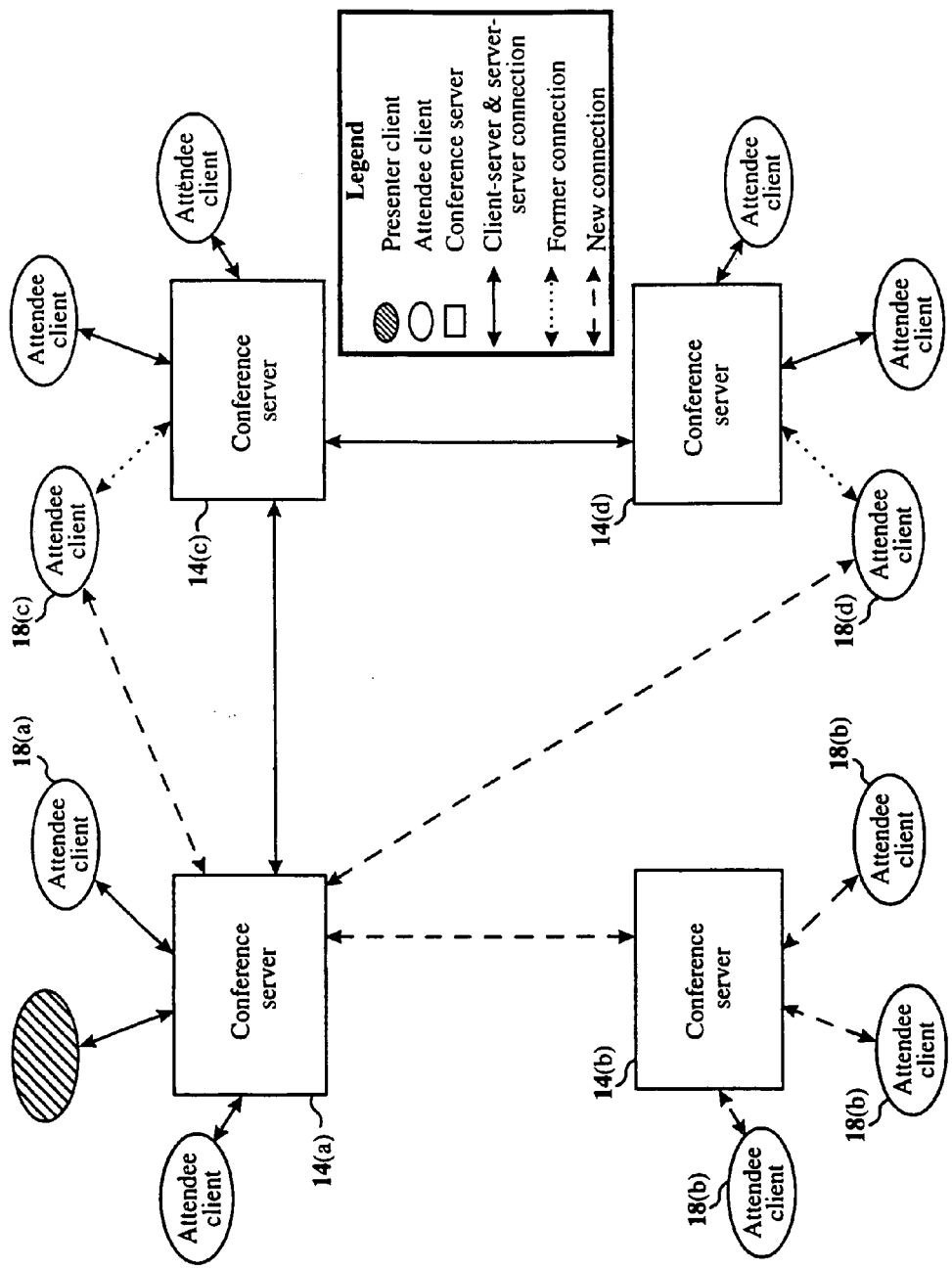
FIG. 9B is a block diagram illustrating interconnections of several communications servers and communicant clients, including migrated and recruited connections, in a single communications session according to the present invention.

(Client migration and homogeneous concentration) The advantage of having all of a server's attendee clients be the same and additionally of having them be the same as the presenter client has been discussed. There can be an advantage then of assigning similar clients to a single server when several servers are available and performance is not otherwise degraded. For example, in FIG. 9B, attendee clients 18(c) and 18(d) are identically configured computers running the same operating systems with the same display configurations as the presenter client 12, so both have been moved from their original servers (indicated by dotted arrows) and reassigned to server 14(a), as designated by the dashed arrows. The same advantage may also be found when clients of a server are in the same output class (as discussed above under the single server); thus, reassignment of clients in a given class so that one or more servers have all or most of their clients in that class can improve performance by making those servers' processing loads more uniform. Finally, as described under the discussion of WAN economy and FIG. 9A, homogeneity may also involve nearness, and for this reason client reassignment may achieve that goal as well. In addition to reassigning clients to servers already participating in the conferencing session as above, it is also possible for the system to recruit additional servers where these resources are provided but not yet assigned to the particular meeting. Thus, server 14(b) may be automatically connected to the server—server structure for the meeting pictured in FIG. 9B in order to provide connections for the three clients 18(b).

Figure 10A:
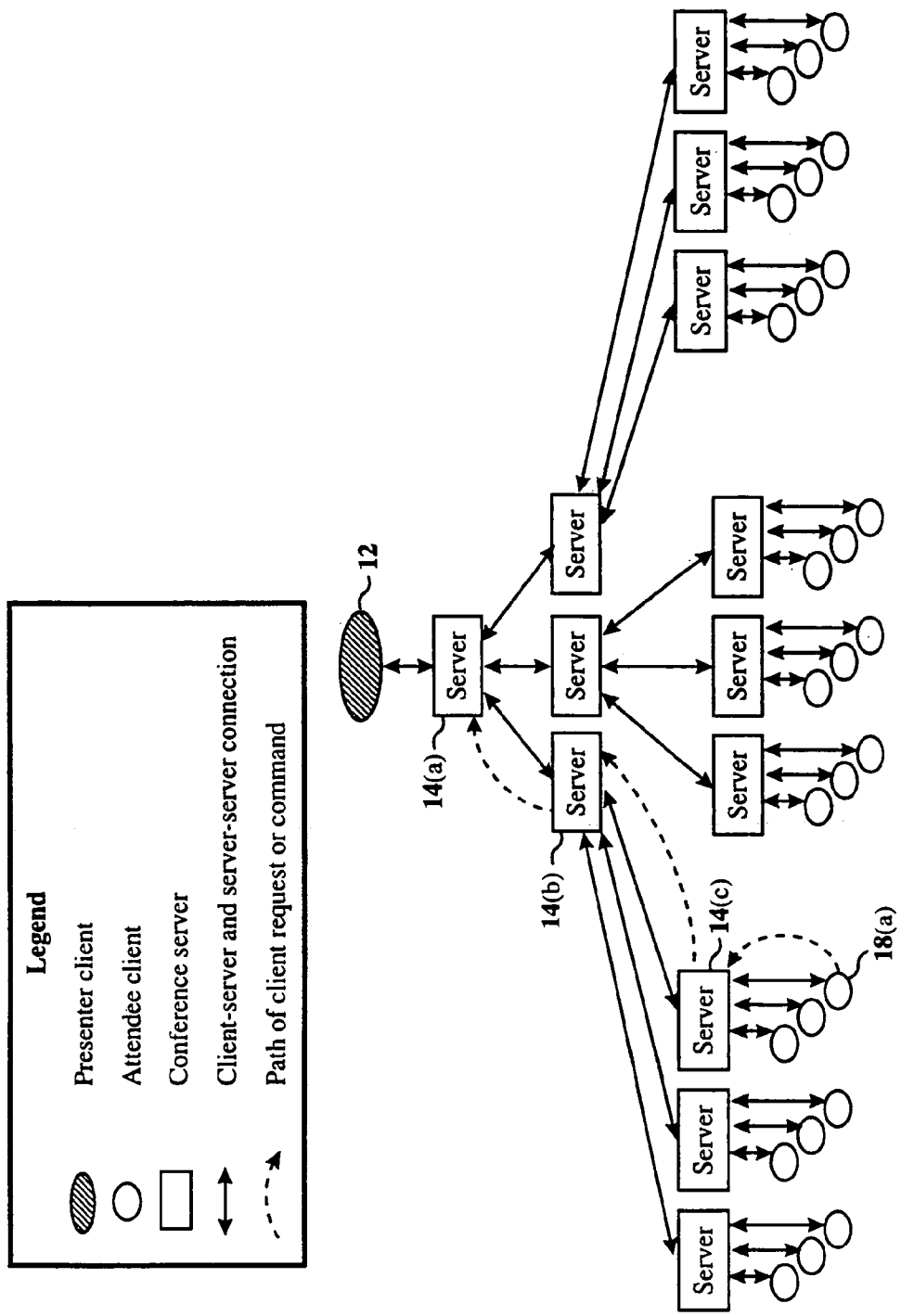
FIG. 10A is a block diagram illustrating a multi-layered tree topology for connections of several communications servers with communicant clients in a single communications session according to the present invention.
Figure 10B:
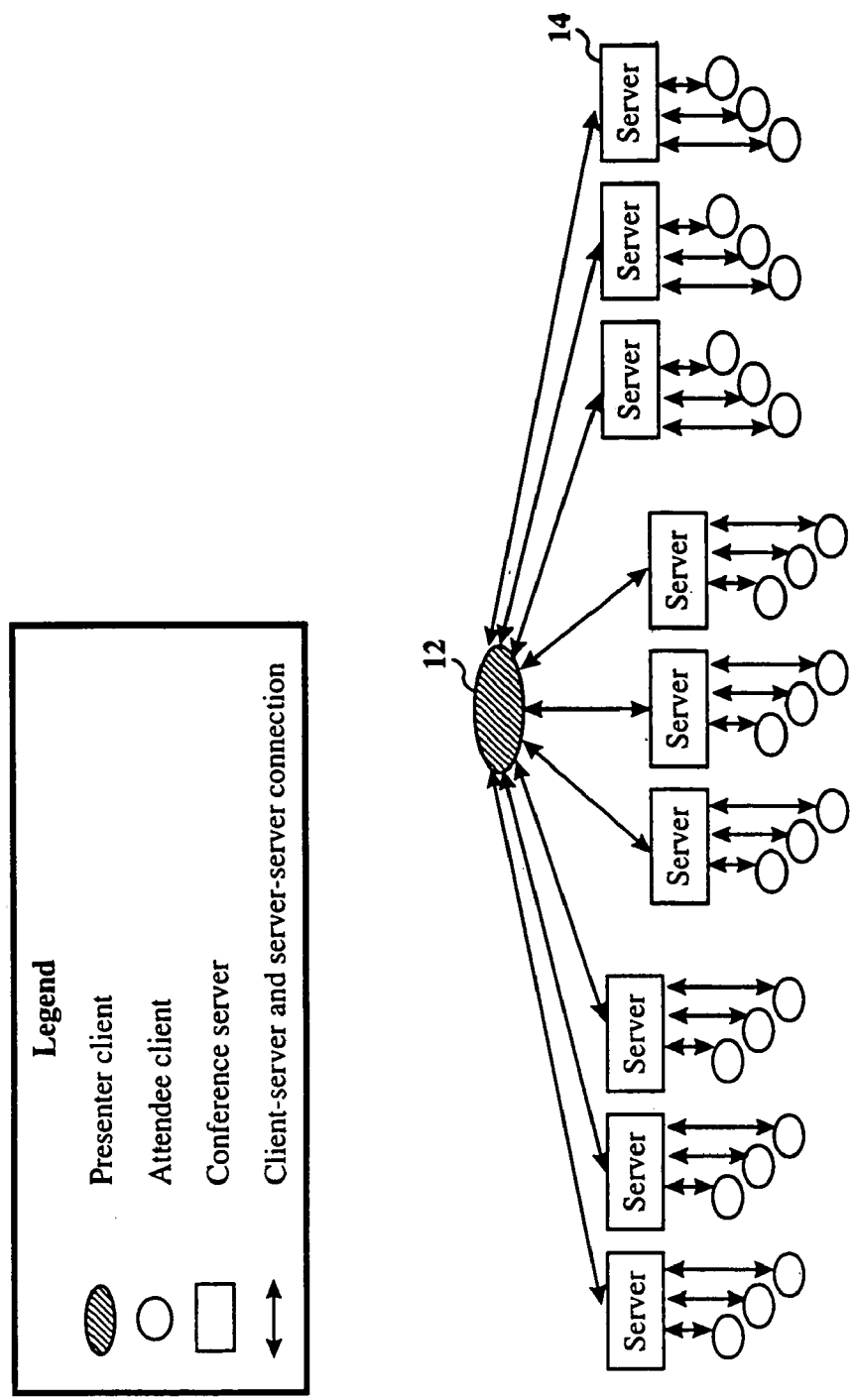
FIG. 10B is a block diagram illustrating a single-layer tree topology for connections of several conference servers with communicant clients in a single communications session according to the present invention.

(Tree branching for load reduction and scalability) In FIG. 10A, a tree topological configuration can provide economy in traffic handling and improved performance. Information from presenter client 12 is communicated to server 14(a) and then to the other servers and on to attendee clients 18, following the solid arrows. In this configuration, each server is shown handling four data connections of a single stream type; a single server would have to handle twenty-eight data connections to connect the presenter client to all the attendee clients. If attendee client 18(a) issues a command or request to server 14(a), represented by the dotted arrow, the message will be responded to by server 14(c) or passed to server 14(b), and handled there or in turn passed to server 14(a), with these two paths also shown with dotted arrows. This means although some commands or requests may need to be seen by three servers, each server will see and process only a fraction of the total such messages. Just as the tree configuration allows a given number of conferees to hold a meeting more efficiently than with a single conference server, it also means that relatively few extra servers need to be added to expand the meeting and maintain the tree configuration. For example, if R+1 is the number of data connections per server, and ceiling(x) is the smallest integer greater than or equal to a real number x, then the number of servers S is required to hold a conference with C conferees, assuming one presenter and using the tree configuration, is (R^ceiling($\log_R$(C−1)/(R−1)). In particular, using R=3, which is the value in FIG. 10A, forty servers will suffice for eighty-two clients. More realistically, if R=100, then 10,101 servers will provide the advantages of the tree configuration to a presenter and one million attendees. This takes only 101 extra servers over what would be required if the presenter client were directly connected to 10,000 servers, each of which served 100 clients. But the latter configuration, exemplified by FIG. 10B with R=3 and C=28, is not realistic, since presenter client 12 would be deluged with independent commands or requests to update, or resend, or similar messages; in other words, the presenter client would have traffic in excess of the capacity of any server 14. Based on distributing the server functions over many machines, and employing this tree topology for propagating information among servers, server-to-server communications and management provided by the present invention allow the number of participants in a meeting to increase exponentially with only linear degradation of the performance. Similar analysis applies if server capacities are not uniform, that is, if different servers can handle different numbers of data connections.

Adaptive advantages result from reconfiguration and redistribution of tasks in response to relatively long-term changes in the system during the conference session.

Figure 9C:
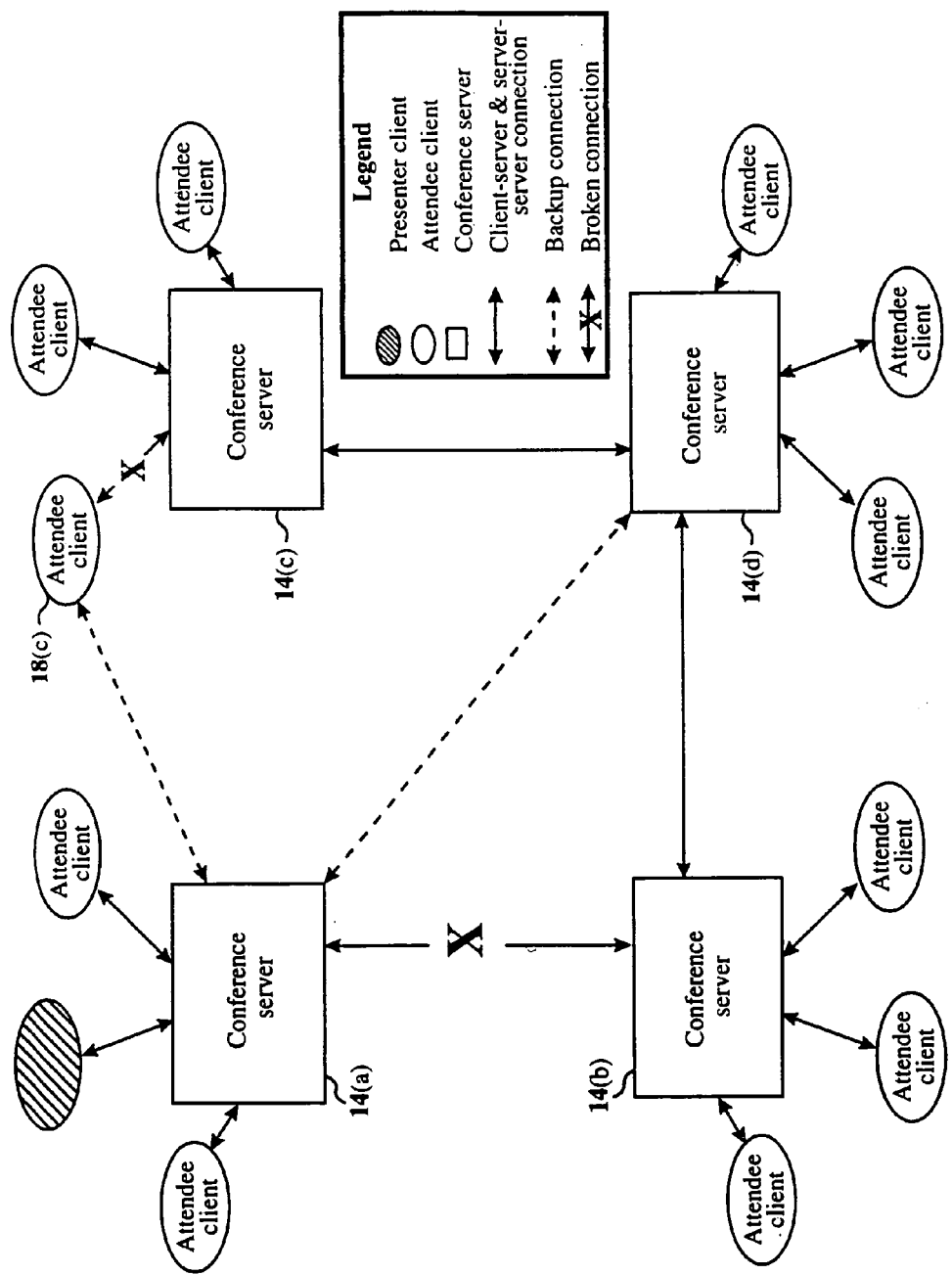
FIG. 9C is a block diagram illustrating interconnections of several communications servers and communicant clients, including backup connections for clients and servers, in a single communications session according to the present invention.

(Backup server) If a server fails or becomes isolated from the network, then its clients may be connected over previously inactive backup links to other servers. Attempts can be made to reestablish communication with a server that has dropped out. If unsuccessful, its workload may be distributed to other servers. In FIG. 9C, attendee client 18(*c*) has conference server 14(*c*) as its principal server, but the dashed arrow indicates the assignment of server 14(*a*) as a backup server. Should the connection between client 18(*c*) and server 14(*c*) fail, as indicated by the "X" on the arrow between them, or should server 14(*c*) fail or become isolated from the net, then server 14(*a*) can respond to commands from and provide updates to client 18(*c*). Presenter clients and servers themselves can be assigned-backup servers as well. Thus the dashed arrow between servers 14(*a*) and 14(*d*) indicates that each has been assigned as a backup for the other. Should the link between servers 14(*a*) and 14(*b*) fail, as indicated by the "X" on the arrow between them, or server 14(*b*) fail or become isolated from the net, then server 14(*d*) can take over traffic previously routed to server 14(*a*). It is also possible to have servers ready, but not active, as backups, or to have mirroring servers for even more secure redundancy. Since the state of the conference can be announced to all servers, the system may be configured so that a disrupted conference session can be robustly resumed with minimal loss of data and time.

Figure 9D:
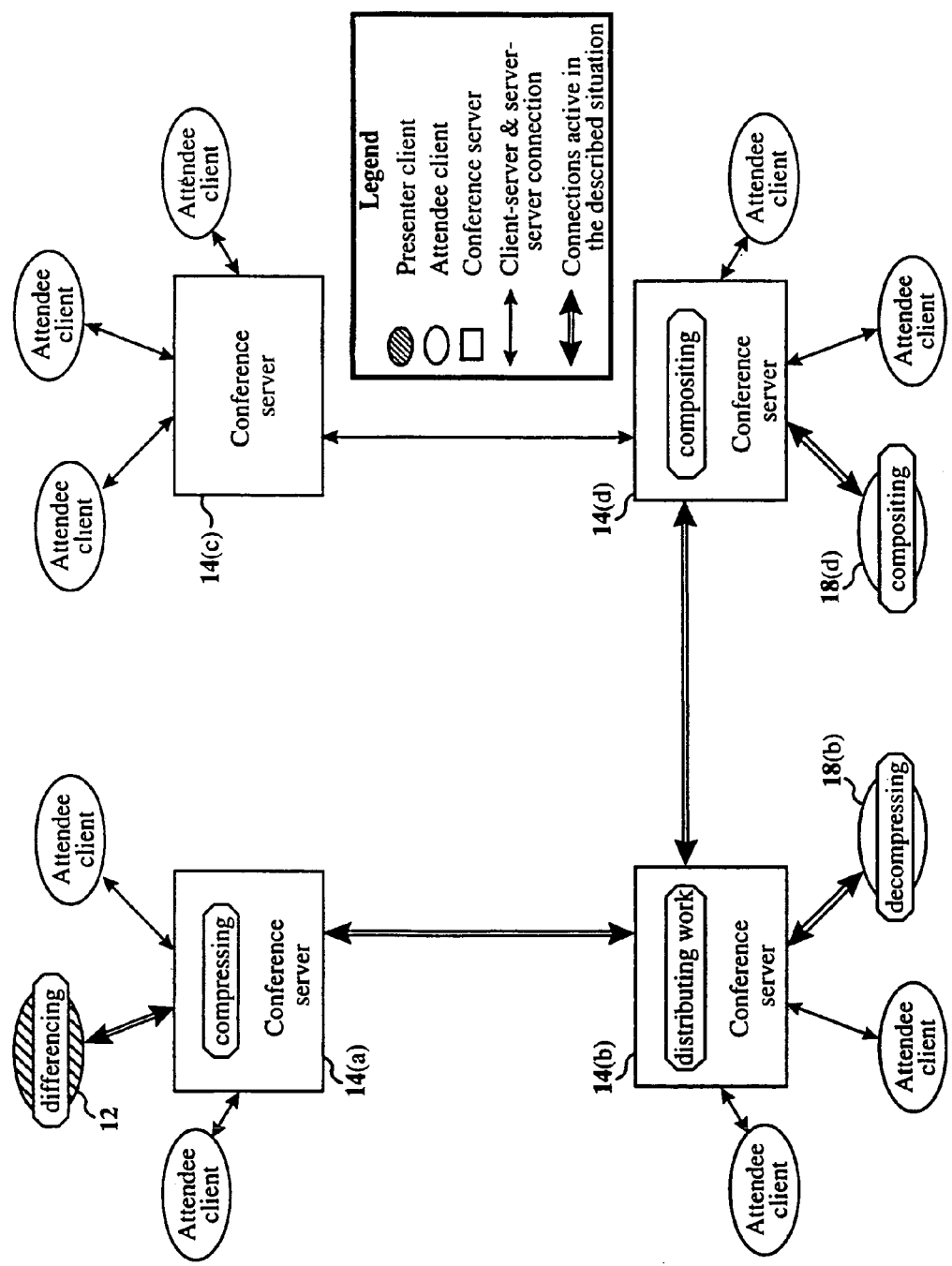
FIG. 9D is a block diagram illustrating interconnections of several communications servers and communicant clients, including decomposition of transformation sequences and functional delegation, in a single communications session according to the present invention.

(Transformation factoring) The transformations or transcodings that a block may undergo in transit from the presenter client to an attendee client may include differencing, error-correction encoding or decoding ("source coding"), compression or decompression (both for "channel coding", or just one for purposes of bandwidth matching; lossy or lossless), encryption or decryption ("privacy, security, or authentication coding"), compositing with other differences or with base blocks, conversion from DDB to DIB and back, storing, replaying, copying, or the like. Editing, mixing data from different sources or presenters, mixing data of different kinds, duplicating, changing the order, the format, the storage or playback quality, etc., are other examples of transformations, which are neither exclusive nor exhaustive. Some or all of these may be performed and the order of performing them may change. As previously discussed, some may be performed by a conferee client, some by a conference server. When several servers are available or when several clients have different capabilities and resources, these functions may be delegated or migrated to different machines. For example, in FIG. 9D presenter client 12 is differencing, conference server 14(*a*) is compressing, server 14(*b*) is distributing the decompression task to attendee client 18(*b*) (which has decompression hardware), server 14(*d*) is compositing the resulting delta block with a previous delta block, and attendee client 18(*d*) is compositing the result with an old base block. This advantage is viewed as adaptive, since the loading configuration that makes a particular distribution favorable may change slowly during the conference session, but it could be a static advantage when some machines have much greater capabilities than others (such as compression or decompression hardware).

Figure 9E:
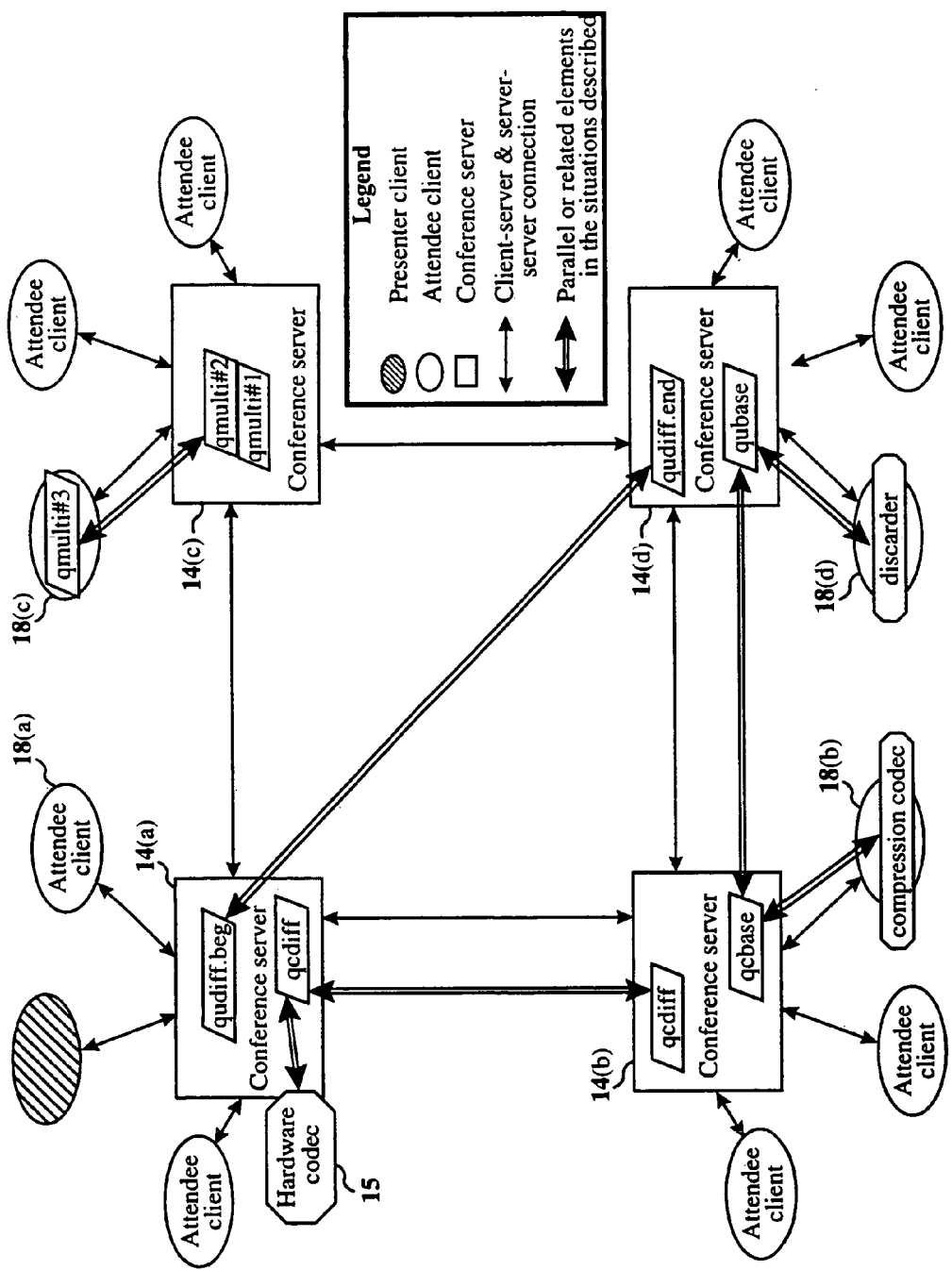
FIG. 9E is a block diagram illustrating interconnections of several communications servers and communicant clients, including distribution and parallelization of output queues and processing, in a single communications session according to the present invention.
Figure 9F:
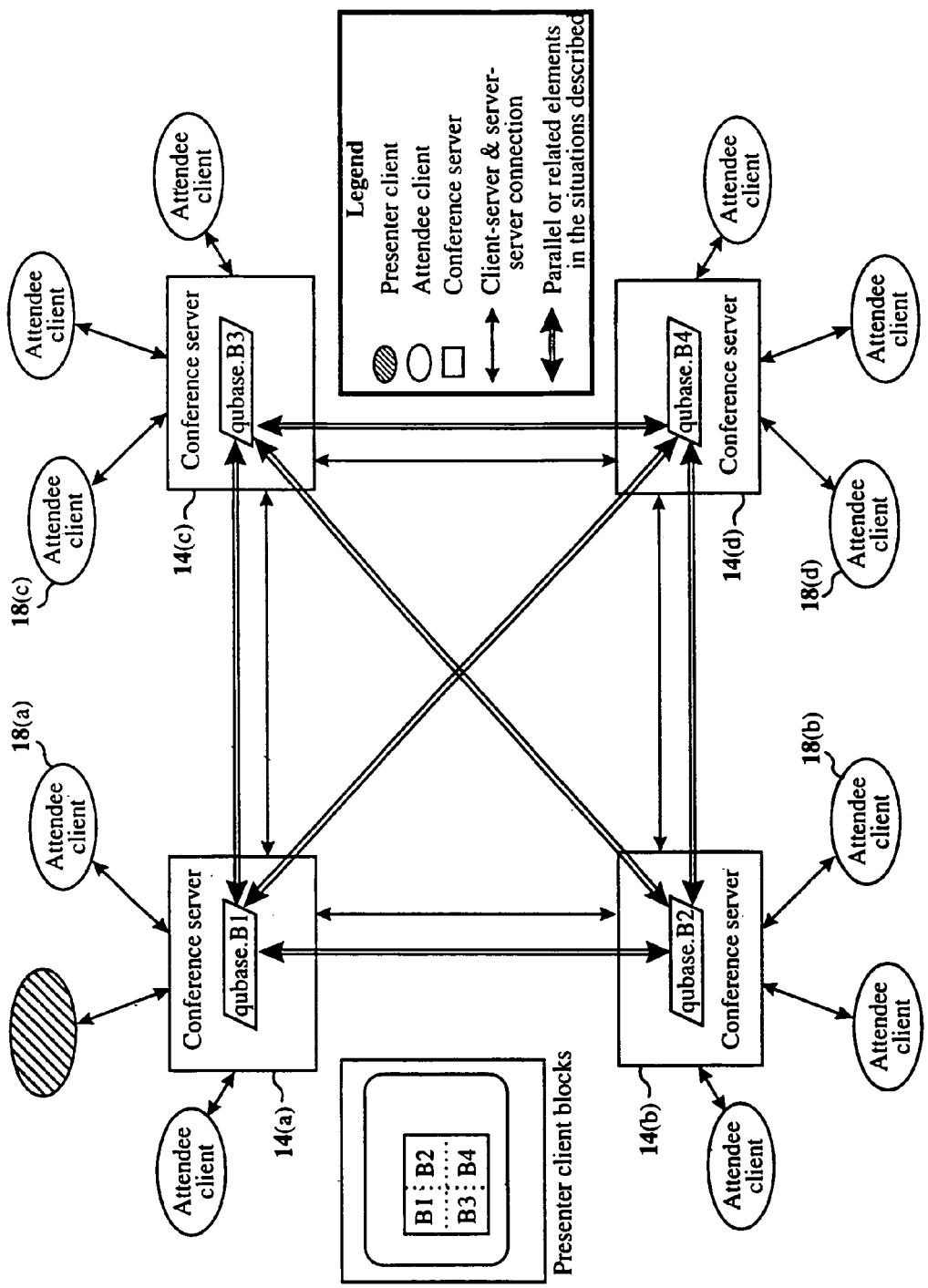
FIG. 9F is a block diagram illustrating interconnections of several communications servers and communicant clients, including distribution and parallelization of output queue contents and processing, in a single communications session according to the present invention.

(Distributed and redundant flow control) The architecture and logic of the filter process as described above and illustrated in FIGS. 8A,B may be distributed among several servers and even clients. Thus, like the functional transformations, portions of the queues themselves, as well as the internal operations of the filtering process, may be found on different platforms at different localities in the network, and at different times. Not only may the information and functionality be so distributed to improve memory economy or gain memory or processing speed, but the system can be made more robust by redundant storage, and more responsive by parallelizing the pipeline. The queues may also be segmented sequentially over several platforms. These different aspects are shown in FIG. 9E. Here, qcdiff is stored redundantly on servers 14(*a*) and 14(*b*); on server 14(*a*), qcdiff uses the special compression facilities provided by an attached hardware device 15. One card of qmulti is stored on client 18(*c*) (perhaps a machine with very fast reliable surplus memory) while the rest are on server 14(*c*). While qcbase is housed on server 14(*b*) using a compression codec (possibly hardware based) on client 18(*b*), it operates in parallel with qubase on server 14(*d*), which uses a discarder on client 18(*d*) (there is additional undiagrammed parallellism implicit in having portions of the output queue on all four servers). Finally, qudiff is segmented sequentially with the first part (qudiff.beg) on server 14(*a*) and the last part (qudiff.end) on server 14(*d*). Note that in the last case, the two segments of qudiff are not even adjacent in the network linkage shown. Another type of distribution of the queues is given in FIG. 9F. Assuming the presenter client breaks the capture rectangle into four blocks B1, B2, B3, B4, it illustrates, using just qubase, how the stream data can be decomposed and distributed over all four conference servers 14(*a–d*), so that the subqueue qubase.B1 of uncompressed blocks B1 are on server 14(*a*), the subqueue qubase.B2 of uncompressed blocks B2 are on server 14(*b*), etc.; this represents another form of parallellism. These are simple examples; there are more complex analogues when there are more servers, and all of them may occur in various combinations. The various techniques of RAID (Redundant Array of Inexpensive Disks) striping with recovery from errors are also applicable. All of the distribution schemes mentioned here may also vary over time.

These are specifically adaptive advantages, but the static advantages also have parallels here, since a backup server may also be close, since a change in presenter may warrant a new tree configuration, and since an output class change may warrant a new homogeneous concentration reassignment.

Dynamic advantages result from reconfiguration and redistribution of tasks in response to relatively short term changes in the system during the conferencing session. The following are among the dynamic advantages.

Figure 9G:
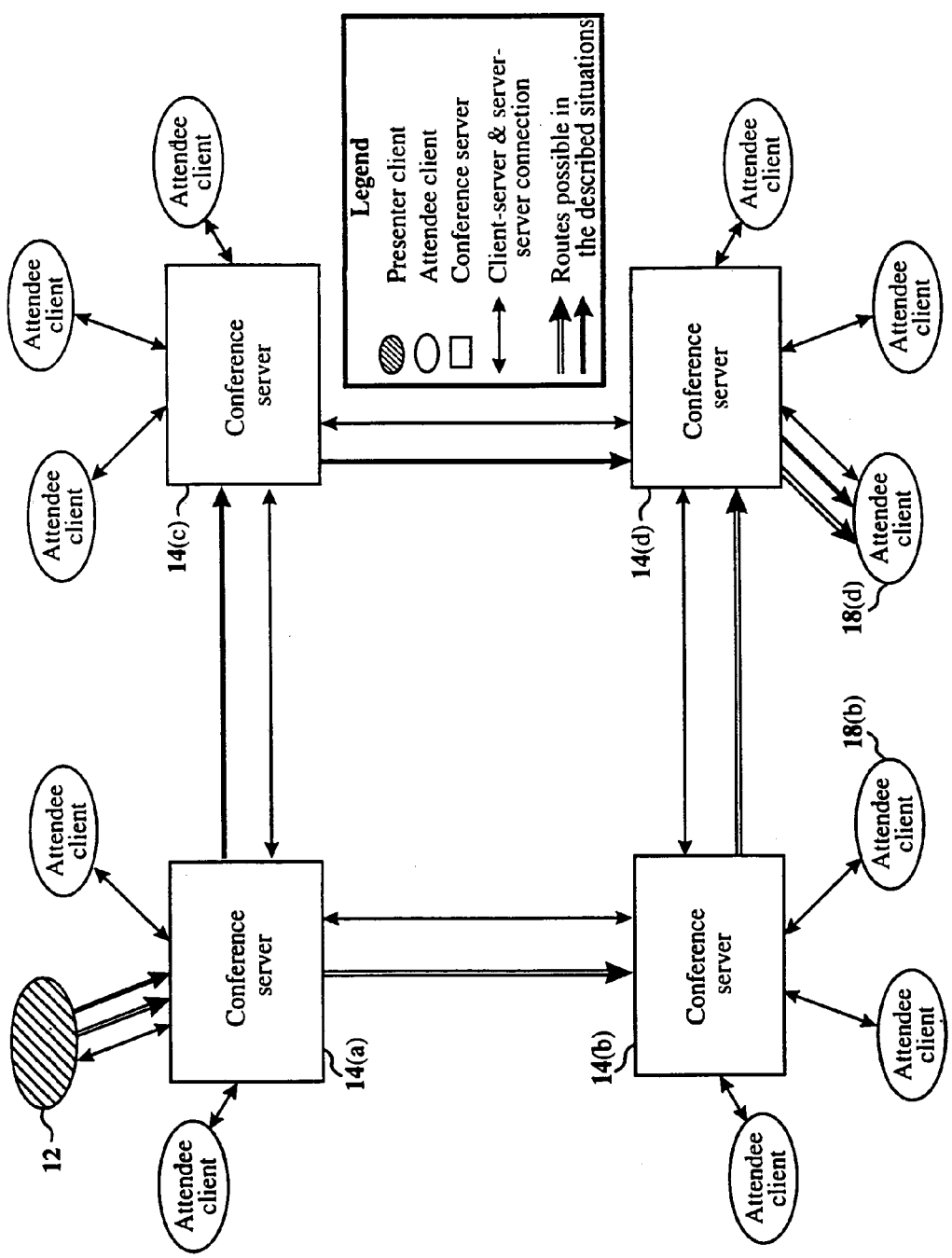
FIG. 9G is a block diagram illustrating interconnections of several communications servers and communicant clients, including multiple and redundant routing, in a single communications session according to the present invention.

(Content-based routing) Unlike IP routing for example, the system has access to the contents of the information being routed. Thus it can read the time stamps, type of data, and other information included in the base or delta block data or other system data. It can use this together with measured properties of the network interconnections of the servers and clients to determine best-estimate optimal routing between and through its components. In FIG. 9G, one route from presenter client 12 to attendee client 18(d) (through server 14(b)) is shown in double arrows, another (through server 14(d)) in heavy arrows, to illustrate that one route may be preferable under some conditions, but as conditions change, the system may select a different route.

(Redundant routing) The system can send image or other data by several routes at once. This can improve performance, since the earliest to arrive at the destination may trigger the discard of later-arriving data This can improve the resiliency and robustness of the system, since it is more likely some data will get to the destination. It can also improve reliability or accuracy, since several versions may be compared at the destination to see if they are identical. In case of discrepant data at the destination, retransmission or some arbitration method can be requested, depending on the purpose of the redundant attempts to insure delivery. For example, again in FIG. 9G, information from presenter client 12 may be sent by conference server 14(a) using both routes, indicated by the double arrows and the heavy arrows, to server 14(d) and then to attendee client 18(d).

These are specifically dynamic advantages, but the static and adaptive advantages also have parallels here as well. This can be summarized in an additional dynamic advantage.

(Dynamic reconfiguration) Any of the configurations described above and the parameters determining them and the routing schemes can be altered depending on changes in client, server, and network capabilities, needs, resources, and loads as announced or demanded by clients, or as measured by the system, or as specified by conferees or system administrators, or other prevailing or desired conditions.

Any combination of advantages from these three groups may apply. There will in general be tradeoffs among these advantages. The system can be given specific configuration preferences, or it can automatically adjust during use according to preset optimization goals, or it can adaptively set optimization goals and adjust the configuration to approach them.

Example of Server Architecture

So far, a server or each of a set of servers operating together has been viewed as a computer performing the server functions described. An example of server architecture and use will now be given, without suggesting the necessity for, or the exclusiveness of, this architecture to accomplish the communications serving functions on single or multiple and interconnected servers described above. Also, the previous examples have dealt with a single conferencing meeting or other communications session; the method to be described below can also accommodate several meetings on the same underlying hardware and the conferencing software as provided by the present invention. Again, the description of this method is not intended to suggest that this is the only way in which the invention can accomplish multiple simultaneous communications sessions. Any references to the image-sharing example should be extended to arbitrary data steams.

Figure 11:
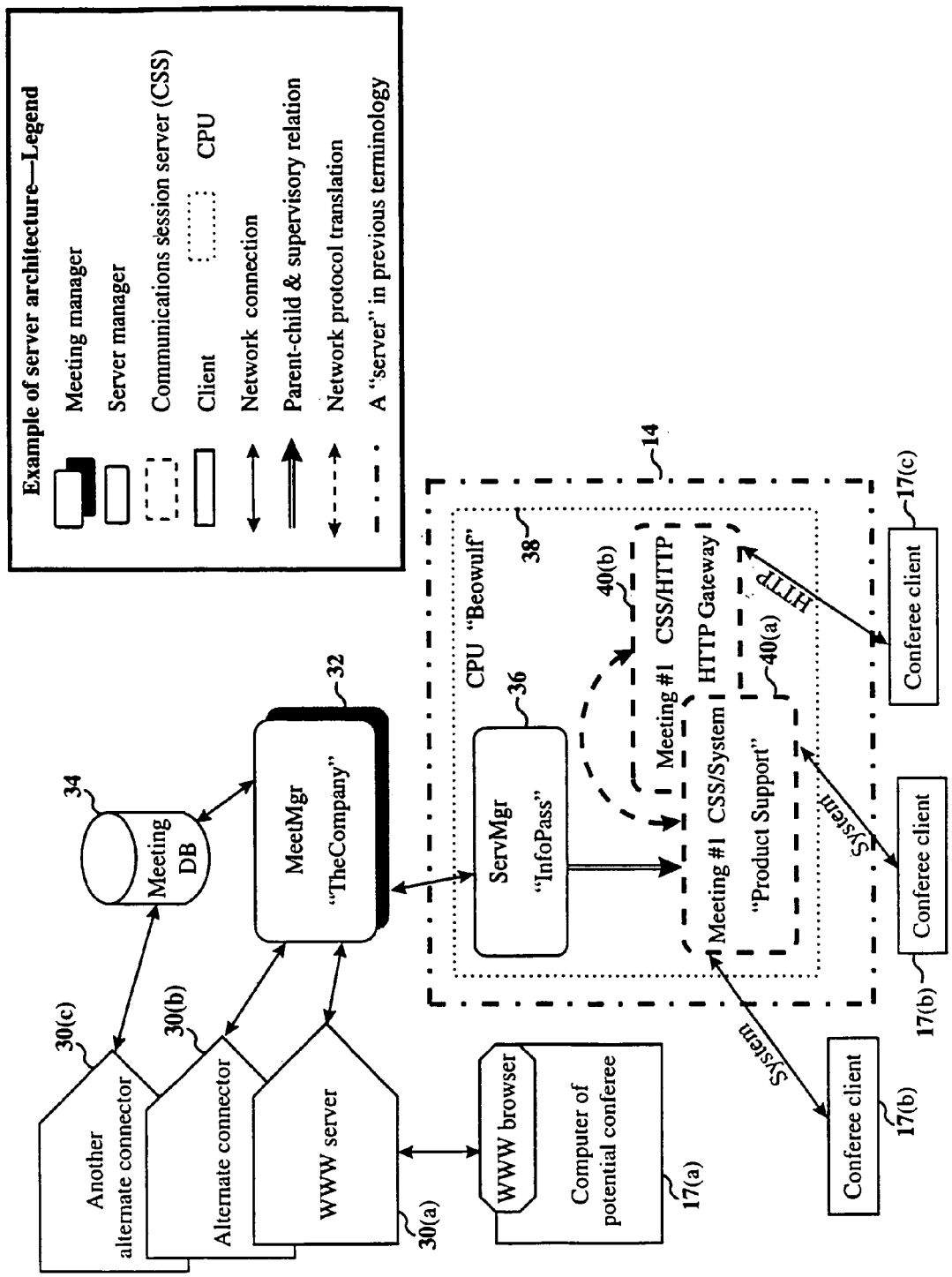
FIG. 11 is a diagram of the example architecture for a single server with a single meeting, according to the present invention.

FIG. 11 shows an architecture of a single server and a single meeting. The primary component of this architecture is a server manager 36 (identified in this diagram as "ServMgr 'InfoPass'"), which is directed by a meeting manager 32 (identified in this diagram as "MeetMgr 'TheCompany'"). Meeting manager 32 is an unowned, quiescent, resident, interrupt-driven process (similar to a "daemon" process used with Unix and other operating systems). It may or may not be running on the same CPU as WWW server 30(a); it may or may not be running on the same CPU 38 (called here "Beowulf") as server manager 36 "InfoPass." The server manager is also an unowned, quiescent, resident, interrupt-driven process. Each CPU that is involved in the system for providing server functions in meetings set up by a meeting manager has exactly one server manager running on it; that server manager can be viewed as the meeting manager's agent on that CPU. The meeting is directly supervised by communications session server ("CSS") 40(a), called here "Meeting #1 'Product Support.'" When server manager 36 receives a command from meeting manager 32 that includes the information on a meeting and on the first conferee that wishes to connect, the server manager creates a CSS to handle the meeting. The CSS is an owned, evanescent, quiescent, interrupt-driven process. The CSS is owned by the server manager and is killed a period of time after all the conferee clients connected to its meeting disconnect or fail to respond.

In FIG. 11 there are three conferee clients 17(a)–(c) connected to the meeting. Clients 17(a),(b) use a client-server protocol provided by the system, which might be a combination of Transmission Control Protocol ("TCP") and User Datagram Protocol ("UDP"), for example. Client 17(c) uses another protocol, here exemplified as Hypertext Transfer Protocol ("HTTP"). The CSS 40(a) provides an included "gateway" layer 40(b) for each connection protocol other than the system protocol, and this layer translates the client's nonsystem protocol to the system protocol. The acceptance of different protocols may aid the system's operation across firewalls or adaptation to clients' restricted network connections, for example.

A potential conferee 17(a) has navigated his or her WWW browser to Web server 30(a), and has asked through the Web page presented to connect to the meeting (as described above in the discussion of FIG. 2). There may be alternative ways, indicated here as 30(b),(c), to connect to the meeting, including direct access to the meeting manager or its database 34 (called here "Meeting DB"). The meeting manager uses this database to hold information concerning the meeting (the database need not be on the same computer as the meeting manager). This information was created when the person who set up the meeting requested that the meeting be scheduled, gave descriptive information for the meeting, specified the keys and privileges, and provided other administrative information. The database is reconfigurable and easily extensible to include many and varied meeting attributes. It may be accessed by a programming interface. Potential new conferee client 17(a) sends a request to join the meeting, and then supplies the key for the meeting that the potential conferee has obtained previously. Potential client 17(a) may also send previously selected identification information such as icon, gong, etc., and this may be stored in Meeting DB or in some other sort of directory service. After the meeting manager has validated potential client 17(a), it sends a message that causes the client software to run on the potential client and then sends that client software the address information for the CSS, such as a URL and port number. At that time, the client software may also receive address information for backup CSSs in case the connection to the meeting fails and automatic or manual attempts to reconnect to the initial CSS fail as well. The client then connects to the meeting, and may pass to the CSS its identification information.

A CSS is created to supervise a single meeting. The monitoring-filtering-queueing structures and procedures of FIGS. 8A,B are performed by the CSS, so FIGS. 8A,B could be viewed as part of the internal working of each CSS in FIGS. 11–22 (in the case of distributed server functions described in FIGS. 9D–F, only part of FIGS. 8A,B might be descriptive of a particular CSS). Indeed, there will be a version of FIG. 8A applying to each data stream the CSS handles as multipoint real-time traffic from a presenter client. The structure of FIG. 8B shows schematically how these and other multiple input and output data streams are processed. The CSS also handles other input from and output to clients, such as information about attendee and presenter clients that helps with flow control, commands or requests from clients, labeled pointer icon positions, and other stream data and control traffic.

In FIG. 11, a dot-and-dash line 14 has been drawn around the structure that corresponds to the term "server" in the earlier parts of the description of the present invention; this may be a helpful analogy, but the description of the example here is only one possible explication of server functions.

Figure 12:
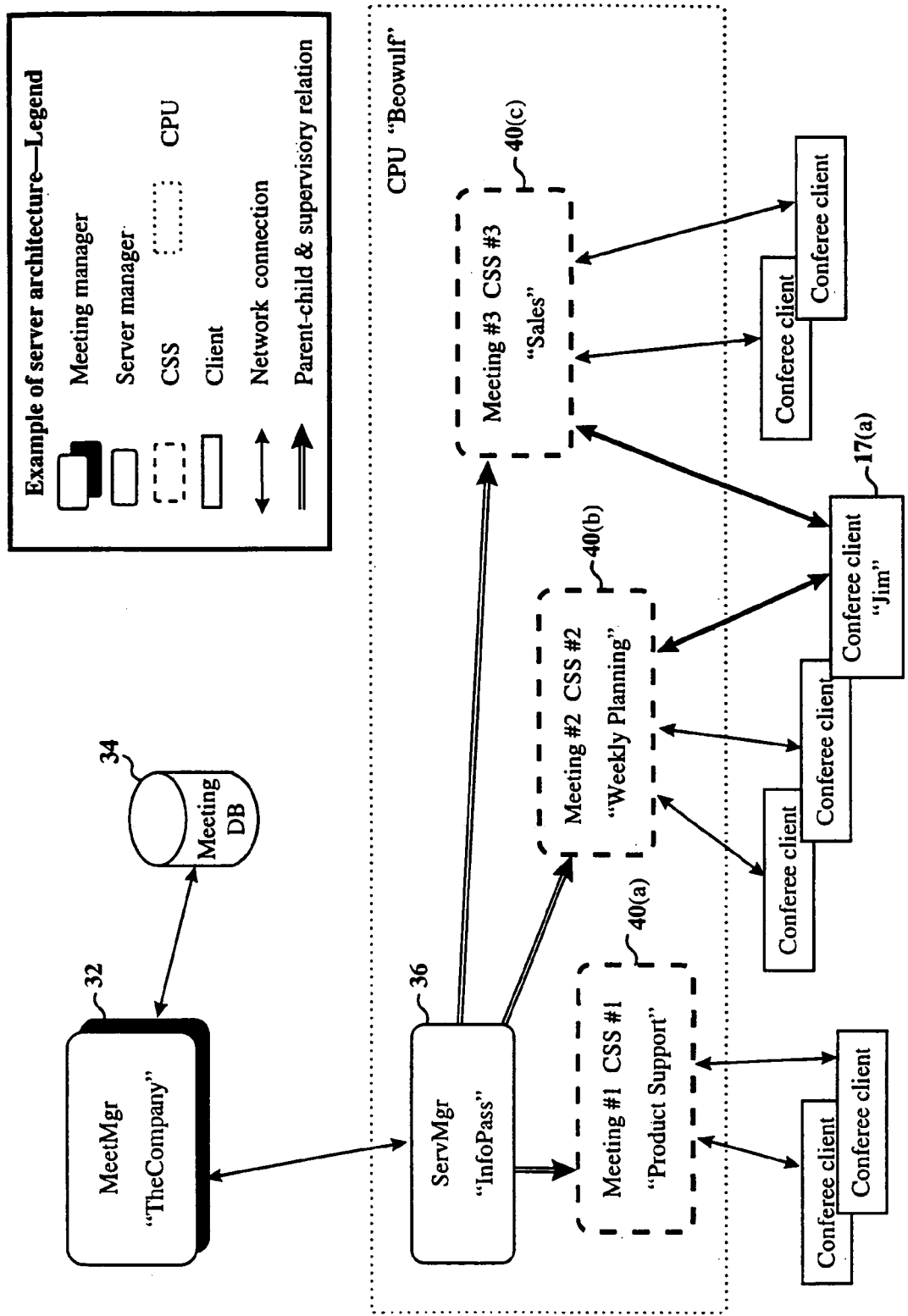
FIG. 12 is a diagram of the example architecture for a server with several meetings running on a single CPU, according to the present invention.

FIG. 12 shows a slightly more complex situation than FIG. 11. Here, the server manager has created three CSSs to supervise three meetings. Conferee client 17(a) (labeled here "Jim") is simultaneously connected to two meetings. If Jim is permitted, he can share the information he receives from one meeting with the participants in the other.

Server managers are responsible for measuring network connection bandwidth, reliability, CPU load, and other parameters, and determining the configuration of any and all CSSs they may own at any given time based on these measurements and other considerations.

Figure 13:
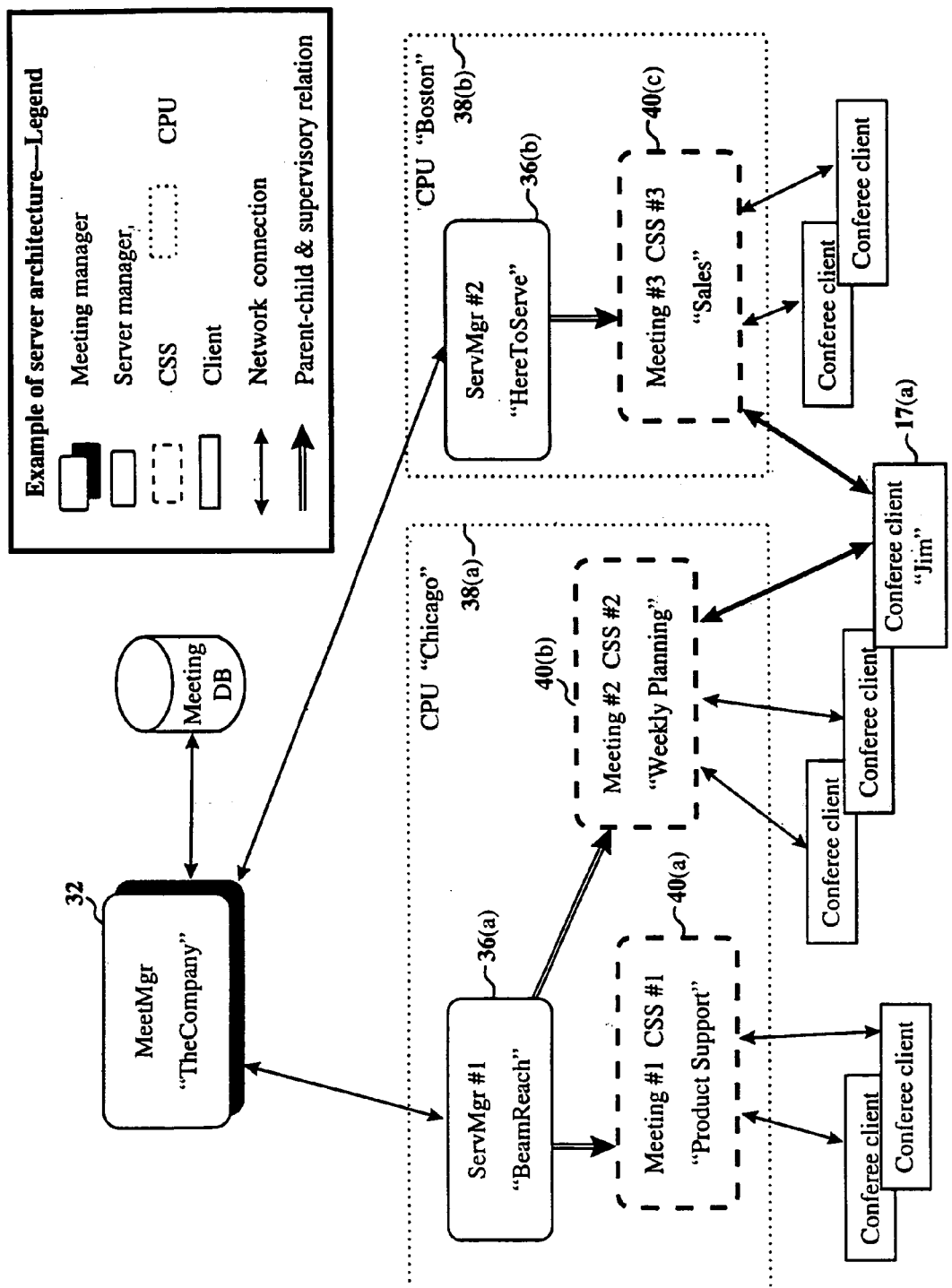
FIG. 13 is a diagram of the example architecture for a single meeting manager directing several servers with several meetings, running on several CPUs, according to the present invention.

FIG. 13 shows a more complex arrangement than FIG. 12. Now, there are two CPUs, 38(a) and 38(b); each has its own server manager, but both are directed by the same meeting manager. Server manager #1 36(a) has created two CSSs to handle two meetings, and server manager #2 36(b) has created a single CSS. Conferee client 17(a) is now connected to two meetings on two different CPUs, possibly distant from each other.

Figure 14:
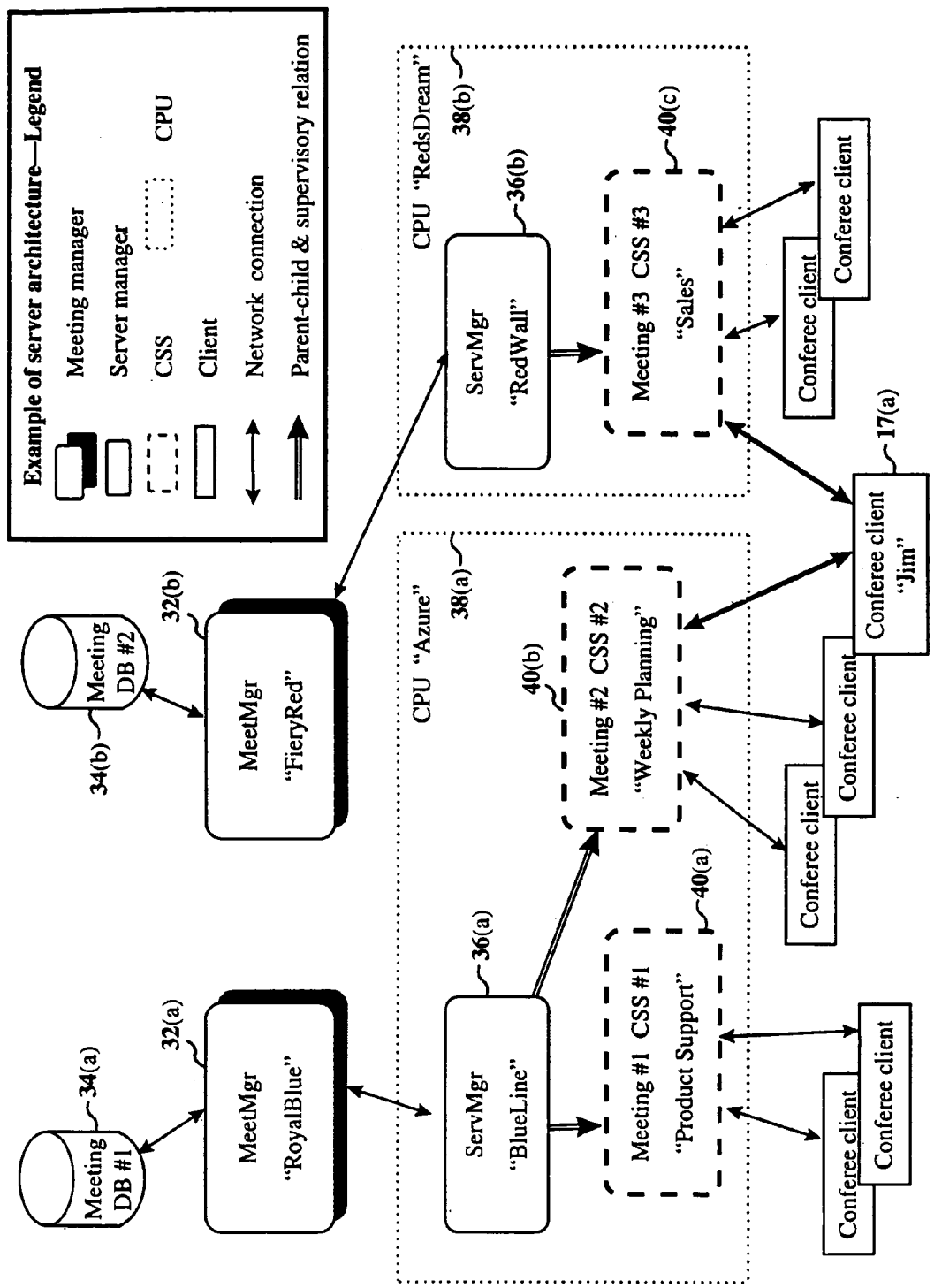
FIG. 14 is a diagram of the example architecture for several meeting managers directing several servers with several meetings, running on several CPUs, according to the present invention.
Figure 15:
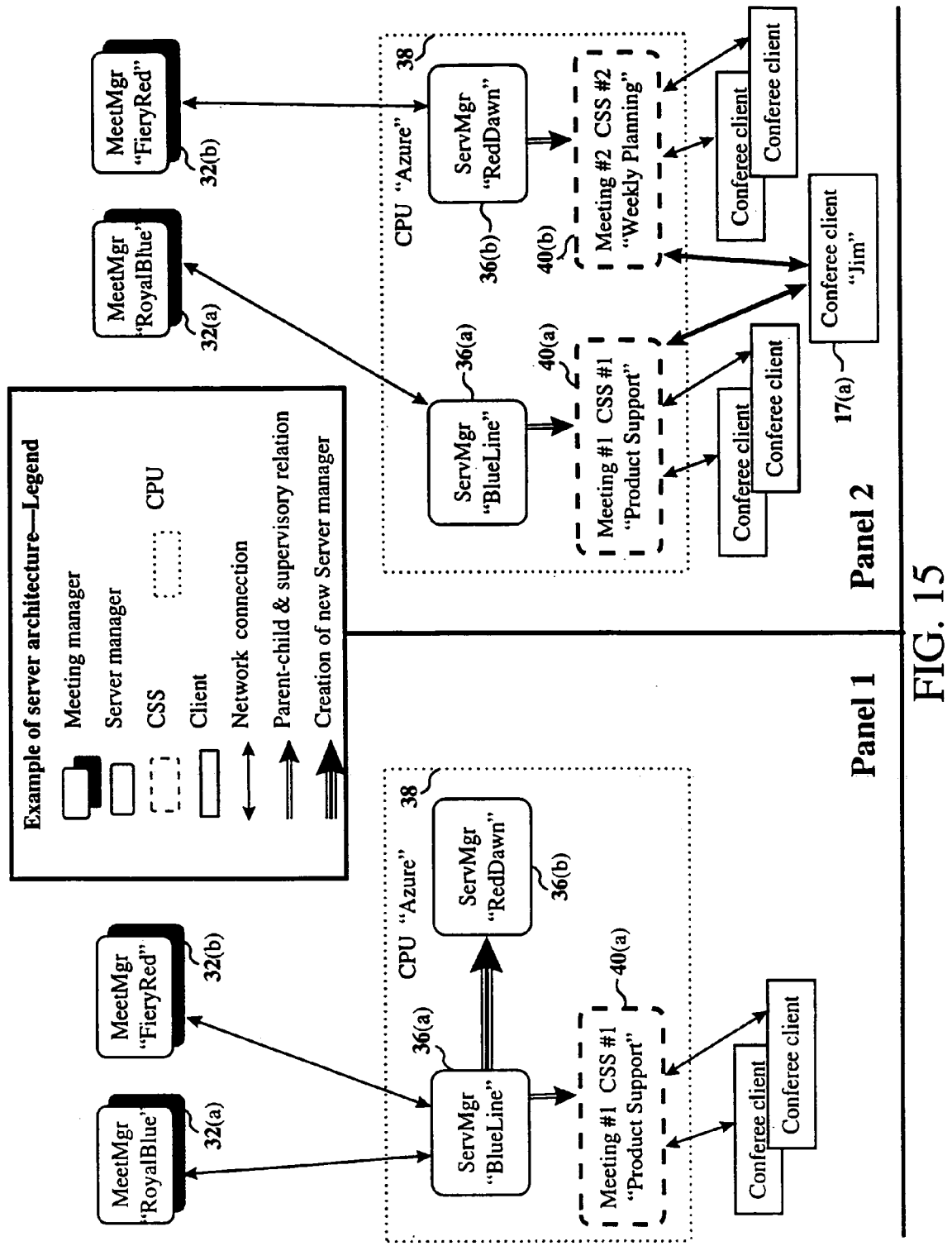
FIG. 15 is a diagram of the example architecture for several meeting managers directing several servers with several meetings, running on the same CPU, according to the present invention.

FIG. 14 exemplifies the situation when there are several meeting managers by showing two meeting managers 32(a), (b) active. Each has its own meeting database 34(a),(b). Each directs the server manager 36(a),(b) on a single CPU 38(a,b). Server manager 36(a) has created two CSSs 40(a), (b) to handle two meetings. The other server manager 36(b) has created a single CSS 40(c). The only connection pictured between these two instances of the system is the presence of client 17(a) "Jim" in two meetings, one in each instance of the system.

If a need arises to let a second meeting manager set up meetings on a CPU that already has a server manager managed by a meeting manager, then the currently running server manager forks or clones itself and the new server manager becomes the agent for the newly involved meeting manager. Thus, there is a one-to-one correspondence between server managers running on a given CPU and meeting managers that set up meetings on that CPU. As an illustration, in Panel 1 of FIG. 15, meeting manager 32(b) sends a message to server manager 36(a) on CPU 38 that causes server manager 36(b) to be created. Then afterward, in Panel 2, meeting manager 32(b) and server manager 36(b) start the meeting through the new CSS 40(b). Conferee "Jim" 17(a) has joined both meetings, but there need be no other relationship between the two meetings shown. In the situations below, there will be no difference if server managers for different meeting managers are on the same CPU or on different CPUs.

Figure 16:
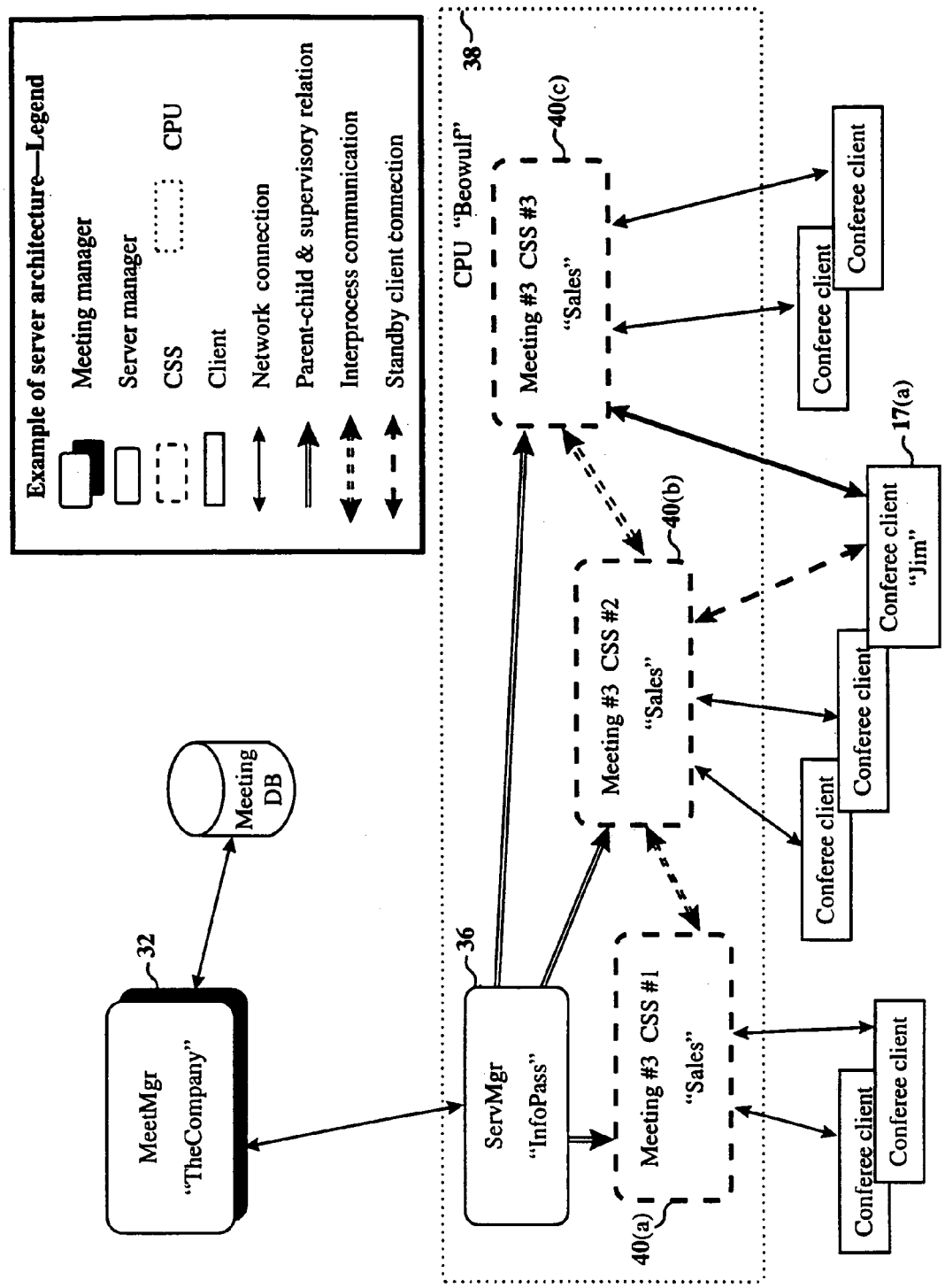
FIG. 16 is a diagram of the example architecture for a single server with a single meeting, but the meeting is controlled by several instances of a communications session server ("CSS") running on the same CPU, according to the present invention.

FIG. 16 shows a single server manager 36 that has created three CSSs 40(a)–(c) on one CPU 38, but now these CSSs all handle the same meeting (called "Meeting #3 'Sales'"). The same meeting might require additional CSSs on the same CPU if process limitations were exceeded by a great number of client connections and their requirements, or the like. In order to coordinate their work, the three CSSs communicate using a system-provided server—server protocol. This protocol may use the same sort of blend of networking protocols as described for the client-server connection, or it may be quite different. For diagrammatic purposes, FIGS. 16–20 show interprocess communication links only between nearest neighbors; this is not meant to indicate that there are not other directly established links, say between CSSs 40(a) and 40(c) in FIG. 16. This interprocess communication allows one CSS to send presenter client output to another, for example; this was described above in the discussion of FIG. 8A. More detail on this is given below in the discussion of FIGS. 21 and 22. Conferee client 17(a) "Jim" is known to two CSSs 40(b),(c), but is actively connected only to CSS #3 40(c). The connection to CSS #2 40(b) is a backup assignment (as described above in the discussion of FIG. 9C). Should CSS #3 fail, then "Jim" can automatically be connected to the meeting through CSS #2.

Figure 17:
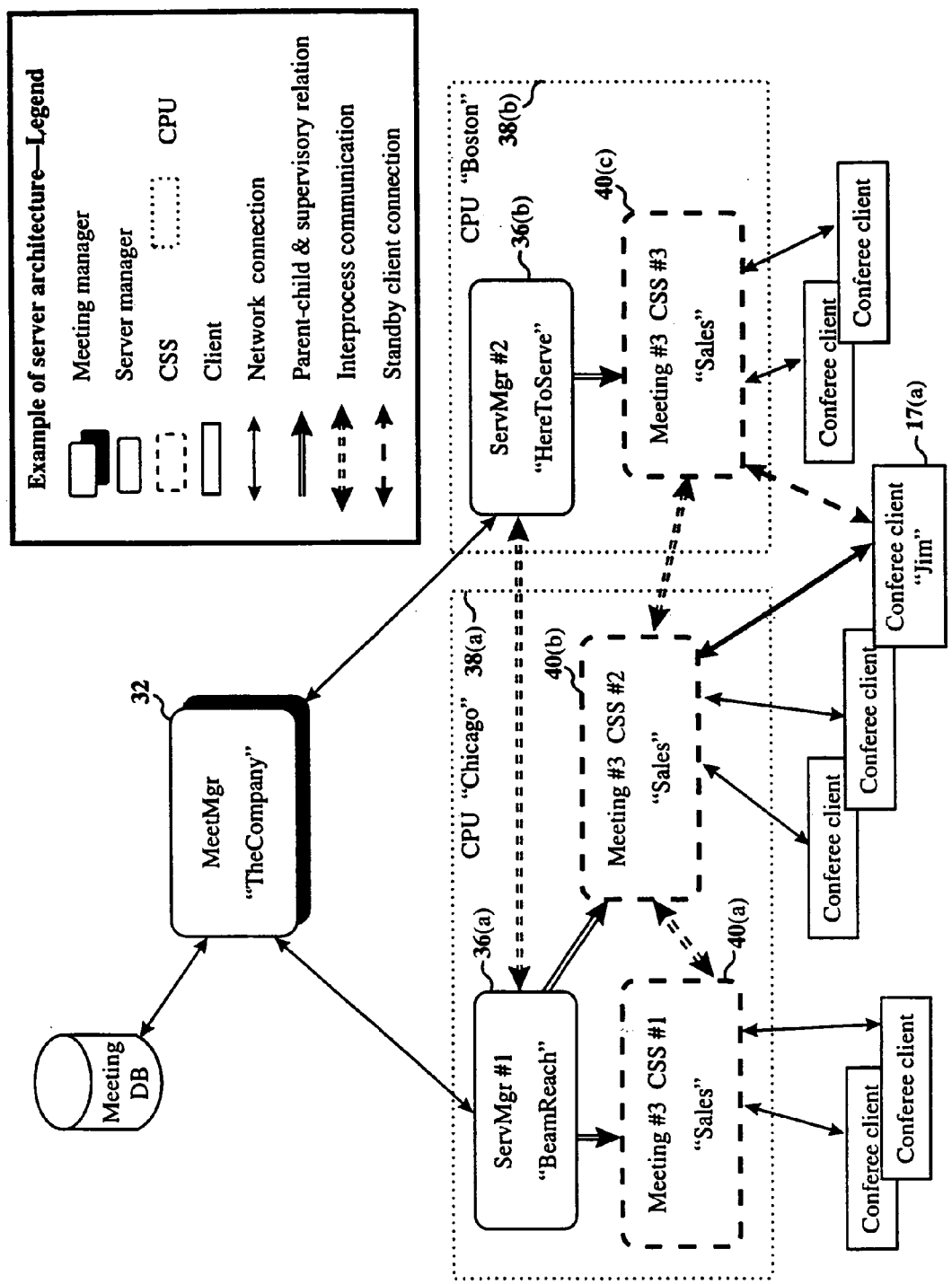
FIG. 17 is a diagram of the example architecture for a single meeting manager directing several servers with a single meeting where the meeting is controlled by several instances of a CSS running on the same CPU, with additional CSSs for the same meeting running on other CPUs, according to the present invention.

FIG. 17 shows a single meeting manager that directs two server managers 36(a,b) that have created three CSSs 40(a, b,c) on two CPUs 38(a,b), and these CSSs all handle the same meeting (called "Meeting #3 'Sales'"). The same meeting might require additional CSSs on additional CPUs if the CPUs were distant from each other, but closer to their respective sets of connected clients, or if process limitations were exceeded by a great number of client connections and their requirements, or the like. The advantages described in the discussion of FIGS. 9A–G, 11A, B provide numerous reasons for multiple servers (which in this context means multiple CSSs) that handle the same meeting and that may be distributed over a number of CPUs. As in FIG. 16, the three CSSs communicate using a system-provided server— server protocol. In addition, the two server managers communicate using this or a similar protocol in order to coordinate the full span of this meeting. They exchange the performance measurements they make in order to adaptively configure the CSSs. For example, conferee client 17(a) "Jim" begins the meeting connected to CSS #2. At some point, the server managers determine that it is likely that better service will be obtained by "migrating" this connection from CSS #2 40(b) to CSS #3 40(c) and so from CPU 38(a) to CPU 38(b) (as described above in the discussion of FIG. 9B). This reconnection may be performed automatically. Moreover, the creation of CSS #3 to handle this meeting and the interprocess communication channels between CSSs and between server managers may be established automatically to improve performance and balance loads (as further described above in the discussion of FIG.

9B). The creation of additional CSSs, on the same machine or on different machines, to handle the same meeting is the basis of the scalability of the present invention.

It is possible for several meeting managers to each direct a server manager that has created one or more CSSs, and these CSSs all handle the same meeting. This is pictured in FIG. 18 with two meeting managers 32(a),(b) and their respective databases 34(a),(b). This could be the situation if two different companies own the meeting managers and might wish to hold a joint meeting (here called "Meeting #4 'Joint Sales'"). The user or administrator that sets up such a multiply managed meeting may manually declare the organization of the management (e.g., the meeting managers involved, the CPUs, the number of CSSs, and other structural, organizational, managerial parameters), or the setup may be done automatically by the system, or it may be done interactively with automated support. Here meeting managers 32(a),(b) also communicate using the system-provided server—server protocol. They exchange the meeting information, so that their two databases 34(a),(b) are consistent. They also exchange messages that indicate that this is to be a joint meeting, and they inform their server managers of this. Potential conferees join through either meeting manager. The appearance of the meeting may be the same for all conferees, independent of the number of CSSs, server managers, CPUs, or meeting managers involved. Again, conferee client 17(a) "Jim" may be either backed up or migrated to another CSS (from 40(c) to 40(b)), even when the new CSS is on a CPU in the domain of a different meeting manager (from CPU 38(b) in the domain of meeting manager 32(b) to CPU 38(a) in the domain of meeting manager 32(a)).

Figure 18:
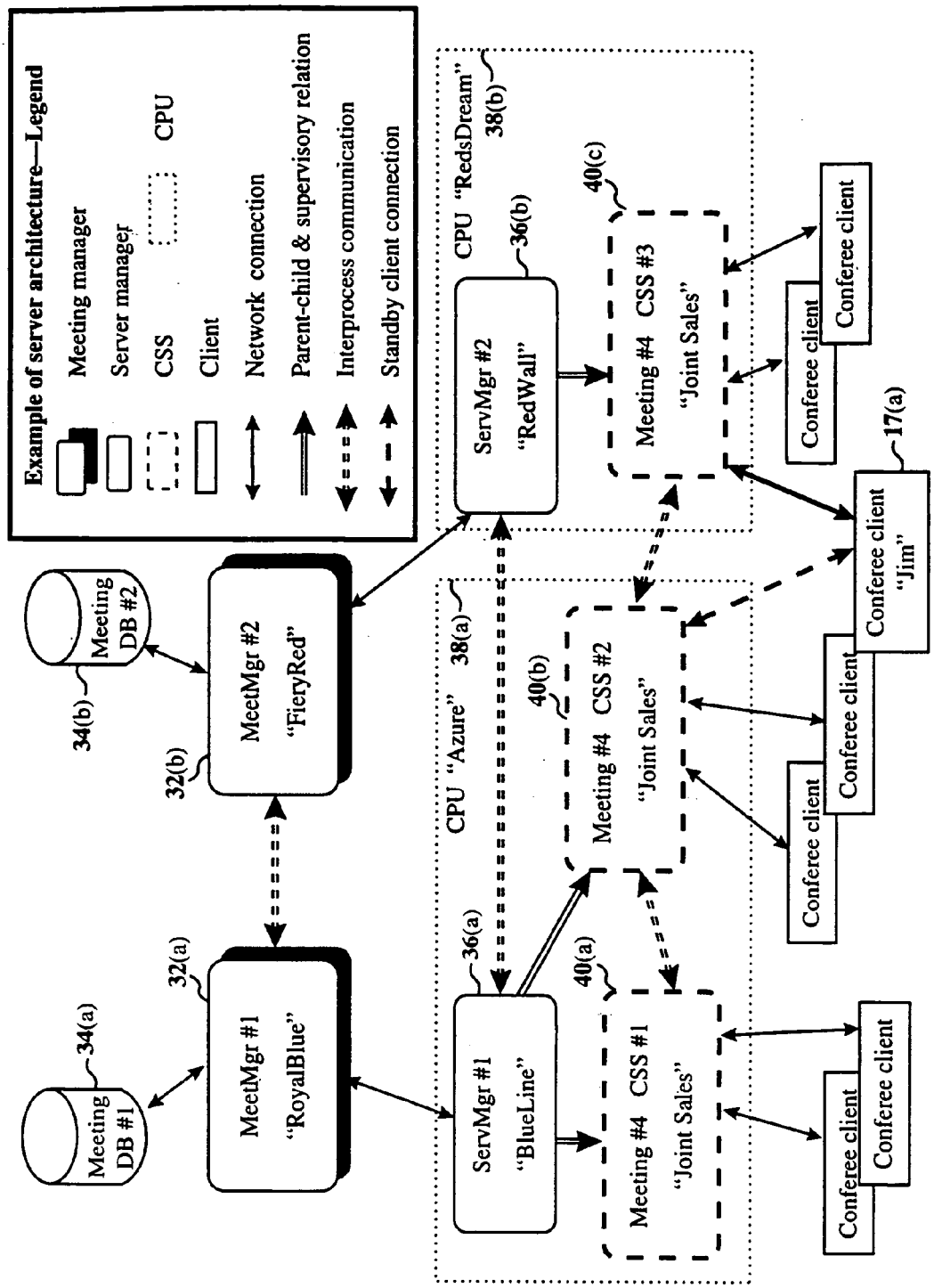
FIG. 18 is a diagram of the example architecture for several meeting managers directing several servers with a single meeting where the meeting is controlled by several instances of a CSS running on the same CPU, with additional CSSs for the same meeting running on other CPUs, according to the present invention.
Figure 19:
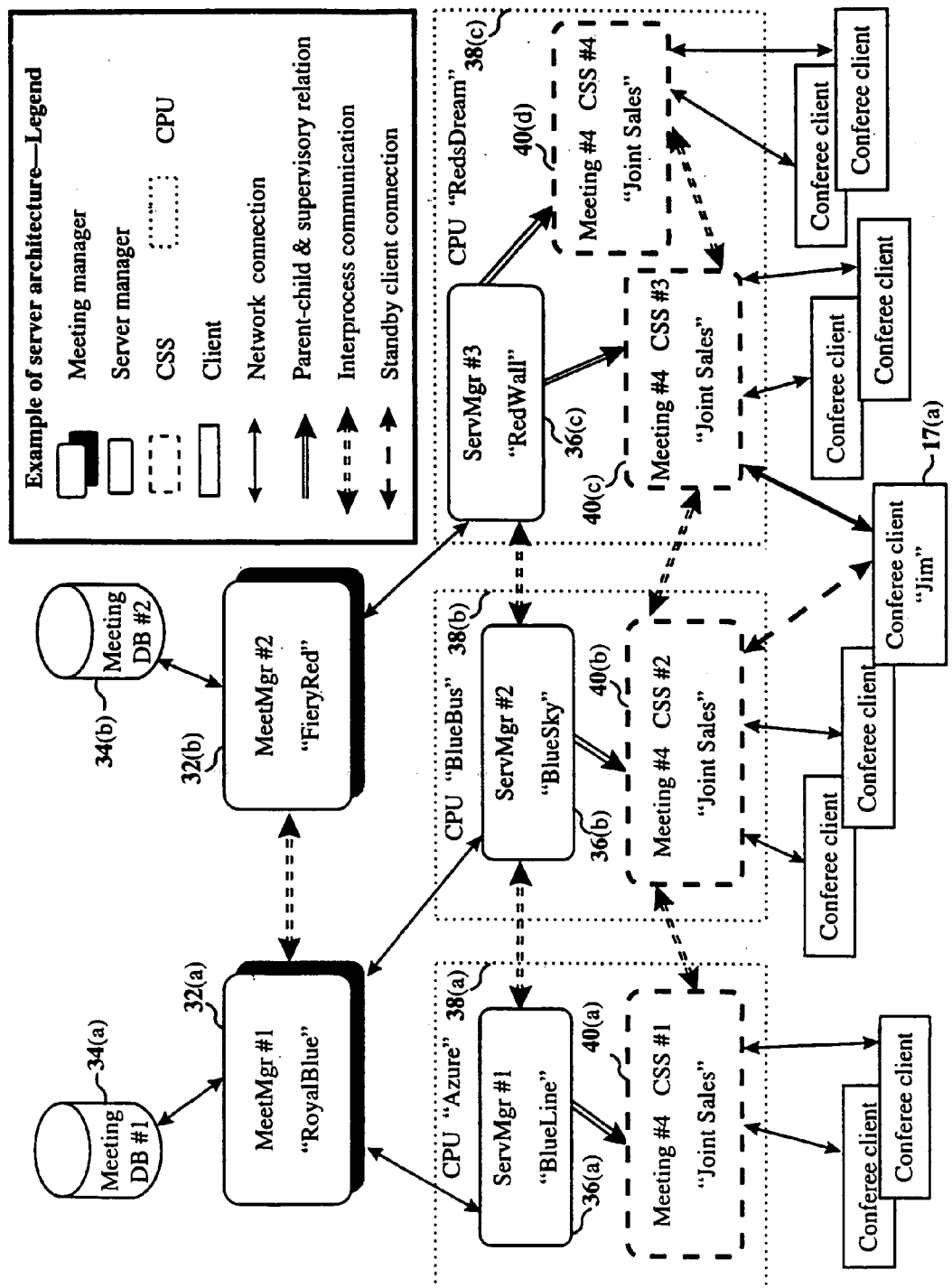
FIG. 19 is a diagram of the example architecture, for several meeting managers directing several servers with a single meeting where the meeting is controlled by several instances of a CSS running on different CPUs, according to the present invention.
Figure 20:
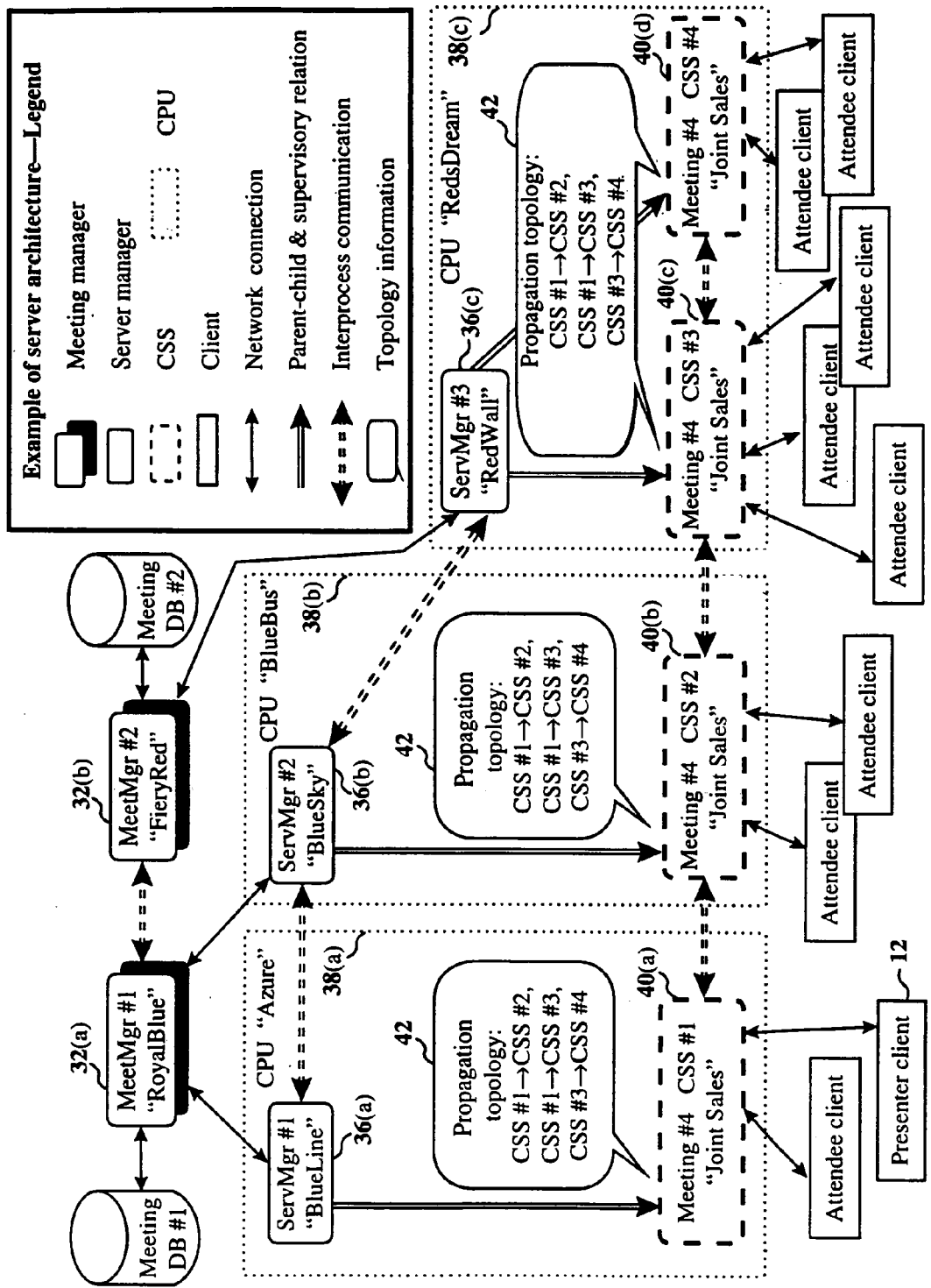
FIG. 20 is a diagram of the example architecture for several meeting managers directing several servers with a single meeting where the meeting is controlled by several instances of a CSS running on different CPUs, according to the present invention. In this diagram, the propagation topology information is shown.

FIG. 19 extends the situation of FIG. 18. The two meeting managers are shown directing their server managers in a joint meeting. This time, server manager 36(c) has created two CSSs 40(c),(d) for the meeting on the same CPU 38(c), and meeting manager 32(a) has directed two server managers 36(a),(b) to create CSSs 40(a),(b) for the meeting on two different CPUs 38(a),(b). Thus this is a combination of the situations pictured in FIGS. 16–18. Again, for diagrammatic purposes, FIGS. 19 and 20 show interprocess communication links among server managers only between nearest neighbors; this is not meant to indicate that there are not other directly established links, say between server managers 36(a) and 36(c) in FIG. 19. As before, conferee client 17(a) "Jim" may be either backed up or migrated to another CSS 40(b), even when the new CSS is in the domain of a different meeting manager.

If a CSS fails, the server manager process may create a new CSS, the clients may be migrated to other CSSs already active on the same CPU, or clients may be migrated to other CSSs newly created or already handling the meeting at other locations in the system, as indicated above. If a CPU fails or becomes isolated from the network or system, the meeting manager process can attempt to reestablish network connection with the CPU and send the server manager information to create a CSS to handle the meeting, or the meeting manager can communicate with one or more server managers on still accessible CPUs to create one or more CSSs to handle the meeting. In addition, clients that have backup connections beyond the failed CPU can be migrated to CSSs handling the meeting. If there are several meeting managers participating in the management of a meeting, and a meeting manager becomes disabled or isolated from the network, then another meeting manger may attempt to establish sufficiently many CSSs through server managers it can reach to carry the workload. These adaptations may occur automatically, or be initiated by a system administrator.

The diagrams in FIGS. 11–19 suggest the range of variability in coordinating meetings and server functions. Many other combinations can be formed from the situations pictured there or may be suggested by them. For example, if a global directory service for meetings is provided, then there could even be a layer of management above the meeting managers, which might be termed a Global Manager.

FIG. 20 illustrates a method for determining which CSSs pass output information to other CSSs that are handling the same meeting. The configuration of meeting managers, server managers and CSSs is the same as in FIG. 19, except that one client 12 is presenting, the others 18 are attending, and no backup link is shown. From time to time, the server managers determine and agree on appropriate propagation topologies that resemble a tree or trees (trees and their advantages were described above in the discussion of FIGS. 10 A, B) and post a copy 42 of the current choice at each of their CSSs. These are directed acyclic graphs ("DAGs"), which contain no loops, so that the CSS can send out the information with no risk of endlessly cycling it. Each stream being handled has its own propagation DAG, and they may change independently among streams; as described below, each stream may have several propagation DAGs. In FIG. 20, presenter client 12 is viewed as the root of the tree, and CSS #1 delivers presenter output information to CSS #2 and to CSS #3; in turn, CSS #3 delivers that information to CSS #4; all CSSs also deliver the information to their connected attendee clients 18.

Figure 21:
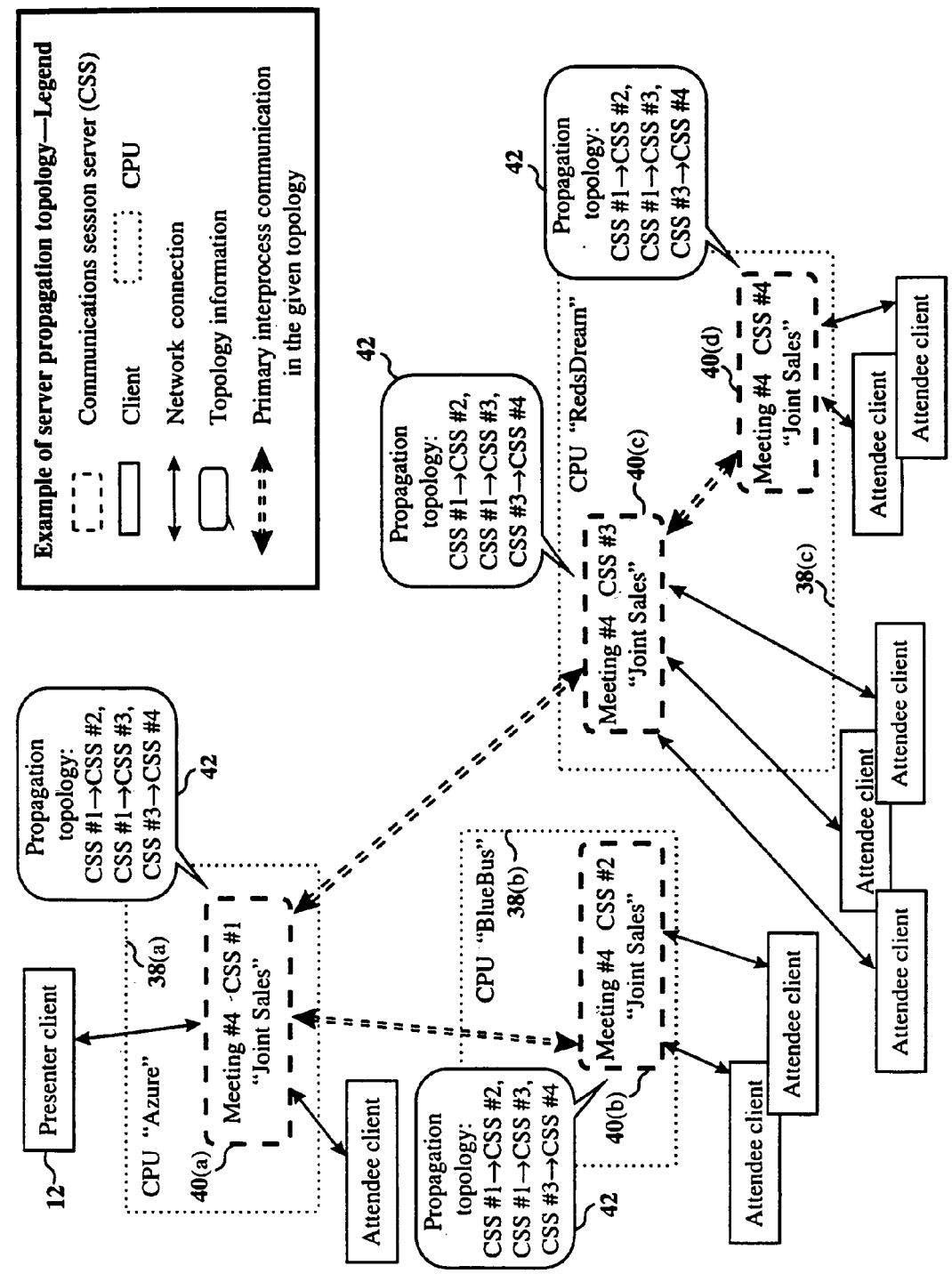
FIG. 21 is a diagram of the graph of the propagation topology information in FIG. 20.

FIG. 21 represents the situation of FIG. 20 with the topological information of the directed graph 42 emphasized by rearranging the CSSs to resemble the tree specified in the propagation DAG 42 of FIG. 20.

Figure 22:
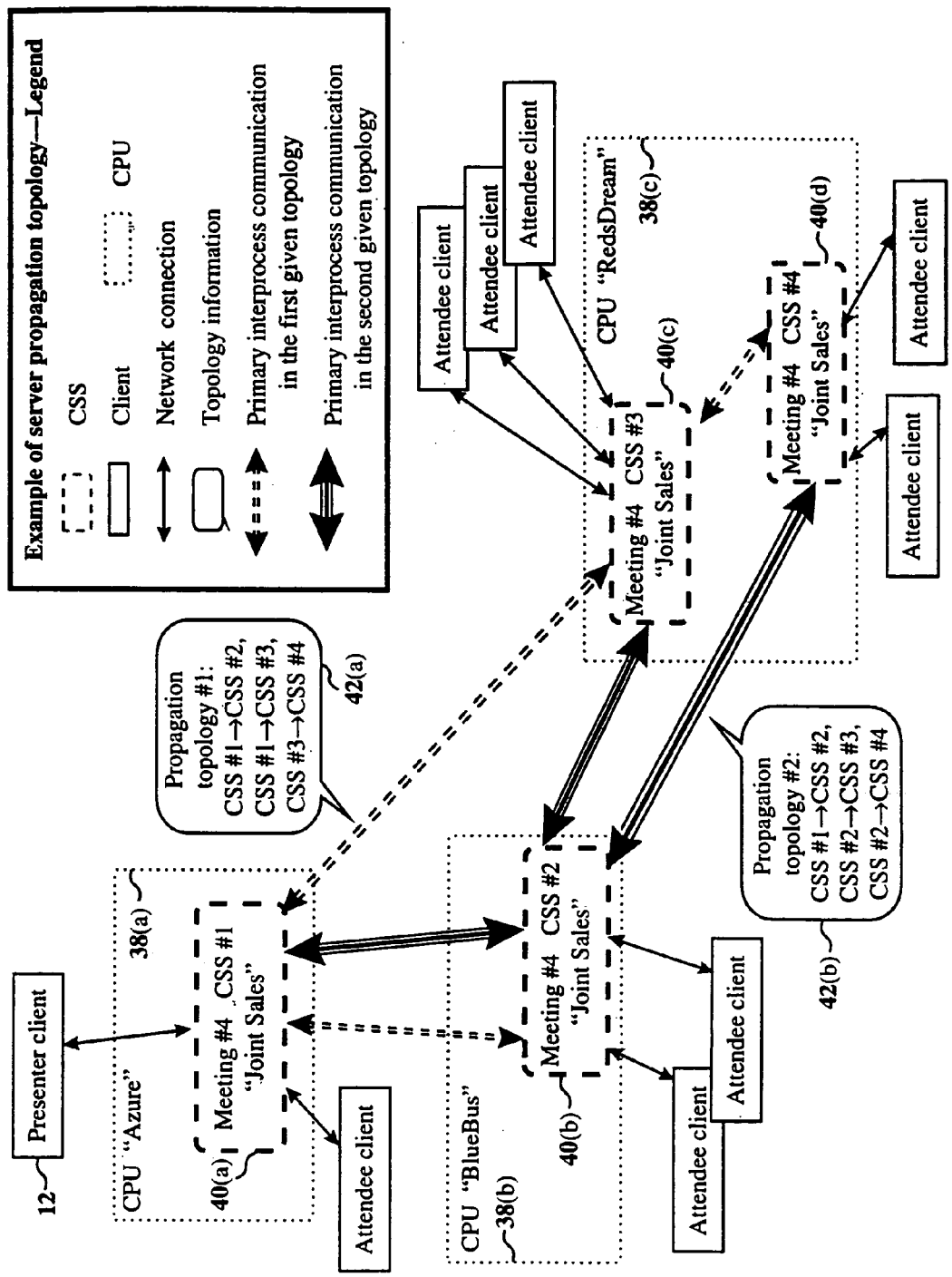
FIG. 22 is a diagram of the graph of the propagation topology information in FIG. 20 together with the information for an additional propagation topology.

FIG. 22 represents the situation of FIG. 20 with the same topological information 42(a) emphasized in FIG. 21 and with the addition of another possible propagation topology 42(b) for the same stream. Secondary and multiple propagation DAGs for the same data stream allow the system to reroute the information being sent or to send it redundantly (both as described above in the discussion of FIG. 9G).

The foregoing suggests that minimal server platform needs for this example would be a network connection and an operating system providing an interrupt service and multitasking, with or without hardware support.

System Extensions and Extendability

Up to this point, there have been multiple servers dealing with multiple clients, where "client" has referred to an enduser's computer or an instance of the conferencing software running on it. But it may happen that the reconfigurations, transformations, and routings performed by a server or servers described above extend to assigning tasks to intermediate devices such as routers, bridges, gateways, modems, hardware codecs, and the like. There may be also be cases where a client lacks display capabilities, but provides other functions to the system or acts as a monitor or recorder of activity. There may be configurations where all server functions are performed on client computers, so there is no specified server node in the networked system. In the preferred embodiment, performance may require that there be one CSS per CPU.

Both the server and client software architectures are adaptable. Not only may features be added on that increase the variety of communication possible, such as text chat, audio, and shared drawing areas, but proprietary codecs, transformations, stream operators, and the like may be incorporated as plug-in modules. Addition of streams of abstract data types can be accommodated by the system and in turn allow the system to be expanded and reconfigured.

When operating with data streams that admit asynchronous unnotified updating (where intermediate updates can be dropped if they are obsoleted by later arriving data updates), which are those that are appropriate for multispeeding, the system is robust under occasional loss of information and can thus take advantage of high-speed networking protocols like User Datagram Protocol ("UDP") that do not provide reliable transmission but provide greater network throughput performance than reliable protocols. The system can also be configured to provide secure transport for a data stream, and so could be used to carry the diplay command streams on which are based other image-sharing systems, but then there would be advantage from multispeeding, although the scalability and other advantages of the present invention would be available.

Codecs, transformations, and transcodings described above for the image-sharing example may have analogues that play similar roles with similar advantages in the system's handling of other data streams. It is also recognized that there are other cases of transcoding from one type of data to another, such as text to page image via rasterization, page image to text via optical character recognition, text to speech via speech synthesis, and speech to text via speech recognition. Such tasks may involve transformations in different orders than described above, including decompression at the presenter client and compression at the attendee client. These possibilities are accommodated by the present invention.

The system contains no obstructions to operating across firewalls with permissions. The system is compatible with agents, network proxies, and other stand-in entities, with a variety of network context and content filters, with multiple network protocols for client connections, with bandwidth matching transcoders, with hybrid wireless and landbased networks, with assymetric networks, with clustered CPU networks, with streaming multimedia and signal processing systems, with serial, parallel, and vector processors, and with many other specialized technologies; properly configured and supplied with appropriate permissions, the system either operates transparently with them or enjoys increased performance by employing and extending their advantages. Faster processor speed and greater bandwidth do not obviate the utility of the present invention; instead, they improve its performance.

As mentioned before, the described communications system not only applies to the transport of streams of image data, and to other examples mentioned, but also generally applies to the transport, storing, replaying, scheduling, multispeeding, and other handling and processing of other data streams as well.

Figure 23:
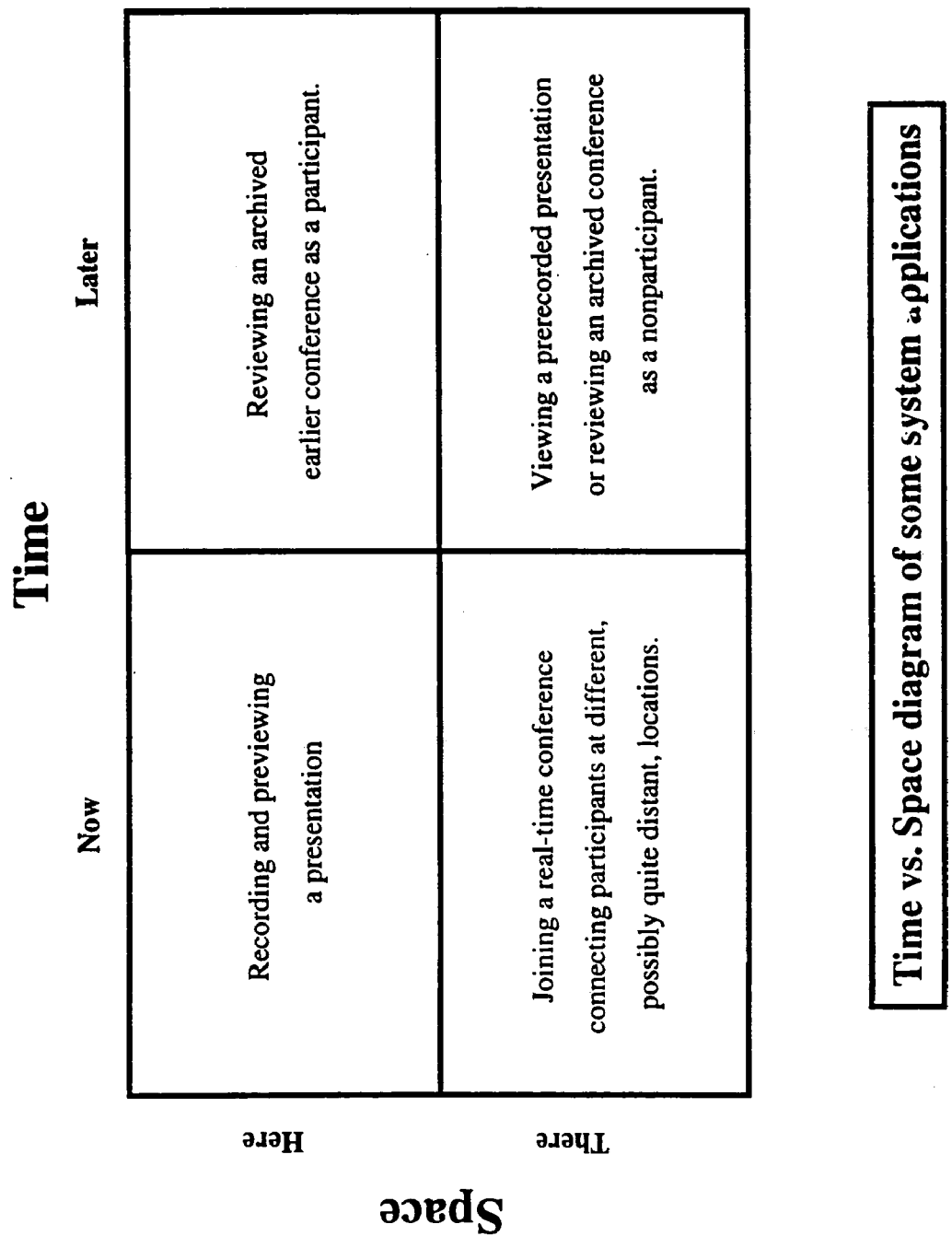
FIG. 23 is a time vs. space diagram showing some typical applications of the present invention.

One way of seeing the flexibility of the system is to refer to FIG. 23, where several applications covering different separations in time and space for the communicants are listed.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for capturing a frame image from a first computer within a conferencing system comprising:
   receiving a user selection of at least one area of a display of the first computer;
   translating the user selection to boundary positions around the at least one area, wherein the boundary positions are settable to positions independent of the boundaries of the display and independent of the boundaries of any window on the display; and
   selecting the frame image within the boundary positions for capture.

2. The method of claim 1 further comprising displaying the frame boundary positions on the display.

3. The method of claim 1 wherein the frame image is a subset of the image displayed by the display.

4. The method of claim 1 wherein the at least one area comprises a plurality of areas and the plurality of areas can overlap.

5. The method of claim 1 further comprising transmitting the selected frame image to a second computer in the conferencing system.

6. The method of claim 5 wherein the selected frame image is divided into subregions for efficient transmission.

7. The method of claim 5 further comprising transcoding selected frame image data from a first image data form of the first computer to a second image data form of the second computer.

8. The method of claim 5 further comprising receiving a signal at the first computer after the second computer receives the selected frame image.

9. The method of claim 1 wherein the boundary positions are automatically adjusted when the at least one area is moved or resized.

10. A computer readable medium having embodied thereon a program, the program being executable by a machine to perform a method for capturing a frame image from a first computer within a conferencing system, the method comprising:
    receiving a user selection of at least one area of a display of the first computer;
    translating the user selection to boundary positions around the at least one area, wherein the boundary positions are settable to positions independent of the boundaries of the display and independent of the boundaries of any window on the display; and
    selecting the frame image within the boundary positions.

11. A system for capturing a frame image from a first computer within a conferencing system, comprising:
    means for receiving a user selection of at least one area of a display of the first computer;
    means for translating the user selection to boundary positions around the at least one area, wherein the boundary positions are settable to positions independent of the boundaries of the display and independent of the boundaries of any window on the display; and
    means for selecting the frame image within the boundary positions.

* * * * *